(12) United States Patent
Kumeno et al.

(10) Patent No.: US 10,710,237 B2
(45) Date of Patent: Jul. 14, 2020

(54) ASSIST DEVICE

(71) Applicant: JTEKT CORPORATION, Osaka-shi (JP)

(72) Inventors: Toshiki Kumeno, Kyoto (JP); Hiromichi Ohta, Kariya (JP); Yoshitaka Yoshimi, Kashiba (JP)

(73) Assignee: JTEKT CORPORATION, Osaka-shi (JP)

( * ) Notice: Subject to any disclaimer, the term of this patent is extended or adjusted under 35 U.S.C. 154(b) by 143 days.

(21) Appl. No.: 15/920,502

(22) Filed: Mar. 14, 2018

(65) Prior Publication Data

US 2018/0272525 A1    Sep. 27, 2018

(30) Foreign Application Priority Data

Mar. 22, 2017  (JP) .................................. 2017-056227
May 26, 2017  (JP) .................................. 2017-105011
(Continued)

(51) Int. Cl.
*B25J 9/00* (2006.01)
*A63B 21/00* (2006.01)
(Continued)

(52) U.S. Cl.
CPC ............ *B25J 9/0006* (2013.01); *A61H 1/024* (2013.01); *A61H 3/00* (2013.01);
(Continued)

(58) Field of Classification Search
CPC ...... B25J 9/0006; B25J 9/1638; B25J 13/085; B25J 13/08; G06F 1/163; A61H 1/024;
(Continued)

(56) References Cited

U.S. PATENT DOCUMENTS 5,551,308 A * 9/1996 Arai ........................ B25J 9/0006
                                                     73/862.041
2004/0249319 A1* 12/2004 Dariush .................... A61H 1/00
                                                             601/5
(Continued)

FOREIGN PATENT DOCUMENTS

JP        2013-173190        9/2013

*Primary Examiner* — Sundhara M Ganesan
(74) *Attorney, Agent, or Firm* — Oblon, McClelland, Maier & Neustadt, L.L.P.

(57) ABSTRACT

An assist device includes a body wearing unit and an actuator unit. The actuator unit includes an output link configured to pivot about a joint of an assist target body part and to be attached to the assist target body part; an actuator including an output shaft configured to generate an assist torque via the output link; a torque determination unit configured to determine a combined torque obtained by combining a user torque and the assist torque from the output shaft, the user torque being input from the output link when the user causes the assist target body part to pivot; a correction unit configured to calculate a correction amount for the determined combined torque; and a pivot angle control unit configured to control a pivot angle of the output shaft based on the determined combined torque and the calculated correction amount.

15 Claims, 29 Drawing Sheets

(30) Foreign Application Priority Data

| May 26, 2017 | (JP) | 2017-105012 |
|---|---|---|
| Sep. 8, 2017 | (JP) | 2017-173532 |
| Sep. 8, 2017 | (JP) | 2017-173533 |
| Sep. 8, 2017 | (JP) | 2017-173534 |

(51) Int. Cl.
  *A61H 3/00* (2006.01)
  *A61H 1/02* (2006.01)
  *G06F 1/16* (2006.01)
  *B25J 9/16* (2006.01)
  *B25J 13/08* (2006.01)

(52) U.S. Cl.
  CPC ....... *A63B 21/00181* (2013.01); *B25J 9/1638* (2013.01); *B25J 13/085* (2013.01); *G06F 1/163* (2013.01); *A61H 2003/007* (2013.01); *A61H 2201/1215* (2013.01); *A61H 2201/165* (2013.01); *A61H 2203/0406* (2013.01)

(58) Field of Classification Search
  CPC .............. A61H 3/00; A61H 2203/0406; A61H 2201/165; A61H 2003/007; A61H 2201/1215; A63B 21/00181; A61B 5/6802; A61B 5/1123
  See application file for complete search history.

(56) References Cited

U.S. PATENT DOCUMENTS

| 2005/0102111 | A1* | 5/2005 | Dariush | A61H 1/00 702/41 |
|---|---|---|---|---|
| 2008/0161937 | A1* | 7/2008 | Sankai | A61H 3/008 623/25 |
| 2008/0234608 | A1* | 9/2008 | Sankai | A61B 5/04888 601/5 |
| 2010/0010639 | A1* | 1/2010 | Ikeuchi | A61H 3/008 623/24 |
| 2010/0049102 | A1* | 2/2010 | Yasuhara | A61H 1/0244 601/5 |
| 2010/0113980 | A1* | 5/2010 | Herr | A61F 2/60 600/587 |
| 2010/0121232 | A1* | 5/2010 | Sankai | A61H 3/008 601/23 |
| 2010/0130893 | A1* | 5/2010 | Sankai | A63B 21/4047 601/5 |
| 2010/0138043 | A1* | 6/2010 | Kajima | B62D 57/032 700/261 |
| 2010/0235028 | A1* | 9/2010 | Ishii | G05D 1/0891 701/22 |
| 2011/0071664 | A1* | 3/2011 | Linn | B25J 9/0006 700/213 |
| 2011/0301756 | A1* | 12/2011 | Yoshiike | B62D 57/032 700/253 |
| 2012/0158179 | A1* | 6/2012 | Ooga | B25J 9/1633 700/259 |
| 2013/0123671 | A1* | 5/2013 | Ikeuchi | A61H 3/00 601/35 |
| 2013/0289452 | A1* | 10/2013 | Smith | B25J 9/0006 601/33 |
| 2014/0024978 | A1* | 1/2014 | Killian | A61H 1/0244 601/33 |
| 2014/0100492 | A1* | 4/2014 | Nagasaka | A61H 3/061 601/34 |
| 2015/0127018 | A1* | 5/2015 | Lim | A61H 1/0244 606/130 |
| 2015/0190923 | A1* | 7/2015 | Seo | B25J 9/0006 602/16 |
| 2015/0366738 | A1* | 12/2015 | Endo | A61H 3/00 482/4 |
| 2016/0030201 | A1* | 2/2016 | Zoss | A61F 5/01 623/24 |
| 2016/0045385 | A1* | 2/2016 | Aguirre-Ollinger | A61H 3/00 623/24 |
| 2017/0001656 | A1* | 1/2017 | Katayama | B62B 5/0069 |
| 2017/0043476 | A1* | 2/2017 | Seo | B25J 9/0006 |
| 2017/0056274 | A1* | 3/2017 | Lee | A61H 3/00 |
| 2017/0056275 | A1* | 3/2017 | Lee | A61H 3/00 |
| 2017/0143517 | A1* | 5/2017 | Sankai | A61B 5/0488 |
| 2017/0156895 | A1* | 6/2017 | Song | A61F 2/72 |
| 2017/0181917 | A1* | 6/2017 | Ohta | A61H 3/008 |
| 2017/0198728 | A1* | 7/2017 | Noda | B25J 11/00 |
| 2017/0231787 | A1* | 8/2017 | Noda | A61H 3/00 623/26 |
| 2018/0008502 | A1* | 1/2018 | Asbeck | A61F 5/01 |
| 2018/0021618 | A1* | 1/2018 | Lee | A61H 3/00 482/78 |
| 2018/0078390 | A1* | 3/2018 | Seo | A61F 2/72 |
| 2018/0325764 | A1* | 11/2018 | Yagi | B25J 11/00 |

\* cited by examiner

[PROCESSING OF INPUT SIGNALS AND SO ON FOR RIGHT ACTUATOR UNIT (S100R)]

[PROCESSING OF INPUT SIGNALS AND SO ON FOR LEFT ACTUATOR UNIT (S100L)]

FIG. 20
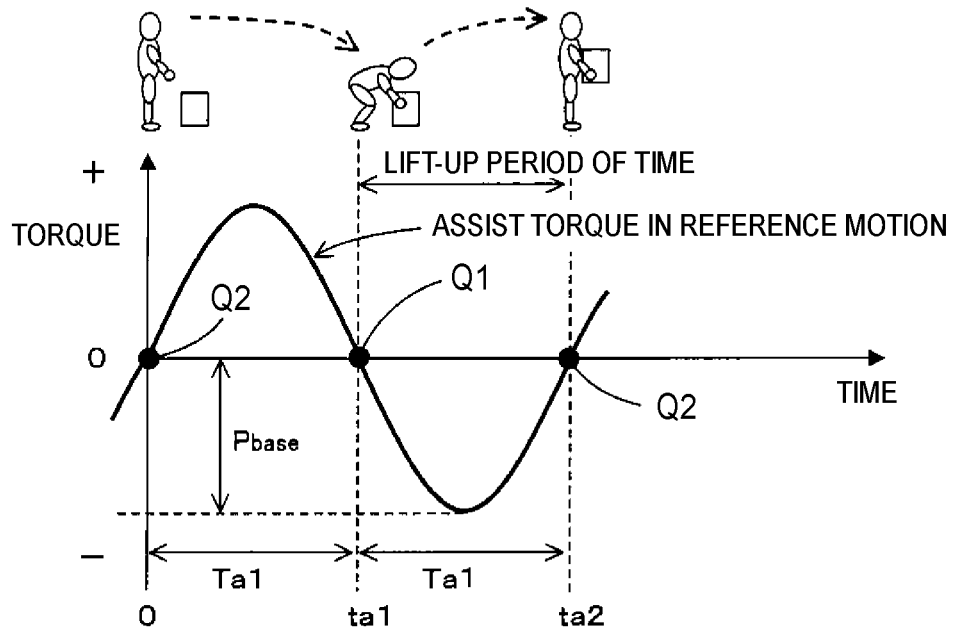
[LIFT-UP REFERENCE MOTION]
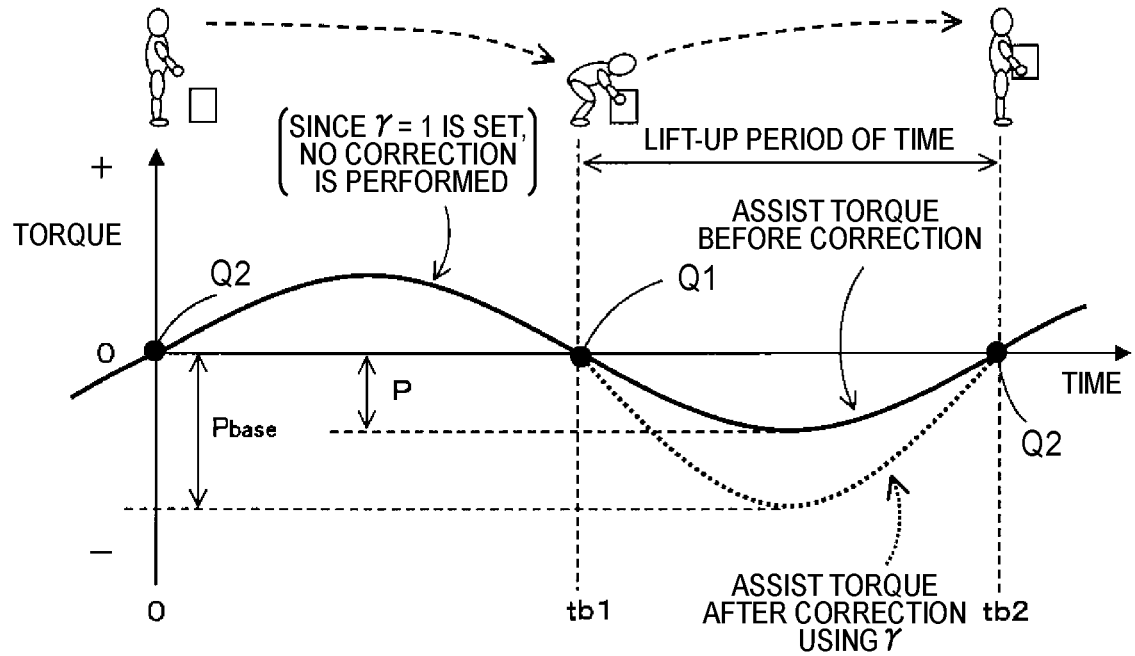
(CASE IN WHICH CYCLE IS LONG AND ASSIST TORQUE BEFORE CORRECTION IS SMALL AS COMPARED TO LIFT-UP REFERENCE MOTION)

FIG. 21
[LIFT-UP REFERENCE MOTION]
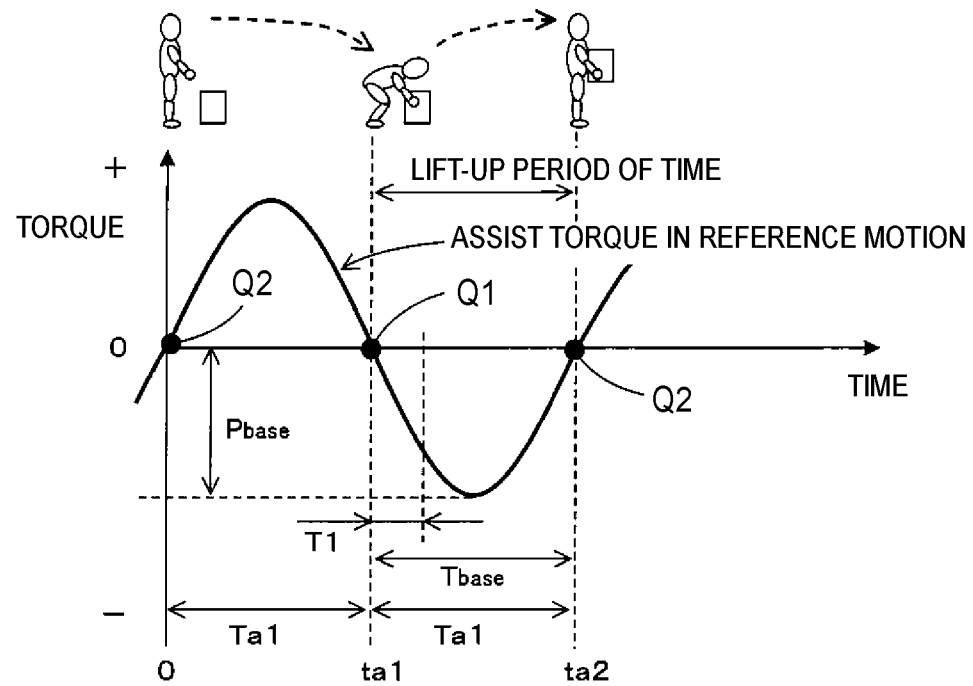
(CASE IN WHICH CYCLE IS LONG AND ASSIST TORQUE BEFORE CORRECTION IS SMALL AS COMPARED TO LIFT-UP REFERENCE MOTION)
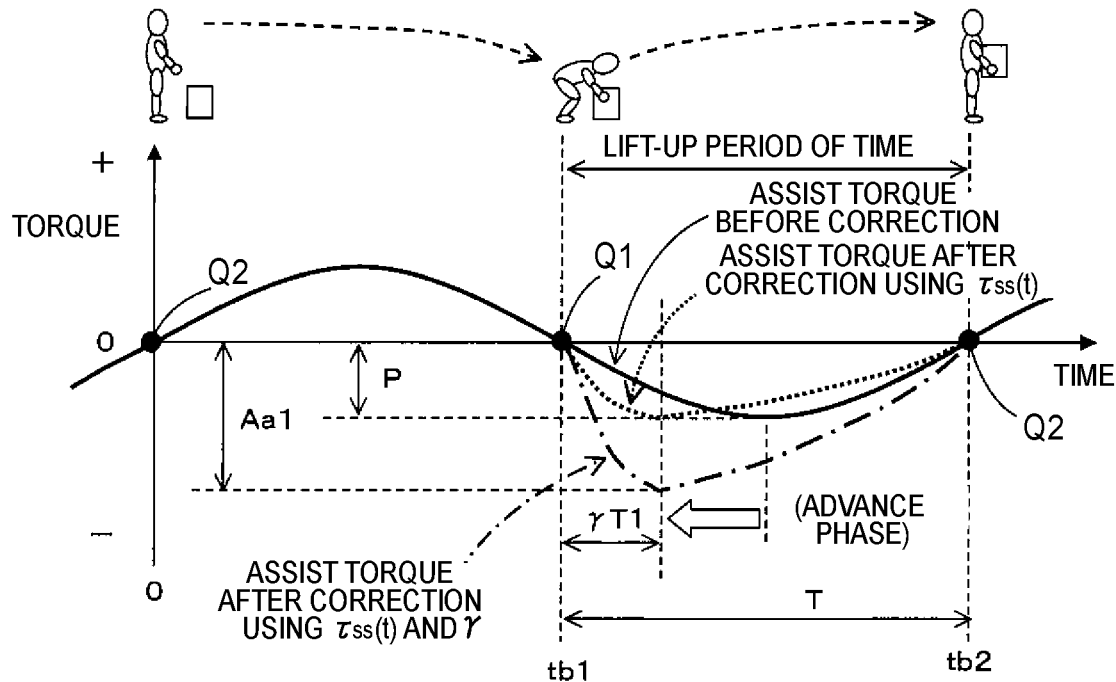

FIG. 25
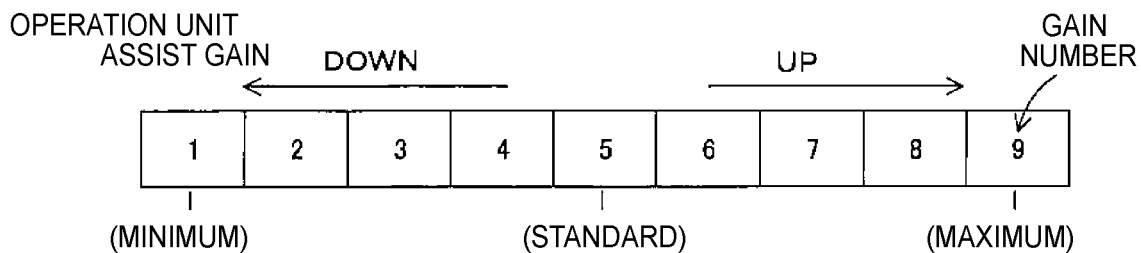
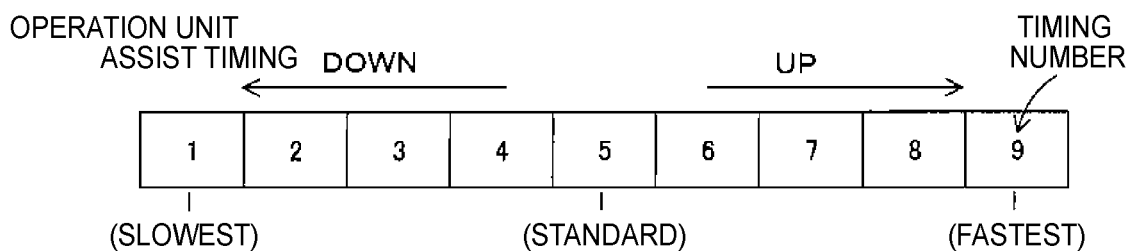
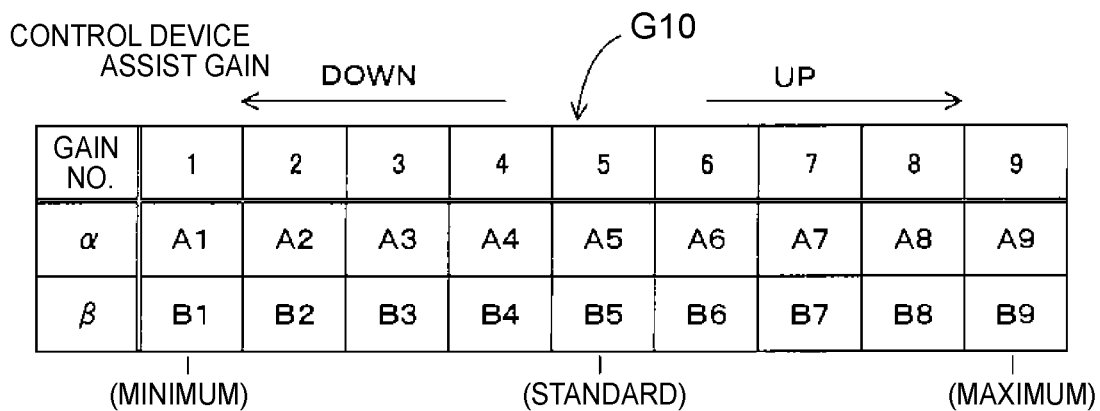
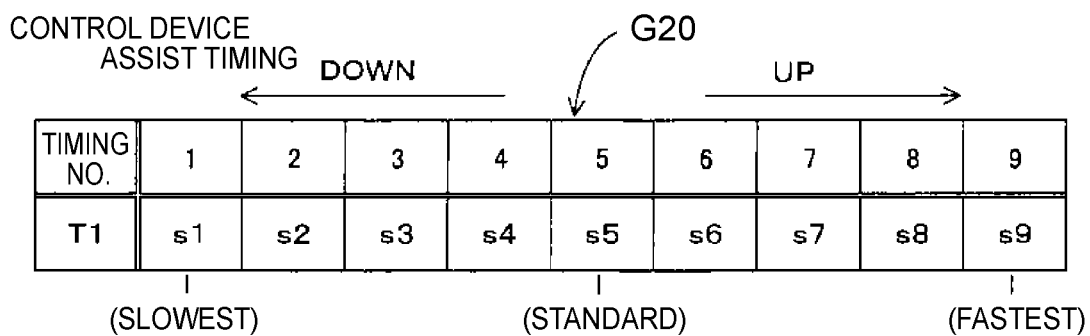

[PROCESSING OF INPUT SIGNALS AND SO ON FOR RIGHT ACTUATOR UNIT (S100R)]

FIG. 35
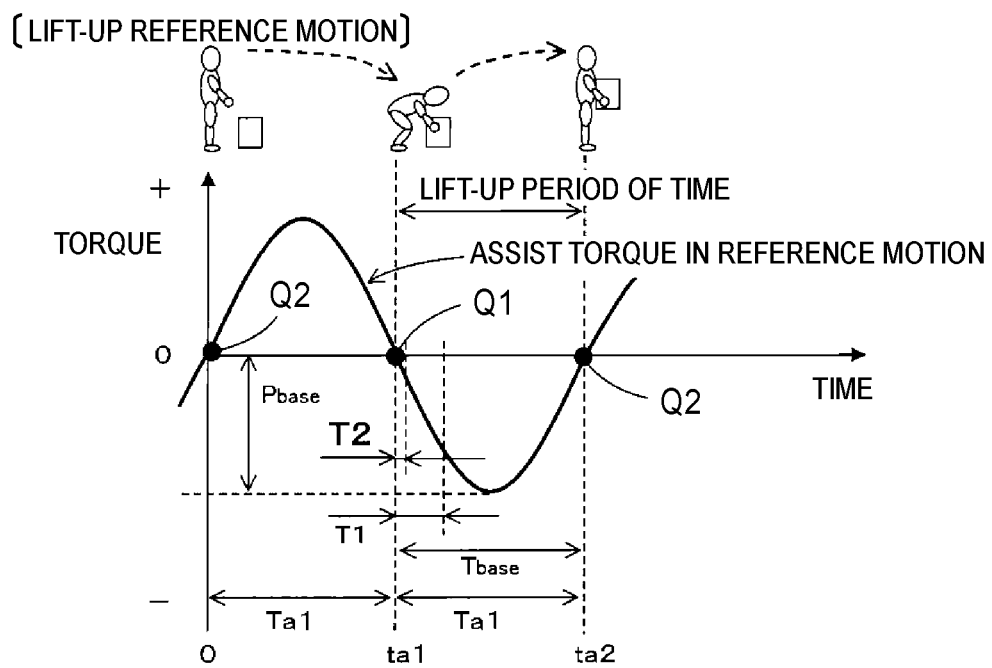
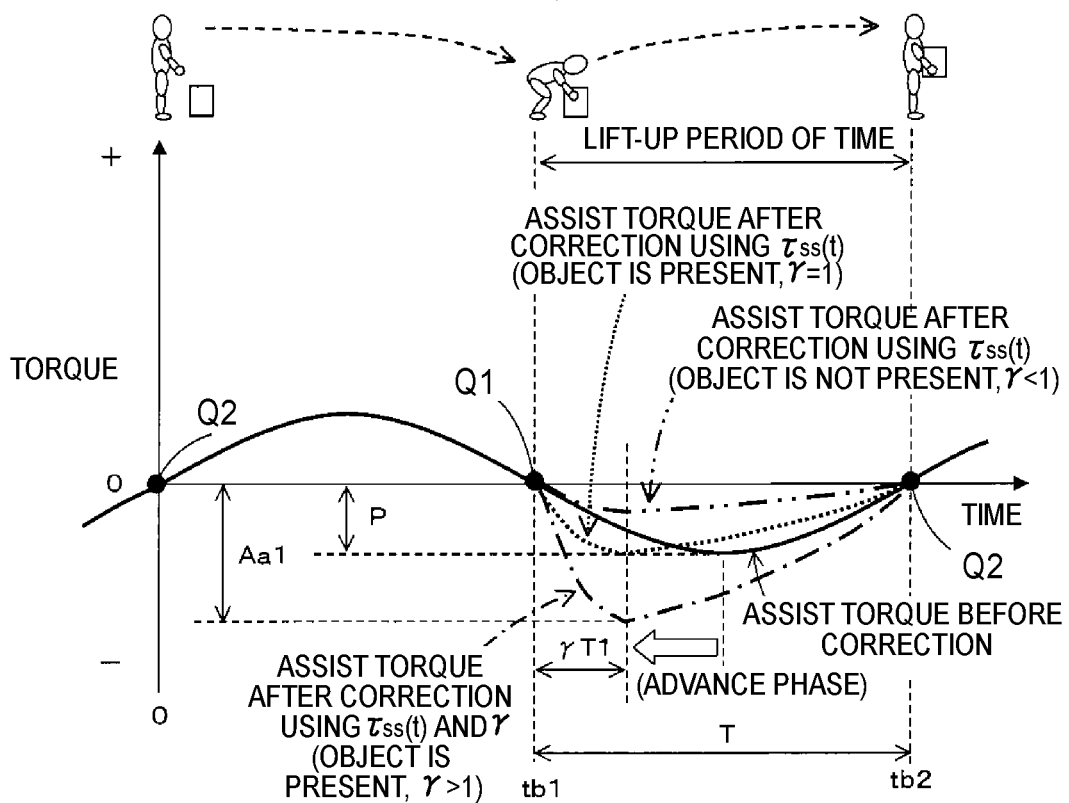

ASSIST DEVICE

INCORPORATION BY REFERENCE

The disclosure of Japanese Patent Application No. 2017-056227 filed on Mar. 22, 2017, Japanese Patent Application No. 2017-173534 filed on Sep. 8, 2017, Japanese Patent Application No. 2017-173532 filed on Sep. 8, 2017, and Japanese Patent Application No. 2017-173533 filed on Sep. 8, 2017, each including the specification, drawings and abstract, is incorporated herein by reference in its entirety.

BACKGROUND

1. Technical Field

The disclosure relates to an assist device that assists the motion of an assist target body part of a user.

2. Description of Related Art

Japanese Unexamined Patent Application Publication No. 2013-173190 (JP 2013-173190 A), for example, describes a wearable motion assist device that assists the motion of the thighs relative to the waist when a user lifts up a heavy thing by bending and stretching of the waist or when the user walks normally. The wearable motion assist device includes a waist frame configured to be worn on the waist of the user, a back pad, an abdominal pad, connecting members connecting the back pad and the abdominal pad to each other, thigh fixing portions configured to be fixed to the thighs, and drive mechanisms configured to drive the thigh fixing portions relative to the waist frame. The wearable motion assist device further includes biological signal detection sensors that are stuck to the skin of the user, and a control unit configured to control the drive mechanisms based on biological signals output from the biological signal detection sensors. In order to detect biological potential signals such as a muscle potential signal and a neurotransmission signal from the skin, the biological signal detection sensor includes electrodes for detecting a weak potential. The biological signal detection sensors are stuck to the skin of the user, using adhesive seals covering portions around the electrodes, on the front sides of the right and left thighs in the vicinity of the waist, on the inner sides of the right and left thighs in the vicinity of the waist, on the right and left hips, on the right and left sides of the back slightly above the waist, and so on.

SUMMARY

In the case of the wearable motion assist device described in JP 2013-173190 A, many biological signal detection sensors are required and should be stuck to many portions of the user, such as on the front sides of the right and left thighs, on the inner sides of the right and left thighs, on the right and left hips, and on the right and left sides of the back. Therefore, when the user wears the assist device for use, it takes much time and effort. Further, before the biological signal detection sensors are stuck, it also takes time and effort to determine sticking positions of the sensors and the number of sensors to be stuck (for example, three sensors are stuck close to each other for one measurement portion). Further, there is a possibility that processing to remove noise from weak biological signals detected by many biological signal detection sensors, and processing to estimate what kind of motion is being performed (lifting up a heavy thing, walking, or the like) based on biological signals from the respective biological signal detection sensors, and to assist the motion become very complicated. Further, when a motion of lifting up a heavy thing and a motion of walking are distinguished from each other, it is necessary to stick biological signal detection sensors around the waist, i.e. muscles to be mainly used when lifting up the heavy thing, and around the thighs, i.e. muscles to be mainly used when walking, and therefore, a large number of biological signal detection sensors are required.

Further, in the case of the wearable motion assist device described in JP 2013-173190 A, when the motion of assist target body parts of the user is slow, for example, when the motion of the user lifting up a heavy thing at the user's feet is assisted, there is a possibility that processing to estimate the kind of motion is delayed to cause a shortage of assist torque. When the heavy thing is lifted up, a large assist torque is required particularly at the start of the lift-up. However, since, in addition to a delay in estimation of the motion, the speed of the lift-up motion of the user itself is slow, there is a possibility that a sufficient assist torque cannot be generated at the start of the lift-up.

The disclosure provides an assist device that can be easily worn by a user, that can assist the motion of an assist target body part with a simpler configuration and by simpler control, and that can prevent a shortage of assist torque by performing appropriate correction. In other words, the disclosure provides an assist device that can be easily worn by a user and that can generate an appropriate assist torque in accordance with a motion of the user with a simpler configuration and by simpler control.

An aspect of the disclosure relates to an assist device including a body wearing unit configured to be worn on a body of a user including a region around an assist target body part of the user; and an actuator unit configured to be attached to the body wearing unit and to the assist target body part so as to assist a motion of the assist target body part. The actuator unit includes an output link configured to pivot about a joint of the assist target body part and to be attached to the assist target body part; an actuator including an output shaft configured to generate an assist torque for assisting pivoting of the assist target body part via the output link; a torque determination unit configured to determine a combined torque obtained by combining a user torque and the assist torque from the output shaft, the user torque being input from the output link when the user causes the assist target body part to pivot with force of the user; a correction unit configured to calculate a correction amount for the determined combined torque; and a pivot angle control unit configured to control a pivot angle of the output shaft based on the combined torque determined by the torque determination unit and the correction amount calculated by the correction unit.

According to the above-described aspect, the assist device can be worn only by attaching the body wearing unit and the output link of the actuator unit to the body of the user, and no biological signal detection sensor is required. Therefore, the user can easily wear the assist device. The actuator unit is simply configured by the output link, the actuator, the torque determination unit, the correction unit, and the pivot angle control unit. Since the correction amount for the combined torque is calculated, it is possible to prevent a shortage of the assist torque by performing appropriate correction.

In the above-described aspect, the correction unit may be configured to calculate, based on the combined torque, a posture angle that is an inclination angle of an upper half of the body of the user with respect to a vertical direction, the correction unit configured to calculate the correction amount based on the calculated posture angle.

In the above-described configuration, an appropriate correction amount can be calculated by calculating the correction amount based on the posture angle of the user.

In the above-described aspect, when the posture angle is $\theta_L$, the correction unit may be configured to calculate, as the correction amount, $K \sin \theta_L$ using K that is a constant set in advance.

In the above-described configuration, a specific correction amount can be calculated more easily.

In the above-described aspect, the correction unit may be configured to calculate the correction amount based on a differential value of the combined torque.

In the above-described configuration, an appropriate correction amount can be calculated by calculating the correction amount based on the differential value of the combined torque.

In the above-described aspect, the actuator unit may include a communication unit; the communication unit may be configured to transmit, to an analysis system provided separately from the assist device, user information that is information about the user including the user torque, and assist information that is information about input and output of the actuator unit including the assist torque, the communication unit being configured to receive, from the analysis system, analysis information including a result of analysis performed by the analysis system; and the actuator unit may be configured to adjust an operation of the actuator unit based on the analysis information received from the analysis system.

In the above-described configuration, the analysis system is provided separately from the assist device, and the operation and so on of the assist device are analyzed by the analysis system using the user information and the assist information from the assist device. Then, the assist device adjusts its own operation (i.e., the operation of the assist device) based on the analysis information from the analysis system. Therefore, it is not necessary to install advanced analysis programs or the like on the assist device, and thus, for example, optimal setting unique to the user can be performed relatively easily.

In the above-described aspect, the actuator unit further may include a torque detection unit configured to output a torque-related signal about the combined torque; the torque determination unit may be configured to determine related torque information including the combined torque and the user torque based on the torque-related signal from the torque detection unit; the actuator unit may further include a motion kind determination unit configured to determine a kind of motion of the user based on the determined related torque information, and an assist torque calculation unit configured to calculate the assist torque based on the determined related torque information; the correction unit may be configured to correct the calculated assist torque, based on the determined kind of motion; and the pivot angle control unit may be configured to control the pivot angle of the output shaft based on the assist torque corrected by the correction unit.

In the above-described configuration, the assist device can be worn only by attaching the body wearing unit and the output link of the actuator unit to the body of the user, and no biological signal detection sensor is required. Therefore, the user can easily wear the assist device. The actuator unit is simply configured by the output link, the actuator, the torque detection unit, the torque determination unit, the motion kind determination unit, the correction unit, and the pivot angle control unit. Since the assist torque is corrected based on the determined kind of motion, an appropriate assist torque in accordance with a motion of the user can be generated.

In the above-described aspect, the kind of motion may include a lift-up motion that is a motion in which the user lifts up an object; and when the determined kind of motion is the lift-up motion, the correction unit may be configured to perform at least one of i) assist torque amount correction for correcting magnitude of the assist torque during a lift-up period of time that is a period of time from a time point at which the user starts lift-up of the object to a time point at which the user completes the lift-up of the object, and ii) assist torque phase correction for estimating a user torque peak time point that is a time point at which a maximum user torque is generated, and for performing correction such that an assist torque peak time point that is a time point at which a maximum assist torque is generated becomes earlier than the user torque peak time point, the maximum user torque being a maximum value of the user torque during the lift-up period of time, and the maximum assist torque being a maximum value of the assist torque.

In the above-described configuration, when the kind of motion is the lift-up motion, an appropriate assist torque in accordance with the motion of the user can be generated by performing at least one of the assist torque amount correction and the assist torque phase correction.

In the above-described aspect, the kind of motion may include a motion of work in which the user has an object; the actuator unit may further include an object presence/absence determination unit configured to determine presence or absence of the object in the motion of the work in which the user has the object; and the correction unit may be configured to correct the assist torque in accordance with the presence or absence of the object determined by the object presence/absence determination unit.

In the above-described configuration, when the user does not actually have an object although the motion of the user is the same as the motion of work in which the user has an object, it is possible to prevent the user from being surprised, by suppressing generation of an unnecessarily large assist torque. Thus, it is possible to assist the motion of the user more appropriately.

In the above-described aspect, the kind of motion that is determined by the motion kind determination unit may include an object lift-up/lift-down motion in which the user lifts up an object or the user lowers the object held by the user.

In the above-described configuration, since the kind of motion that is determined includes the object lift-up/lift-down motion, when the user performs lift-up/lift-down of an object in a workplace or the like, it is possible to appropriately assist the work of the user.

In the above-described aspect, the kind of motion that is determined by the motion kind determination unit may further include a moving object laterally motion in which the user moves the object from right to left or from left to right.

In the above-described configuration, the kind of motion that is determined further includes the moving object laterally motion. Appropriate assistance differs depending on the work (the kind of motion). Therefore, by determining whether the motion of the user is the object lift-up/lift-down motion or the moving object laterally motion in a workplace or the like, appropriate assistance can be provided in accordance with the work.

In the above-described aspect, the kind of motion that is determined by the motion kind determination unit may further include a walking motion in which the user walks; the actuator unit may further include a compensation torque calculation unit configured to calculate, based on the torque-related signal from the torque detection unit, a friction compensation torque that is generated for cancelling a friction torque in the actuator unit; and the pivot angle control unit may be configured to control the pivot angle of the output shaft based on a summed assist torque obtained by adding the friction compensation torque calculated by the compensation torque calculation unit to the assist torque corrected by the correction unit.

In the above-described configuration, the friction torque in the actuator unit can be cancelled by the friction compensation torque that is calculated based on the torque-related signal from the torque detection unit. Consequently, not only when object lift-up/lift-down is performed in a workplace or the like, but also during walking such as rehabilitation of walking, difficulty in walking and so on can be reduced by reducing resistance due to the friction torque of the actuator unit, and thus, assist feeling can be improved.

In the above-described aspect, the compensation torque calculation unit may include a torque change amount calculation unit configured to calculate a torque change amount of the user torque based on the torque-related signal, and a dead zone torque determination unit configured to determine whether an absolute value of the torque change amount of the user torque calculated by the torque change amount calculation unit is less than a predetermined dead zone torque value; the compensation torque calculation unit may be configured to calculate the friction compensation torque based on the torque change amount of the user torque calculated by the torque change amount calculation unit; and the compensation torque calculation unit may be configured to set the friction compensation torque to zero when the dead zone torque determination unit determines that the absolute value of the torque change amount of the user torque is less than the predetermined dead zone torque value.

In the above-described configuration, since the friction compensation torque is calculated based on the torque change amount of the user torque, it is possible to reduce the pivot resistance of the output link that is attached to the body part of the user, the pivot resistance being caused due to the friction torque of the actuator unit. Thus, difficulty in walking and so on can be reduced, and accordingly, assist feeling can be further improved. The friction compensation torque is set to zero when it is determined that the absolute value of the torque change amount of the user torque is less than the predetermined dead zone torque value. Consequently, a predetermined dead zone range can be provided in a range where the absolute value of the torque change amount of the user torque is less than the predetermined dead zone torque value, i.e. in a range in the vicinity of a point where the torque change amount of the user torque becomes zero. Thus, vibration of the actuator unit can be suppressed, and thus, assist feeling can be further improved.

The assist device according to above-described aspect may further include an operation unit provided separately from the body wearing unit and the actuator unit and configured to adjust and display an assist control state of the actuator unit.

In the above-described configuration, since the assist control state can be adjusted using the separate operation unit, the user can easily perform adjustment for obtaining a desired assist state. Further, since the assist control state is displayed on the separate operation unit, the user can easily recognize the current assist control state, and thus, the user can easily perform further adjustment on the recognized assist control state.

In the above-described aspect, the operation unit may include a gain operating portion configured to adjust magnitude of the assist torque.

In the above-described configuration, the user can adjust the magnitude of the assist torque (one of the assist control states) using the gain operating portion, and thus, the gain operation is useful. Since the user wearing the assist device can adjust the magnitude of the assist torque, assist feeling can be further improved.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 20 is a diagram for explaining an effect of "CALCULATE RIGHT γ" shown in FIG. 18;

FIG. 21 is a diagram for explaining an effect of "CALCULATE RIGHT $\tau_{ss}(t)$" shown in FIG. 19;

FIG. 25 is a diagram for explaining an example of an operation of changing an assist gain and an assist timing performed by the control device in accordance with changes in assist gain and assist timing caused by the operation unit;

FIG. 35 is a diagram for explaining an example of an effect of "DETERMINE WHETHER OBJECT IS PRESENT".

DETAILED DESCRIPTION OF EMBODIMENTS

Hereinbelow, the overall structure of an assist device 1 according to a first embodiment will be described with reference to FIGS. 1 to 7. The assist device 1 is, for example, a device that assists pivoting of the thighs relative to the waist when a user lifts up an object (for example, a parcel or baggage) or when the user walks. In FIGS. 1 to 7, X-, Y-, and Z-axes are perpendicular to each other, and when viewed from the user wearing the assist device 1, the X-axis direction corresponds to a forward direction, the Y-axis direction to a leftward direction, and the Z-axis direction to an upward direction.

Figure 1:
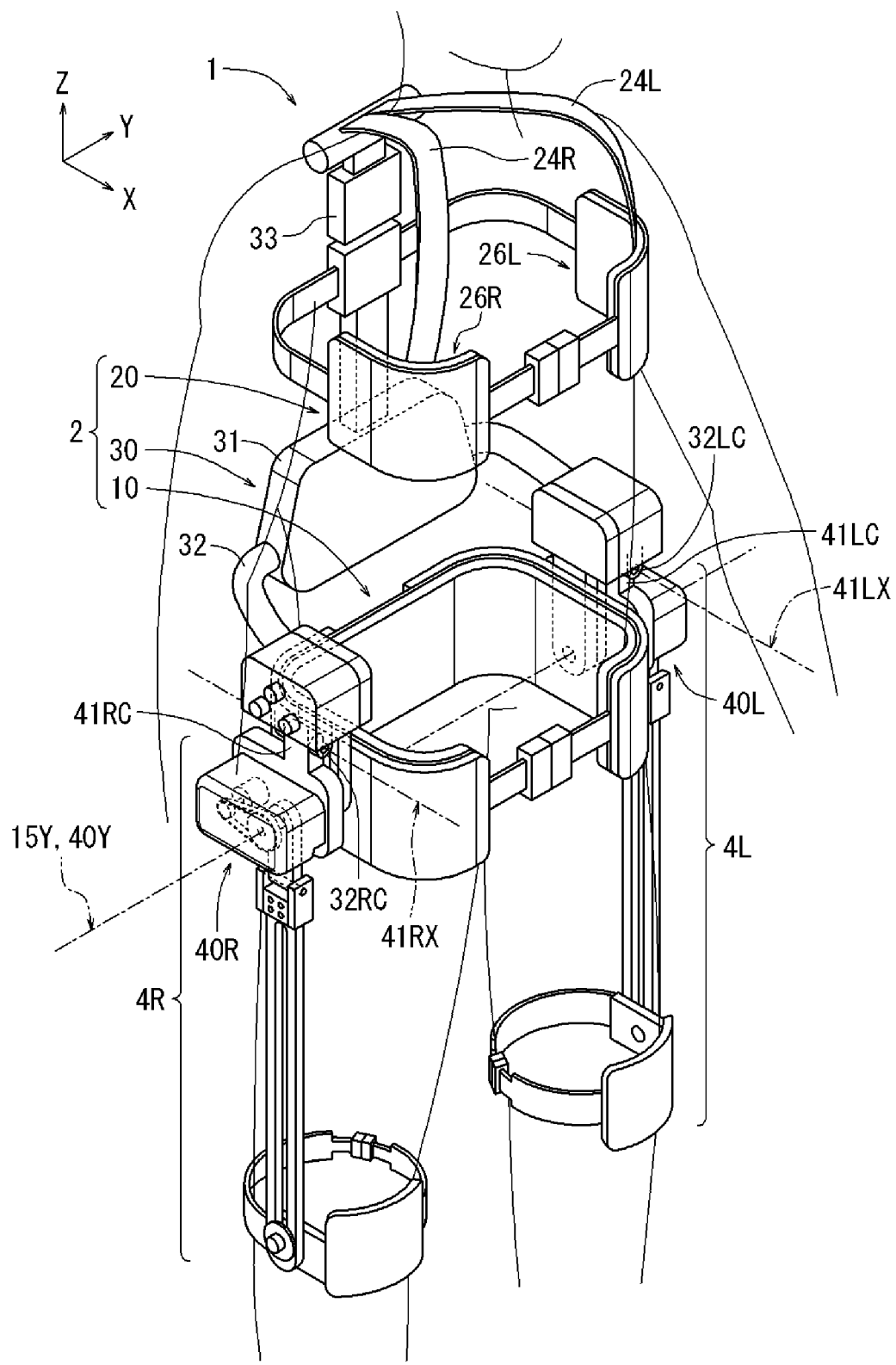
FIG. 1 is a perspective view for explaining an example of the overall configuration of an assist device of a first embodiment.

The overall structure of the assist device 1 will be described with reference to FIGS. 1 to 7. FIG. 1 shows the overall external appearance of the assist device 1. The assist device 1 includes a body wearing unit 2 (see FIG. 2), an actuator unit 4R (see FIG. 3), and an actuator unit 4L. The body wearing unit 2 is configured to be worn on the body including regions around assist target body parts (the thighs in an example of this embodiment) of the user. The actuator unit 4R (4L) is attached to the body wearing unit 2 and to the assist target body part so as to assist the motion of the assist target body part. Hereinbelow, the body wearing unit 2 and the actuator unit 4R will be described in this order.

Figure 2:
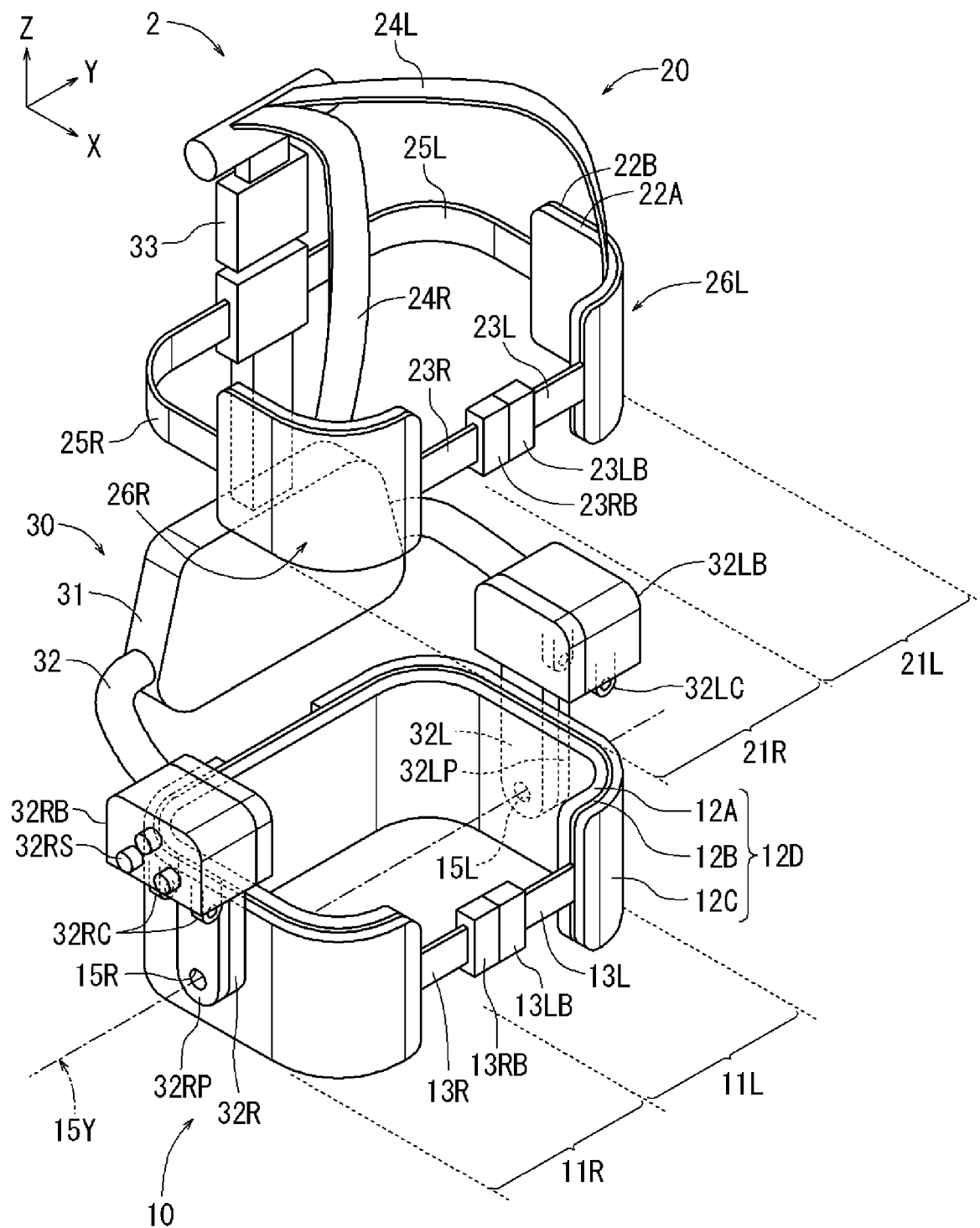
FIG. 2 is a perspective view for explaining an example of the external appearance of a body wearing unit in the assist device shown in FIG. 1.

Referring to FIG. 2, the overall configuration of the body wearing unit 2 will be described. As shown in FIG. 2, the body wearing unit 2 includes a waist wearing portion 10 to be worn around the waist of the user, an upper half body wearing portion 20 to be worn at any position in the upper half of the body of the user, and a frame portion 30 connecting the waist wearing portion 10 and the upper half body wearing portion 20 to each other.

The waist wearing portion 10 includes a right waist wearing portion 11R to be worn around the waist of the right half of the body of the user, and a left waist wearing portion 11L to be worn around the waist of the left half of the body of the user. The waist wearing portion 10 includes a waist applying portion 12D including three layers, i.e. a waist pad portion 12A with a predetermined thickness to be wound around the waist of the user, a waist cloth portion 12B disposed around an outer periphery of the waist pad portion 12A, and each of waist base portions 12C with a predetermined thickness and disposed around an outer periphery of the waist cloth portion 12B. The waist pad portion 12A is formed by, for example, an elastic member, while the waist base portions 12C are made of, for example, a resin. In order to facilitate attaching to and detaching from the user, the right waist wearing portion 11R and the left waist wearing portion 11L respectively include a buckle 13RB provided on a length-adjustable belt 13R and a buckle 13LB provided on a length-adjustable belt 13L.

In the waist wearing portion 10, a virtual pivot axis 15Y is set so as to extend in the right-left direction of the user at hip joints of the user when the waist wearing portion 10 is worn by the user. At a crossing position between the virtual pivot axis 15Y and the right waist wearing portion 11R, a pivot shaft portion 15R projecting rightward along the virtual pivot axis 15Y is fixed to the waist base portion 12C (see FIG. 5). Likewise, at a crossing position between the virtual pivot axis 15Y and the left waist wearing portion 11L, a pivot shaft portion 15L projecting leftward along the virtual pivot axis 15Y is fixed to the waist base portion 12C.

The upper half body wearing portion 20 includes a right upper half body wearing portion 21R to be worn at any position in the right upper half of the body of the user and a left upper half body wearing portion 21L to be worn at any position in the left upper half of the body of the user. The right upper half body wearing portion 21R includes a right chest wearing portion 26R, a belt 23R and a buckle 23RB, a belt 25R, and a right shoulder belt 24R. Likewise, the left upper half body wearing portion 21L includes a left chest wearing portion 26L, a belt 23L and a buckle 23LB, a belt 25L, and a left shoulder belt 24L. The right shoulder belt 24R, the left shoulder belt 24L, and the belts 23R, 23L, 25R, 25L are adjustable in length, while the buckles 23RB, 23LB facilitate attaching and detaching of the upper half body wearing portion 20 to and from the user.

The right chest wearing portion 26R and the left chest wearing portion 26L each include two layers, i.e. a pad portion 22A (e.g. an elastic member) with a predetermined thickness to be worn to cover the chest of the user and a cloth portion 22B disposed around an outer periphery of the pad portion 22A. The rear side of the belt 25R is connected to a rear frame portion 33, the front side of the belt 25R is connected to the rear side of the right chest wearing portion 26R, and the buckle 23RB is connected to the front side of the right chest wearing portion 26R via the belt 23R. Likewise, the rear side of the belt 25L is connected to the rear frame portion 33, the front side of the belt 25L is connected to the rear side of the left chest wearing portion 26L, and the buckle 23LB is connected to the front side of the left chest wearing portion 26L via the belt 23L. In this way, a chest wearing portion (the right chest wearing portion 26R and the left chest wearing portion 26L) extending from the right armpit of the user to the left armpit of the user via the chest of the user is formed by the path including the belt 25R, the right chest wearing portion 26R, the belt 23R (the buckle 23RB), the belt 23L (the buckle 23LB), the left chest wearing portion 26L, and the belt 25L.

The front side of the right shoulder belt 24R is connected to the front upper side of the right chest wearing portion 26R and the rear side of the right shoulder belt 24R is connected to the rear frame portion 33. In this way, when the assist device 1 is worn by the user, the right shoulder belt 24R extends from the front side (front right side) of the upper half of the body of the user, then on the shoulder (right shoulder) of the user, to reach the back side of the user. Likewise, the front side of the left shoulder belt 24L is connected to the front upper side of the left chest wearing portion 26L and the rear side of the left shoulder belt 24L is connected to the rear frame portion 33. In this way, when the assist device 1 is worn by the user, the left shoulder belt 24L extends from the front side (front left side) of the upper half of the body of the user, then on the shoulder (left shoulder) of the user, to reach the back side of the user. The rear side of the right shoulder belt 24R may be connected to the left side of the rear frame portion 33, while the rear side of the left shoulder belt 24L may be connected to the right side of the rear frame portion 33 such that the right shoulder belt 24R and the left shoulder belt 24L cross each other on the back side of the user.

Figure 5:
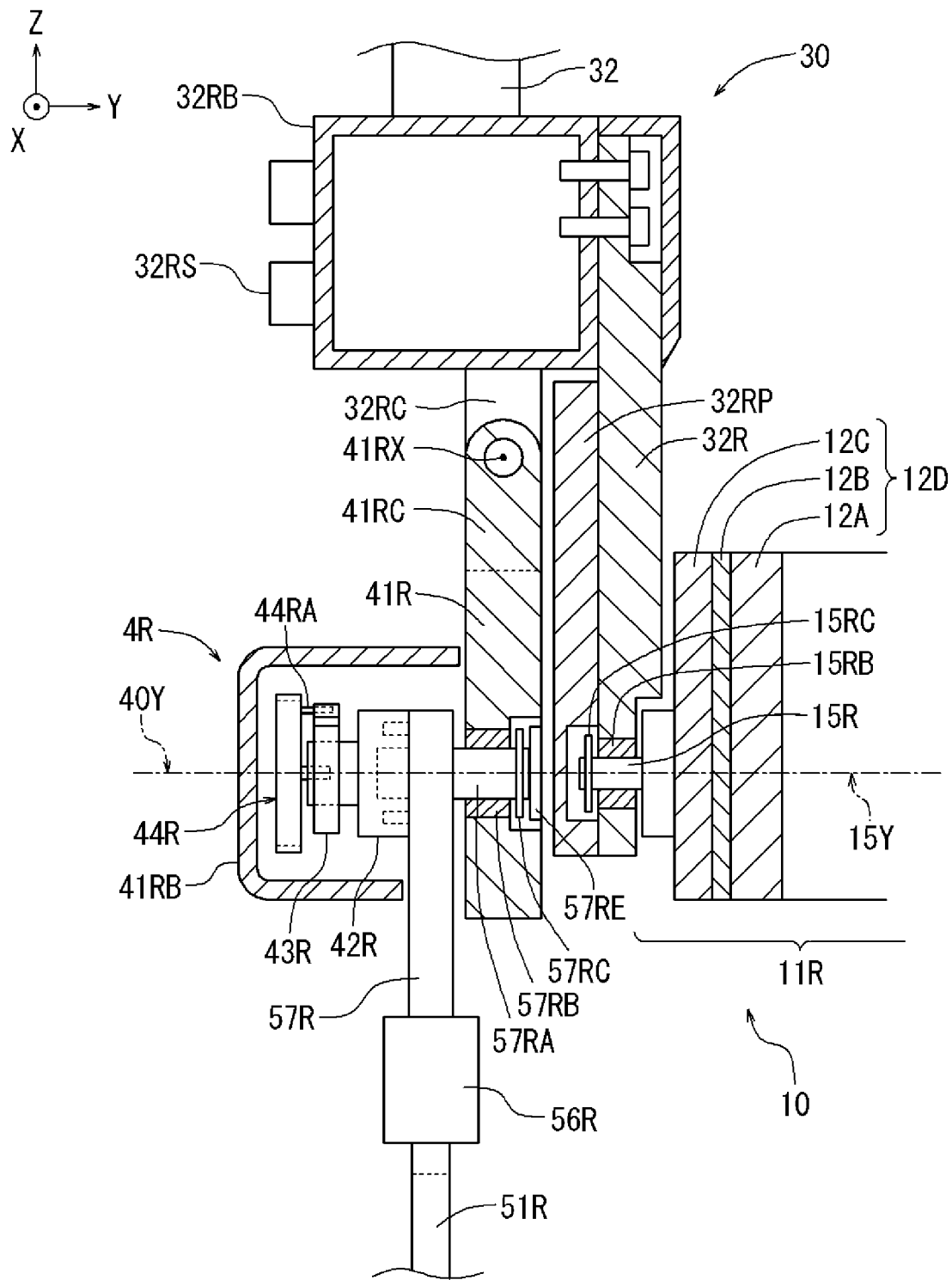
FIG. 5 is a sectional view of the assist device taken along a ZY plane passing through a virtual pivot axis and is a sectional view for explaining examples of the structure of a pivot mechanism and the structure of an opening angle imparting mechanism.

The frame portion 30 includes a right-left link frame portion 32, boxes 32RB, 32LB, pivotal portions 32R, 32L, pads 32RP, 32LP, a box 31, the rear frame portion 33, and so on. The right-left link frame portion 32 links to each other the crossing position between the virtual pivot axis 15Y and the right waist wearing portion 11R (i.e. the pivot shaft portion 15R) and the crossing position between the virtual pivot axis 15Y and the left waist wearing portion 11L (i.e. the pivot shaft portion 15L). As shown in FIGS. 5 and 2, the right-left link frame portion 32 is connected to the pivot shaft portion 15R via the box 32RB and the pivotal portion 32R. Likewise, as shown in FIG. 2, the right-left link frame portion 32 is connected to the pivot shaft portion 15L via the box 32LB and the pivotal portion 32L. The right-left link frame portion 32 is curved so as to be disposed on the back side of the user and positions the waist wearing portion 10 with respect to the frame portion 30. The box 31 houses, for example, a control device and a battery for the actuator units 4R, 4L. The rear frame portion 33 is disposed on the back side of the user so as to connect the right-left link frame portion 32 and the upper half body wearing portion 20 to each other and is adjustable in vertical length.

The pivotal portion 32R and the pad 32RP are attached to the pivot shaft portion 15R so as to be pivotable about the virtual pivot axis 15Y (see FIG. 5). The box 32RB is provided in the pivotal portion 32R at a position on the side opposite to the pivot shaft portion 15R. A holding portion 32RC configured to hold the actuator unit 4R is provided below the box 32RB (see FIG. 5). The box 32RB has a plurality of input portions 32RS configured to, for example, provide instructions regarding operation states of the assist device 1, such as ON/OFF of a power supply and an assist multiplying factor of the assist device 1. Since the pivot shaft portion 15L, the pivotal portion 32L, the box 32LB, and so on are the same as those described above, a description thereof will be omitted. With the configuration described above, the frame portion 30 and the upper half body wearing portion 20 are pivotable relative to the waist wearing portion 10 about the virtual pivot axis 15Y. Details of the structure of a pivot mechanism for supporting the frame portion 30 (and the upper half body wearing portion 20) such that the frame portion 30 (and the upper half body wearing portion 20) is (are) pivotable relative to the waist wearing portion 10 about the virtual pivot axis 15Y will be described later.

Figure 3:
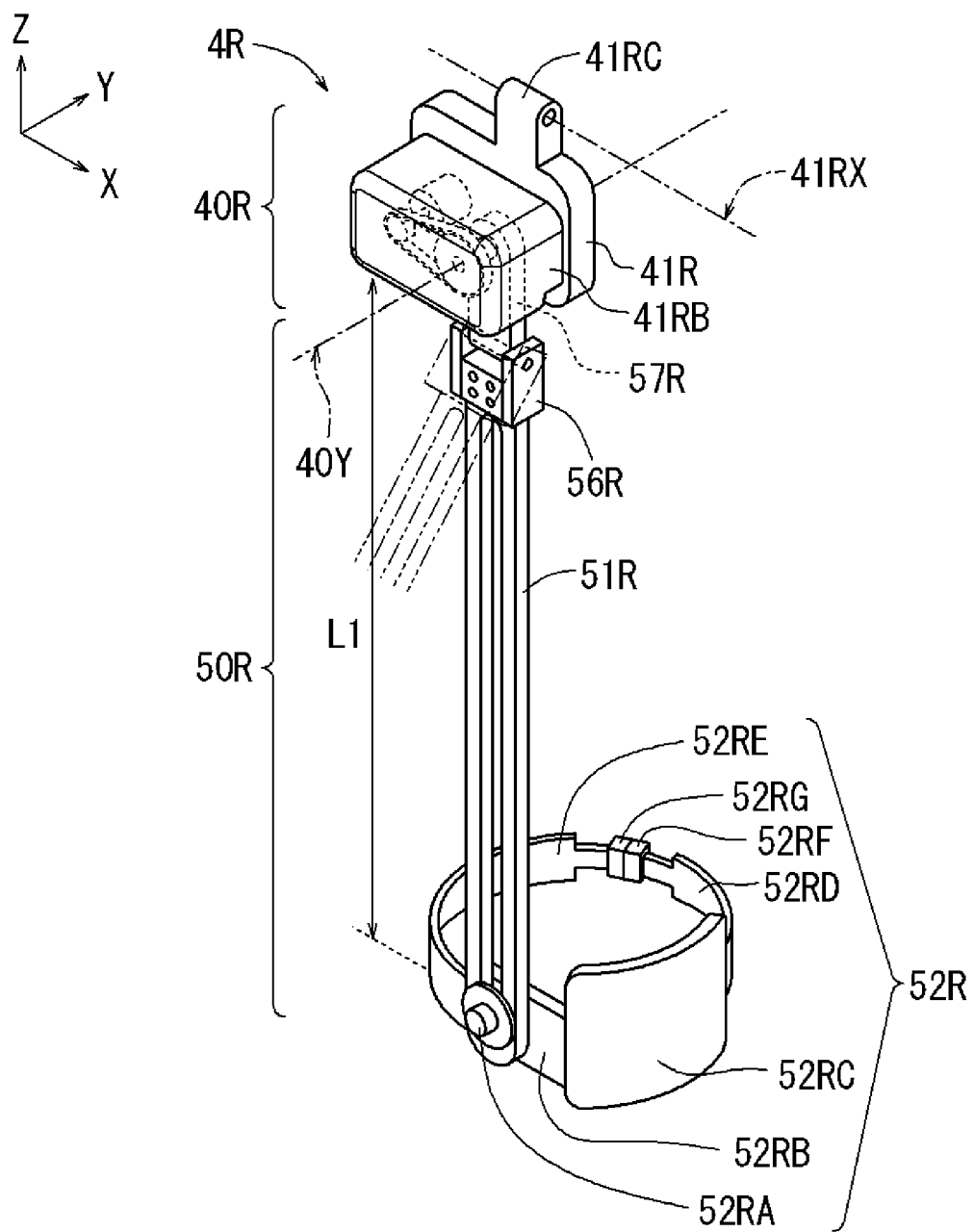
FIG. 3 is a perspective view for explaining an example of the external appearance of an actuator unit in the assist device shown in FIG. 1.
Figure 4:
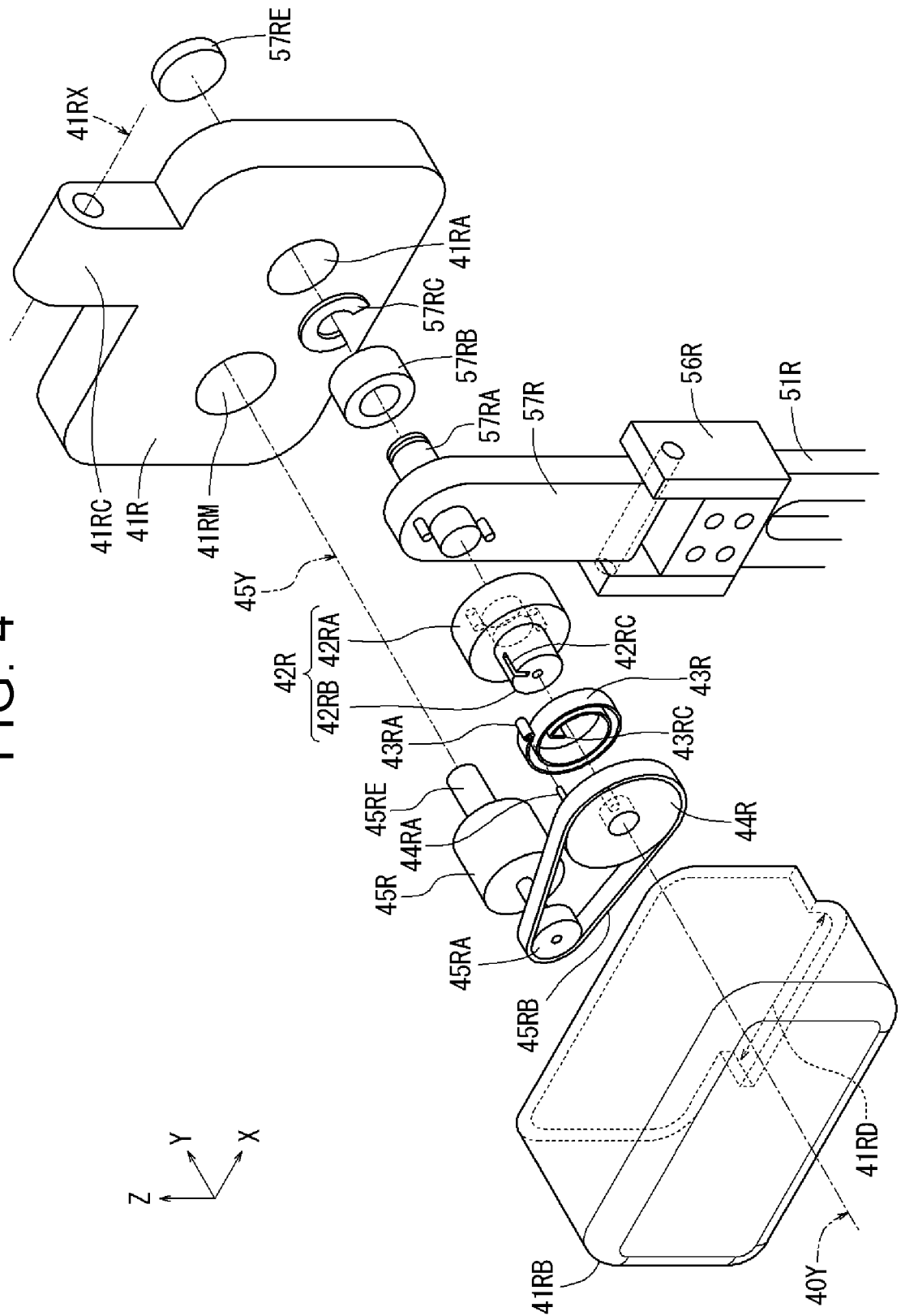
FIG. 4 is an exploded perspective view for explaining an example of the internal structure of the actuator unit.

Referring to FIGS. 3 and 4, the external appearance and internal structure of the actuator unit 4R will be described. FIG. 3 shows the external appearance of the (right-side) actuator unit 4R that is connected to the holding portion 32RC provided below the box 32RB shown in FIG. 2. Since the (left-side) actuator unit 4L (see FIG. 1) that is connected to a holding portion 32LC provided below the box 32LB is symmetrical with the actuator unit 4R, a description thereof will be omitted.

As shown in FIG. 3, the actuator unit 4R includes a torque generating portion 40R and a torque transmitting portion 50R. The torque generating portion 40R includes an actuator base portion 41R and a cover 41RB. Members housed in the cover 41RB will be described later.

The torque transmitting portion 50R includes a thigh arm 51R and a thigh wearing portion 52R. As shown in FIG. 4, the thigh arm 51R is connected to an assist arm 57R via a connecting portion 56R. The assist arm 57R is pivoted by a combined torque obtained by combining an assist torque generated by the actuator unit 4R and a user torque generated by the motion of the thigh of the user. As shown by alternate long and two short dashes lines in FIG. 3, the connecting portion 56R supports the thigh arm 51R such that the thigh arm 51R is pivotable relative to the assist arm 57R so as to open in the rightward direction. The assist arm 57R corresponds to an output link.

As shown in FIG. 3, the thigh wearing portion 52R includes an adjusting portion 52RA, a thigh base portion 52RB, a pad portion 52RC, belts 52RD, 52RE, and buckles 52RF, 52RG. The adjusting portion 52RA can adjust a distance L1 from the actuator base portion 41R to the thigh wearing portion 52R in accordance with the length of the thigh of the user. The thigh base portion 52RB and the pad portion 52RC are each formed by, for example, an elastic member.

Next, referring to FIG. 4, the members housed in the cover 41RB will be described. The cover 41RB houses the assist arm 57R having a shaft portion 57RA, a speed reducer 42R, a spiral spring 43R, a driven pulley 44R, a transmission belt 45RB, a drive pulley 45RA, an electric motor 45R (corresponding to an actuator), and so on. Although not shown, an arm pivot angle detection unit (a pivot angle sensor or the like) configured to detect a pivot angle of the assist arm 57R relative to the actuator base portion 41R is provided in the cover 41RB. The electric motor 45R is provided with a motor rotation angle detection unit 45RE that can detect a rotation angle of a motor shaft (corresponding to an output shaft). The motor rotation angle detection unit 45RE is, for example, an encoder or an angle sensor and outputs a detection signal corresponding to the rotation angle to a control device 61 (see FIG. 8).

The actuator base portion 41R is provided with a connecting portion 41RC, a pivot shaft support hole 41RA, a motor support hole 41RM, and so on. The connecting portion 41RC is connected to the holding portion 32RC (see FIG. 2) such that the actuator base portion 41R is pivotable relative to the holding portion 32RC about a pivot axis 41RX. A bearing 57RB is press-fitted into the pivot shaft support hole 41RA, while the shaft portion 57RA is press-fitted into the bearing 57RB. A coming-off preventing ring 57RC is fitted around a distal end portion, protruding from the bearing 57RB, of the shaft portion 57RA (see FIG. 5). Consequently, the assist arm 57R is supported so as to be pivotable relative to the actuator base portion 41R about a pivot axis 40Y. The assist arm 57R is connected to a first input/output portion 42RA of the speed reducer 42R and is caused to pivot together with the first input/output portion 42RA. A distal end of the shaft portion 57RA is provided with an output link pivot angle detection unit 57RE that detects a pivot angle of the assist arm 57R relative to the actuator base portion 41R. The output link pivot angle detection unit 57RE is, for example, an encoder or an angle sensor and outputs a detection signal corresponding to the pivot angle to the control device 61 (see FIG. 8). The bearing 57RB, the shaft portion 57RA, the speed reducer 42R, the spiral spring 43R, and the driven pulley 44R are disposed coaxially along the pivot axis 40Y.

The speed reducer 42R has a reduction ratio n. Thus, when the first input/output portion 42RA is caused to pivot by a pivot angle θ, the speed reducer 42R causes a second input/output portion 42RB to pivot by a pivot angle nθ. When the second input/output portion 42RB is caused to pivot by a pivot angle nθ, the speed reducer 42R causes the first input/output portion 42RA to pivot by a pivot angle θ. The second input/output portion 42RB of the speed reducer 42R is provided with a groove 42RC, while an inner end portion 43RC of the spiral spring 43R is fitted into the groove 42RC.

The spiral spring 43R stores the assist torque transmitted from the electric motor 45R and the user torque transmitted by the motion of the thigh of the user via the assist arm 57R and the speed reducer 42R, and as a result, the spiral spring 43R stores the combined torque obtained by combining the assist torque and the user torque. Then, the combined torque stored in the spiral spring 43R causes the thigh arm 51R to pivot via the speed reducer 42R and the assist arm 57R. The spiral spring 43R has a spring constant Ks and has a spiral shape with the inner end portion 43RC on the center side and with an outer end portion 43RA on the outer peripheral side. The inner end portion 43RC is fitted into the groove 42RC formed in the second input/output portion 42RB of the speed reducer 42R so as to be supported by the second input/output portion 42RB. A transmission shaft 44RA provided in the driven pulley 44R is fitted into the outer end portion 43RA so that the outer end portion 43RA is supported by the transmission shaft 44RA. The combined torque stored in the spiral spring 43R is calculated based on an angle change amount from a no-load state and the spring constant Ks. For example, the combined torque stored in the spiral spring 43R is calculated based on a pivot angle of the assist arm 57R (obtained by the arm pivot angle detection unit not shown), a rotation angle of the motor shaft of the electric motor 45R (obtained by the encoder not shown), and the spring constant Ks of the spiral spring 43R. Then, the user torque is extracted from the calculated combined torque, and the assist torque corresponding to the user torque is output from the electric motor 45R. Calculation of the angle change amount, calculation of the combined torque, extraction of the user torque, calculation of the assist torque, output of a control signal to the electric motor, and so on are performed by the control device housed in the box 31 (or the box 32RB, 32LB).

The driven pulley 44R is supported so as to be rotatable about the pivot axis 40Y. The transmission shaft 44RA protruding toward the spiral spring 43R is provided near an outer peripheral edge of the driven pulley 44R. The transmission shaft 44RA is fitted into the outer end portion 43RA of the spiral spring 43R so as to move the position of the outer end portion 43RA about the pivot axis 40Y. The driven pulley 44R is rotationally driven by the electric motor 45R via the transmission belt 45RB and the drive pulley 45RA. The driven pulley 44R rotationally driven by the electric motor 45R stores the assist torque in the spiral spring 43R via the transmission shaft 44RA.

The structure (FIG. 5) and operation (FIGS. 6 and 7) of a pivot mechanism and the structure of an opening angle imparting mechanism (FIG. 5) will be described. Referring to a sectional view shown in FIG. 5, details of the pivot mechanism configured to support the frame portion 30 such that the frame portion 30 is pivotable relative to the waist wearing portion 10 about the virtual pivot axis 15Y will be described. While the pivot mechanism including the pivot shaft portion 15R provided in the right waist wearing portion 11R will be described with reference to FIG. 5, a pivot mechanism including the pivot shaft portion 15L (see FIG. 2) provided in the left waist wearing portion 11L (see FIG. 2) is the same as that shown in FIG. 5 and therefore a description of the pivot mechanism including the pivot shaft portion 15L will be omitted.

Figure 6:
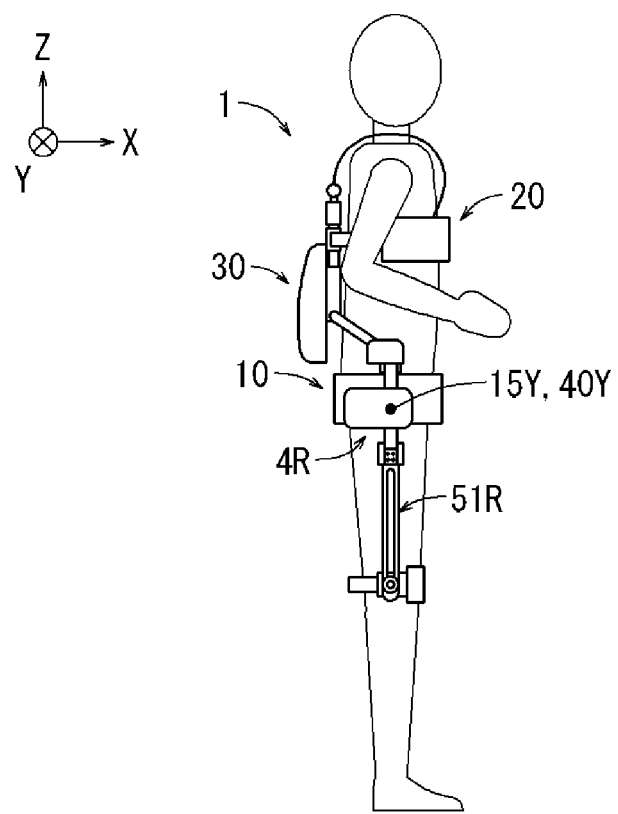
FIG. 6 is a diagram for explaining a state in which a user wearing the assist device stretches the back muscles.
Figure 7:
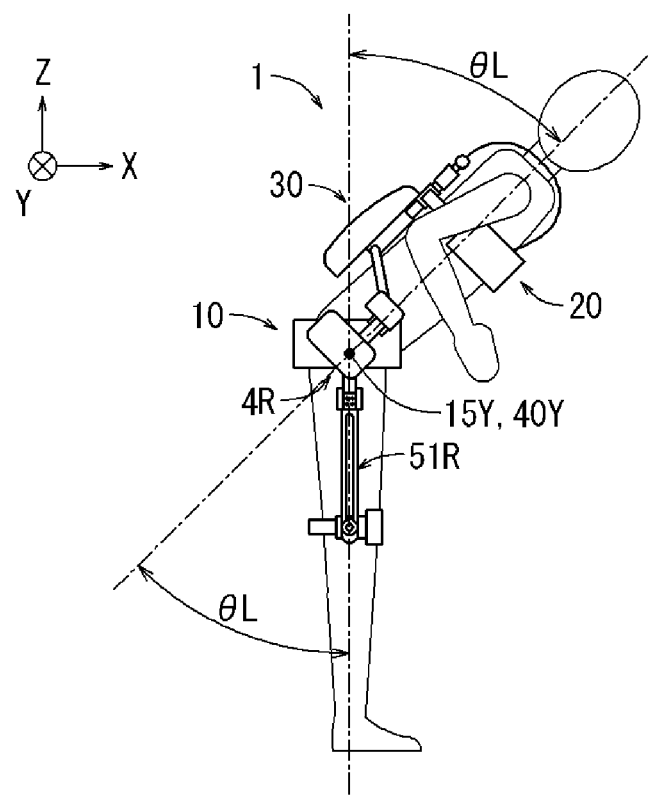
FIG. 7 is a diagram for explaining a state in which the user takes a forward-bent posture from the state shown in FIG. 6 so that a frame portion and an upper half body wearing portion are caused to pivot about the virtual pivot axis.

The pivot mechanism includes the pivot shaft portion 15R and a hole that is provided to extend through the pivotal portion 32R such that the pivot shaft portion 15R is fitted in the hole. The pivot shaft portion 15R is provided (fixed) at the position, where the virtual pivot axis 15Y crosses the waist base portion 12C of the right waist wearing portion 11R, so as to protrude outward from the right waist wearing portion 11R along the virtual pivot axis 15Y. The pivot shaft portion 15R is fitted into the hole in the lower part of the pivotal portion 32R of the frame portion 30 via a bearing 15RB. A coming-off preventing ring 15RC is fitted around a distal end portion, protruding from the bearing 15RB, of the pivot shaft portion 15R. While the pivot shaft portion 15R is fixed to the right waist wearing portion 11R and the hole is provided in the pivotal portion 32R in the description of this embodiment, the pivot shaft portion 15R may be fixed to the pivotal portion 32R and the hole may be provided in the right waist wearing portion 11R. By the pivot mechanism described above, as shown in FIGS. 6 and 7, the frame portion 30 (the frame portion 30 and the upper half body wearing portion 20) is caused to pivot relative to the waist wearing portion 10 about the virtual pivot axis 15Y in accordance with a motion of the user. As a result, as shown in FIGS. 6 and 7, for example, even when the posture of the user is changed from an upright posture to a forward-bent posture, the waist wearing portion 10 does not move from the position of the waist of the user in an up-down direction. Thus, the assist torque can be efficiently transmitted via the thigh arm 51R. When the inclination angle of the upper half of the body of the user with respect to the vertical direction shown in FIG. 7 is assumed to be a pivot angle (which is an actual link angle $θ_L$ and, in this case, corresponds to a posture angle), the pivot angle can be detected by the output link pivot angle detection unit 57RE (see FIG. 4).

Next, the opening angle imparting mechanism configured to cause the actuator unit 4R to pivot in the right-left direction relative to the frame portion 30 will be described. Hereinbelow, while the opening angle imparting mechanism will be described with respect to the actuator unit 4R that is attached to the right side of the waist wearing portion 10, an opening angle imparting mechanism for the actuator unit 4L (see FIG. 1) that is attached to the left side of the waist wearing portion 10 is the same as that for the actuator unit 4R and therefore a description of the opening angle imparting mechanism for the actuator unit 4L will be omitted. The opening angle imparting mechanism includes a first opening angle imparting mechanism formed by the holding portion 32RC and the connecting portion 41RC in FIG. 5 and a second opening angle imparting mechanism formed by the connecting portion 56R in FIG. 4.

In FIG. 5, the first opening angle imparting mechanism is formed by the holding portion 32RC provided below the box 32RB and the connecting portion 41RC provided in the actuator base portion 41R of the actuator unit 4R. The connecting portion 41RC is supported by the holding portion 32RC so as to be pivotable relative to the holding portion 32RC about the pivot axis 41RX extending in the front-rear direction. Therefore, the actuator unit 4R is pivotable relative to the waist wearing portion 10 about the pivot axis 41RX. By this pivoting, when, for example, the user opens the thigh to the right or left, a first opening angle as an angle formed between a longitudinal direction of the pivotal portion 32R and a longitudinal direction of the actuator base portion 41R in FIG. 5 changes. That is, the first opening angle imparting mechanism is a mechanism that opens the entirety of the actuator unit 4R (i.e., that causes the entire actuator unit 4R to pivot) in the right-left direction relative to the waist wearing portion 10, in other words, a mechanism that opens the entire actuator unit 4L (i.e., that causes the entire actuator unit 4L to pivot) in the right-left direction relative to the waist wearing portion 10.

In FIG. 4, the second opening angle imparting mechanism is formed by the connecting portion 56R connecting the assist arm 57R and the thigh arm 51R to each other. As shown in FIG. 3, the connecting portion 56R connects the thigh arm 51R to the assist arm 57R such that the thigh arm 51R is pivotable in the right-left direction relative to the assist arm 57R. By this pivoting, when, for example, the user opens the thigh to the right or left, a second opening angle as an angle formed between a longitudinal direction of the assist arm 57R and a longitudinal direction of the thigh arm 51R in FIG. 4 changes. That is, the second opening angle imparting mechanism is a mechanism that opens the thigh arm 51R (i.e., that causes the thigh arm 51R to pivot) in the right-left direction relative to the assist arm 57R, in other words, a mechanism that opens a left thigh arm (that causes the left thigh arm to pivot) in the right-left direction relative to a left assist arm. The allowable opening degrees (allowable opening angles) of the first opening angle imparting mechanism and the second opening angle imparting mechanism are adjustable so as to allow the user to make an outward rotation motion and an outward pivoting (outward moving) motion of the hip joint of the thigh of the user, and in addition, an inward rotation motion and an inward pivoting (inward moving) motion of the hip joint of the thigh of the user. Consequently, the thigh arm 51R can operate so as not to impede the motion of the user, and thus, the assist torque can be efficiently transmitted to the thigh.

The opening angle imparting mechanism may include both the first opening angle imparting mechanism and the second opening angle imparting mechanism or may include only one of them. When the opening angle imparting mechanism includes both the first opening angle imparting mechanism and the second opening angle imparting mechanism, the sum of the first opening angle and the second opening angle is an opening angle.

The pivot axis 40Y of the actuator unit 4R is set to coincide with the virtual pivot axis 15Y when the connecting portion 41RC and the actuator base portion 41R that are supported by the holding portion 32RC are parallel to the pivotal portion 32R (i.e. when the first opening angle is zero) as shown in FIG. 5. Therefore, in the state where the actuator base portion 41R is parallel to the pivotal portion 32R (the first opening angle is zero), no matter how the frame portion 30 is caused to pivot relative to the waist wearing portion 10 about the virtual pivot axis 15Y, the virtual pivot axis 15Y and the pivot axis 40Y are maintained to coincide with each other (see FIGS. 6 and 7). When, for example, the user opens the thighs to the right and left so as to stand firm for lifting up a heavy thing, there occurs at least one of pivoting of the actuator units 4R, 4L (see FIG. 1), including the thigh arm 51R and the left thigh arm, about the pivot axes 41RX, 41LX (see FIG. 1) and pivoting of the thigh arms to open to the right and left by the connecting portion 56R and a left connecting portion. In this way, the actuator units 4R, 4L are opened to the right and left following the thighs opened to the right and left. Accordingly, even in the state where the user opens the thighs to the right and left, it is possible to appropriately transmit assist torques to the thighs.

Figure 8:
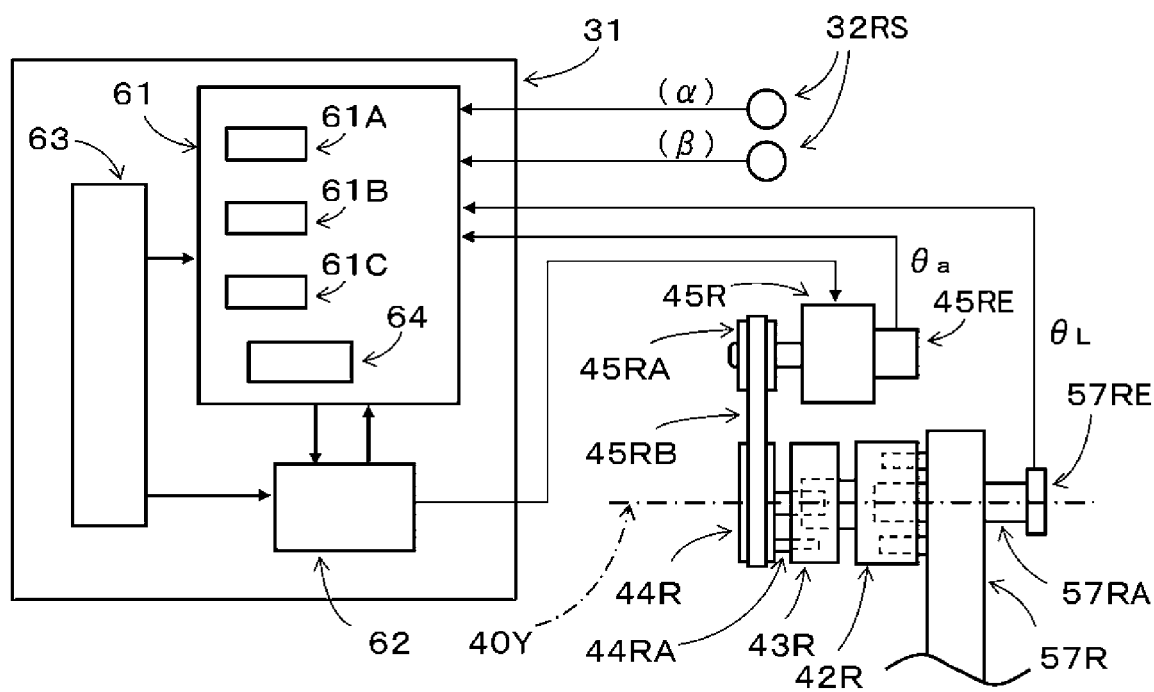
FIG. 8 is a diagram for explaining the input and output of a control device.

Referring to FIG. 8, the input and output of the control device 61 will be described. As shown in FIG. 8, the control device 61 is housed, for example, in the box 31. In the example shown in FIG. 8, the control device 61, a motor driver 62, a power supply unit 63, and so on are housed in the box 31. The control device 61 includes, for example, a CPU and a storage device (storing control programs, etc.). The control device 61 includes a torque determination unit 61A (a torque determination unit), a correction unit 61B (a correction unit), a pivot angle control unit 61C (a pivot angle control unit), and so on, which will be described later. The motor driver 62 is an electronic circuit that outputs a drive current for driving the electric motor 45R, based on a control signal from the control device 61. The power supply unit 63 is, for example, a lithium battery and supplies electric power to the control device 61 and the motor driver 62.

Input signals from the input portions 32RS, a detection signal from the motor rotation angle detection unit 45RE (a detection signal corresponding to an actual motor shaft angle $\theta_a$ of the electric motor 45R), a detection signal from the output link pivot angle detection unit 57RE (a detection signal corresponding to an actual link angle $\theta_L$ of the assist arm 57R), and so on are input to the control device 61. The control device 61 calculates a rotation angle of the electric motor 45R based on the input signals, and outputs a control signal corresponding to the calculated rotation angle to the motor driver 62. The input portions 32RS include, for example, a power supply switch configured to allow the user to provide instructions regarding the operation and stop of the control device 61, an adjustment dial configured to allow the user to set an assist multiplying factor $\alpha$ ($0<\alpha$), and an adjustment dial configured to allow the user to set a differential correction gain $\beta$ ($0 \le \beta$). The assist multiplying factor $\alpha$ and the differential correction gain p are determined based on an assist torque output and the spring constant Ks, and when a large assist torque is required, a large value (e.g. $\alpha > 1$) is set.

Next, the processing sequence of the control device 61 will be described using a flowchart shown in FIG. 10 and control blocks shown in FIG. 9. Processing shown in FIG. 10 is started at a predetermined time interval (e.g. an interval of several ms), and when the processing is started, the control device 61 proceeds to step SB100.

Step SB100 is processing for input signals. At step SB100, based on input signals from the input portions 32RS (see FIG. 5), the control device 61 determines and stores a current assist multiplying factor α and a current differential correction gain β. Further, the control device 61 stores an assist torque command value (torque variable type) $\tau_{a\_ref\_torq}(t)$ calculated at the last processing timing, as a last assist torque command value (torque variable type) $\tau_{a\_ref\_torq}(t-1)$ (corresponding to B26rtn in FIG. 9). Further, the control device 61 stores a motor shaft angle detected at the current processing timing, as an actual motor shaft angle $\theta_a(t)$ (corresponding to B41fb in FIG. 9).

Further, the control device 61 stores an actual link angle $\theta_L(t)$ calculated at the last processing timing, as a last actual link angle $\theta_L(t-1)$ and stores a pivot angle of the output link (the assist arm 57R) detected at the current processing timing, as an actual link angle $\theta_L(t)$. Then, the control device 61 calculates a link angle displacement amount $\Delta\theta_L$ as follows and stores it (corresponding to B11 out in FIG. 9).

Blocks B10 and B11 show virtual blocks for calculating $\Delta\theta_L$ that is output from block B11. A combined torque (t) calculated at the last processing timing is stored as a last combined torque (t-1). A current combined torque (t) that is input from block B43 can be calculated based on the actual motor shaft angle $\theta_a(t)$ of the electric motor 45R, the actual link angle $\theta_L(t)$ of the output link (the assist arm 57R), the spring constant Ks of the spiral spring 43R, the reduction ratio of the speed reducer 42R, the pulley ratio between the drive pulley 45RA and the driven pulley 44R, and so on. Then, the link angle displacement amount $\Delta\theta_L$ is calculated based on the calculated current combined torque (t), the last combined torque (t-1), a user torque $\tau_H$ from the user, the actual link angle $\theta_L$, and so on.

Figure 9:
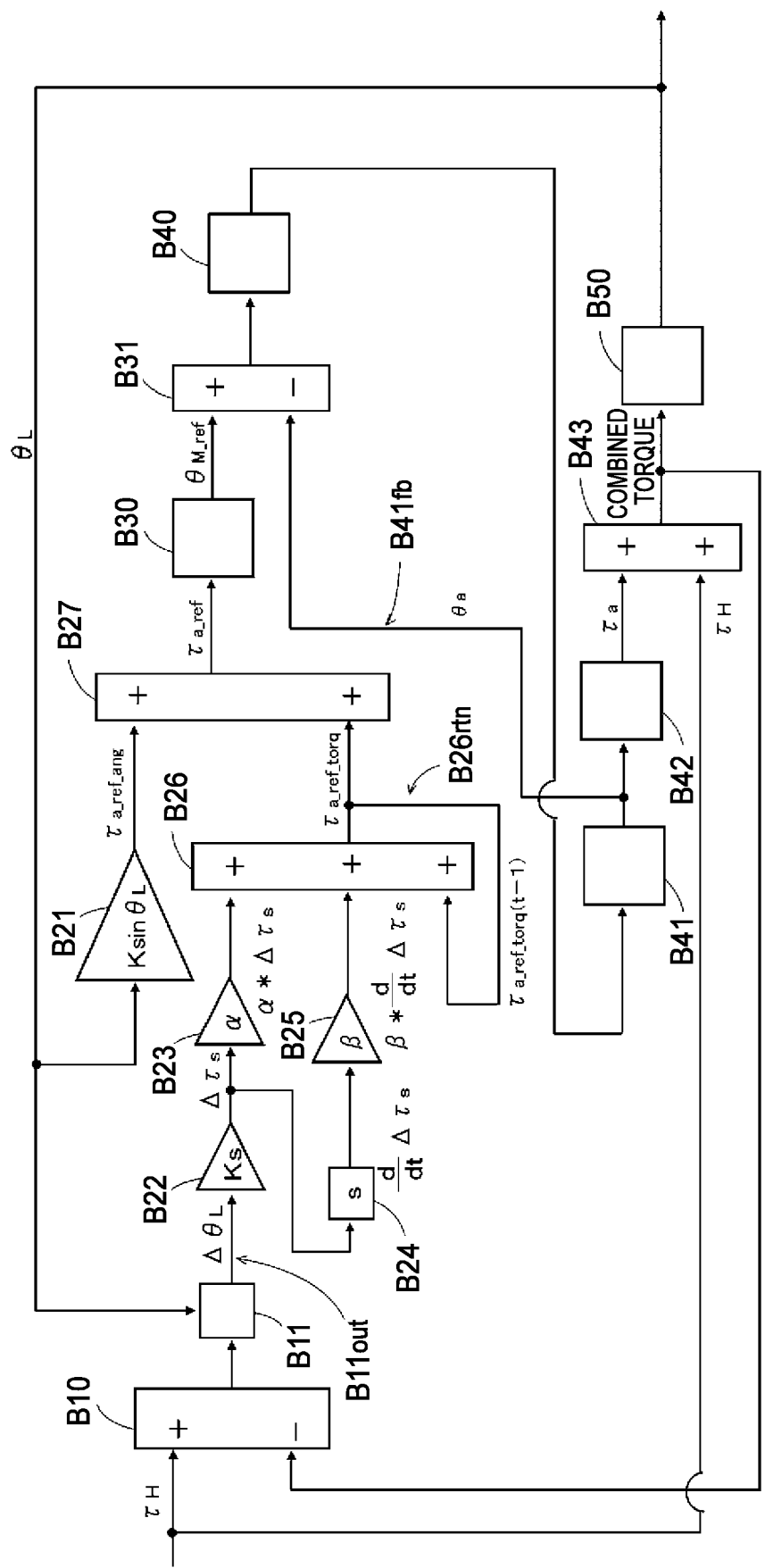
FIG. 9 is a control block diagram for the control device.
Figure 10:
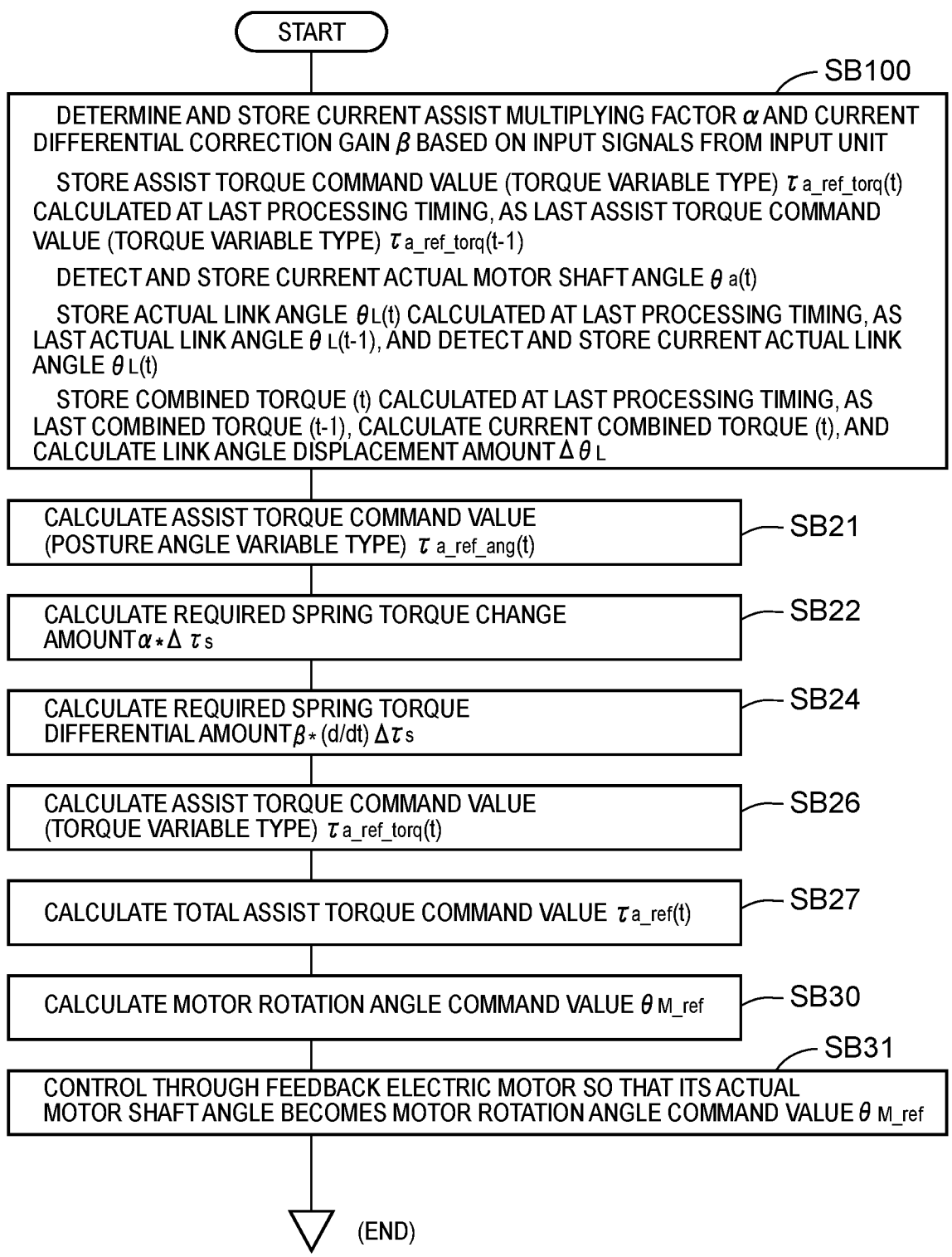
FIG. 10 is a flowchart for explaining a processing sequence based on the control block diagram shown in FIG. 9.

Processing from output B11out of block B11 to block B27 in the control blocks shown in FIG. 9 is processing of calculating a total assist torque command value $\tau_{a\_ref}(t)$ by the control device 61. As shown in FIG. 9, the total assist torque command value $\tau_{a\_ref}(t)$ is the sum of an assist torque command value (posture angle variable type) $\tau_{a\_ref\_ang}(t)$ that is output from block B21 and an assist torque command value (torque variable type) $\tau_{a\_ref\_torq}(t)$ that is output from block B26 (see Expression 1).

$$\tau_{a\_ref}(t) = \tau_{a\_ref\_torq}(t) + \tau_{a\_ref\_ang}(t) \quad \text{Expression 1}$$

First, processing of calculating the assist torque command value (posture angle variable type $\tau_{a\_ref\_ang}(t)$ assist torque be described. The processing of calculating the torque command value (posture angle variable type $\tau_{a\_ref\_ang}(t)$ is processing of step SB21 shown in FIG. 10 and corresponds to block B21 shown in FIG. 9. At step SB21, the control device 61 multiplies a preset posture correction gain K by $\sin \theta_L(t)$ that is based on the actual link angle $\theta_L(t)$, thereby calculating the assist torque command value (posture angle variable type) $\tau_{a\_ref\_ang}(t)$ (see Expression 2). The posture correction gain K is, for example, a value within a range of 0 to 10 ($0 \leq K \leq 10$) and is a gain (a constant) that is set in accordance with the required assist amount, the time interval of this processing (sampling time), the detection resolution of the output link pivot angle detection unit, the detection resolution of the motor rotation angle detection unit, the height and weight of the user, and so on.

$$\tau_{a\_ref\_ang}(t) = K^* \sin \theta_L(t) \quad \text{Expression 2}$$

Next, processing of calculating the assist torque command value (torque variable type) $\tau_{a\_ref\_torq}W$ will be described. The processing of calculating the assist torque command value (torque variable type $\tau_{a\_ref\_torq}W$ is processing of steps SB22 to SB26 shown in FIG. 10. The processing of step SB22 corresponds to blocks B22 and B23 shown in FIG. 9, the processing of step SB24 corresponds to blocks B24 and B25 shown in FIG. 9, and the processing of step SB26 corresponds to block B26 shown in FIG. 9. At step SB22, the control device 61 calculates a spring torque change amount $\Delta\tau_s$ based on the link angle displacement amount $\Delta\theta_L$ of the actual link angle and the spring constant Ks (Ks is the spring constant of the spiral spring 43R) (see Expression 3). Then, the control device 61 multiplies the spring torque change amount $\Delta\tau_s$ by the assist multiplying factor α (determined at step SB100), thereby calculating a required spring torque change amount $\alpha^*\Delta\tau_s$.

$$\Delta\tau_s = Ks^* \Delta\theta_L \quad \text{Expression 3}$$

At step SB24, the control device 61 calculates (d/dt) $\Delta\tau_s$ that is a differential value of the spring torque change amount $\Delta\tau_s$. Then, the control device 61 multiplies the spring torque change amount differential value (d/dt) $\Delta\tau_s$ by the differential correction gain β (determined at step SB100), thereby calculating a required spring torque differential amount $\beta^*(d/dt) \Delta\tau_s$ that is a differential correction amount.

At step SB26, the control device 61 obtains the sum of $\tau_{a\_ref\_torq}(t-1)$ stored at step SB100, $\alpha^*\Delta\tau_s$ calculated at step SB22, and $\beta^*(d/dt) \Delta\tau_s$ calculated at step SB24, thereby calculating the assist torque command value (torque variable type) $\tau_{a\_ref\_torq}(t)$ (see Expression 4).

$$\tau_{a\_ref\_torq}(t) = \tau_{a\_ref\_torq}(t-1) + \alpha^*\Delta\tau_s + \beta^*(d/dt)\Delta\tau_s \quad \text{Expression 4}$$

At step SB27, the control device 61 obtains the sum of $\tau_{a\_ref\_ang}(t)$ calculated at step SB21 and $\tau_{a\_ref\_torq}(t)$ calculated at step SB26, thereby calculating the total assist torque command value $\tau_{a\_ref}(t)$ (see Expression 5).

$$\tau_{a\_ref}(t) = \tau_{a\_ref\_torq}(t) + \tau_{a\_ref\_ang}(t) \quad \text{Expression 5}$$

Next, processing of calculating a motor rotation angle command value $\theta_{M\_ref}(t)$ will be described. The processing of calculating the motor rotation angle command value $\theta_{M\_ref}(t)$ is processing of step SB30 shown in FIG. 10 and corresponds to block B30 shown in FIG. 9. At step SB30, the control device 61 calculates the motor rotation angle command value $\theta_{M\_ref}(t)$ based on $\tau_{a\_ref}(t)$ calculated at step SB27. Assuming that Ks is the spring constant of the spiral spring 43R, that $\theta_L$ is a pivot angle of the output link (the assist arm 57R), and that when the first input/output portion 42RA of the speed reducer 42R is rotated by na, the second input/output portion 42RB of the speed reducer 42R is rotated by nb, Expression 6 described below is established. By rearranging the Expression 6, Expression 7 can be obtained.

$$\tau_{a\_ref} = na^* Ks^* [na^* \theta_L - (\theta_{M\_ref}/nb)] \quad \text{Expression 6}$$

$$\theta_{M\_ref} = [(na^2 * Ks^* \theta_L - \tau_{a\_ref})^* nb]/(na^* Ks) \quad \text{Expression 7}$$

Processing of step SB31 corresponds to blocks B31 and B40 shown in FIG. 9. At step SB31, the control device 61 controls through feedback the electric motor 45R so as to achieve the motor rotation angle command value $\theta_{M\_ref}$ calculated at step SB30. Block B41 shown in FIG. 9 corresponds to the electric motor 45R, and B41fb that is output from block B41 and input to block B31 corresponds to the actual motor shaft angle $\theta_a(t)$ of the electric motor 45R.

Torque of block B41 (the electric motor 45R) is input to block B43 as a total assist torque $\tau_a$ via block B42 (the drive pulley 45RA, the transmission belt 45RB, and the driven pulley 44R). The user torque $\tau_H$, which is torque input from the user itself, is also input to block B43. Block B43 corresponds to the spiral spring 43R. The spiral spring 43R is expanded or contracted in a circumferential direction of the spiral spring 43R by an angle corresponding to a combined torque obtained by combining the total assist torque $\tau_a$ input from the electric motor 45R and the user torque $\tau_H$ input from the user itself, so that the combined torque is stored. The combined torque can be calculated based on the actual motor shaft angle $\theta_a(t)$ of the electric motor 45R, the actual link angle $\theta_L(t)$ of the output link (the assist arm 57R), the spring constant Ks of the spiral spring 43R, the reduction ratio of the speed reducer 42R, and the pulley ratio between the drive pulley 45RA and the driven pulley 44R.

Then, the combined torque stored in block B43 (the spiral spring 43R) is transmitted (output) to the assist target body part (the thigh in this case) from block B50 (the speed reducer 42R and the assist arm 57R). The pivot angle of the assist arm 57R in block B50 becomes the actual link angle $\theta_L$.

At step SB100 in FIG. 10, the processing of calculating the combined torque corresponds to the torque determination unit 61A (the torque determination unit, see FIG. 8) that determines a combined torque obtained by a user torque and an assist torque from the output shaft (of the electric motor), the user torque being input from the output link (the assist arm 57R) when the user causes the assist target body part (in this case, the thigh or the upper half of the body) to pivot with the user's own force.

The correction unit 61B (the correction unit) shown in FIG. 8 corresponds to the following two kinds of correction ("posture correction" and "differential correction"). The posture correction is a process of calculating the assist torque command value (posture angle variable type) $\tau_{a\_ref\_ang}$, which is a (posture) correction amount for the determined combined torque, at step SB21 in FIG. 10. The differential correction is a process of calculating the required spring torque differential amount $\beta*(d/dt)\,\Delta\tau_s$, which is a (differential) correction amount for the determined combined torque, at step SB24 in FIG. 10. While the example having both the (posture) correction amount and the (differential) correction amount has been described in this embodiment, at least one of them may be calculated.

The pivot angle control unit 61C (the pivot angle control unit) shown in FIG. 8, which controls the pivot angle based on the combined torque and the correction amounts, corresponds to steps SB27 to SB31 in FIG. 10.

In the assist device 1 described above in this embodiment, for example, when the user bends the knees while taking a forward-bent posture, and lifts up a heavy thing at the user's feet, the (differential) correction amount that is the required spring torque differential amount $\beta*(d/dt)\,\Delta\tau_s$ effectively works when the user stands up slowly. Further, the (posture) correction amount that is the assist torque command value (posture angle variable type) $\tau_{a\_ref\_ang}$ effectively works in accordance with a forward-bending angle in the forward-bent posture. Therefore, it is possible to prevent a shortage of the assist torque by performing the appropriate correction.

Since the body wearing unit 2 (see FIG. 2) has the appropriate structure, the user can easily wear it. Further, the actuator unit 4R has the simple structure as shown in FIG. 4, and it is not necessary to attach biological signal detection sensors to the user. Further, the control of the actuator unit 4R by the control device 61 is also the simple control as described above with reference to FIGS. 9 and 10.

Various modifications, additions and deletions may be made to the structure, configuration, shape, external appearance, and so on of the assist device of the disclosure within the scope of the disclosure. For example, the processing sequence of the control device is not limited to the flowchart shown in FIG. 10. Further, while the example using the spiral spring 43R (see FIG. 4) has been described in this embodiment, a torsion spring (a torsion bar or a torsion-bar spring) may be used instead of the spiral spring.

While the example in which the connection and release of the belts are performed using the buckles has been described for the assist device 1 in this embodiment, the connection and release of the belts may be performed using members different from the buckles. Further, the upper half body wearing portion is not necessarily formed by both the shoulder belts and the chest wearing portions and may be formed by only one of them.

While the example in which the actuator units 4R, 4L are attached to the right and left sides of the body wearing unit has been described for the assist device 1 in this embodiment, the assist device may be configured such that only the actuator unit 4R is attached to the right side of the body wearing unit or the assist device may be configured such that only the actuator unit 4L is attached to the left side of the body wearing unit.

While the example in which the assist multiplying factor $\alpha$ and the differential correction gain $\beta$ are designated from the input portions 32RS has been described for the assist device 1 in this embodiment, a communication unit 64 (see FIG. 8) (configured to perform wireless or wired communication) may be provided in the control device 61, thereby allowing the user to set the assist multiplying factor $\alpha$ and the differential correction gain $\beta$ by communication from a smartphone or the like. Alternatively, a communication unit 64 (see FIG. 8) (configured to perform wireless or wired communication) may be provided in the control device 61, and various data may be collected by the control device 61 and transmitted to an analysis system at a predetermined timing (for example, constantly, or at a predetermined time interval, or after the end of assist operation). For example, the collected data include user information and assist information. The user information includes, for example, the user torque, user's posture, and so on, i.e. information about the user. The assist information includes, for example, the assist torque, rotation angle of the electric motor (the actuator) (actual motor shaft angle $\theta_a$ in FIG. 8), pivot angle of the output link (actual link angle $\theta_L$ in FIG. 8), assist multiplying factor $\alpha$, differential correction gain $\beta$, and so on, i.e. information about the input and output of the actuator unit. The analysis system is a system provided separately from the assist device and is, for example, an external embedded system, such as a personal computer, a server, a programmable logic controller (PLC), or a computerized numerical control (CNC) device, which is connected via a network (LAN). Optimal setting values (optimal values of assist multiplying factor $\alpha$, differential correction gain $\beta$, and so on) unique to the assist device 1 (i.e. unique to the user) may be analyzed (calculated) by the analysis system, and analysis information including the optimal setting values as analyzed results (calculated results) may be transmitted to the control device 61 (the communication unit 64) of the assist device 1. By analyzing the motion of the user, assist force, and so on using the analysis system, an optimal assist torque in consideration of the kind of work (repetition, lifting height, or the like) and the ability of the user can be output. Based on the analysis information (e.g. assist multiplying factor α and differential correction gain β) received from the analysis system, the actuator unit adjusts its own operation (e.g. changes the assist multiplying factor α and the differential correction gain β to the received assist multiplying factor α and differential correction gain β).

Hereinbelow, a second embodiment will be described. The overall structure of an assist device 1 according to the second embodiment is the same as the overall structure of the assist device according to the first embodiment described with reference to FIGS. 1 to 7. Therefore, the second embodiment will be described, focusing on different points between the second embodiment and the first embodiment.

Figure 11:
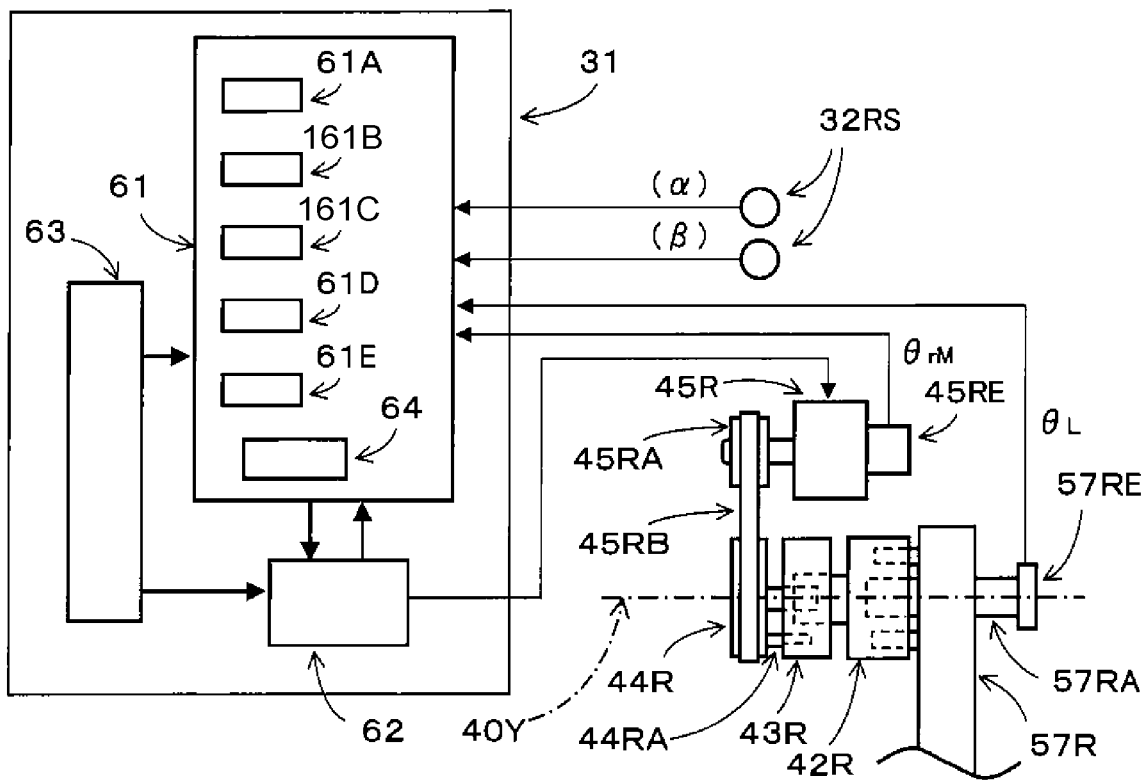
FIG. 11 is a diagram for explaining the input and output of a control device in a second embodiment.

Referring to FIG. 11, the input and output of a control device 61 will be described. As shown in FIG. 11, the control device 61 is housed, for example, in a box 31. In the example shown in FIG. 11, the control device 61, a motor driver 62, a power supply unit 63, and so on are housed in the box 31. The control device 61 includes, for example, a CPU and a storage device (storing control programs, etc.). The control device 61 includes a torque determination unit 61A (a torque determination unit), a motion kind determination unit 161B (a motion kind determination unit), an assist torque calculation unit 161C (an assist torque calculation unit), a correction unit 61D (a correction unit), a pivot angle control unit 61E (a pivot angle control unit), a communication unit 64, and so on, which will be described later. The motor driver 62 is an electronic circuit that outputs a drive current for driving an electric motor 45R, based on a control signal from the control device 61. The power supply unit 63 is, for example, a lithium battery and supplies electric power to the control device 61 and the motor driver 62. The operation and so on of the communication unit 64 will be described later.

Input signals from input portions 32RS, a detection signal from a motor rotation angle detection unit 45RE (a detection signal corresponding to an actual motor shaft angle $\theta_{rM}$ of the electric motor 45R), a detection signal from an output link pivot angle detection unit 57RE (a detection signal corresponding to an actual link angle $\theta_L$ of an assist arm 57R), and so on are input to the control device 61. The control device 61 calculates a rotation angle of the electric motor 45R based on the input signals and outputs a control signal corresponding to the calculated rotation angle, to the motor driver 62. The input portions 32RS include, for example, a power supply switch configured to allow a user to provide instructions regarding the operation and stop of the control device 61, an adjustment dial configured to allow the user to set an assist multiplying factor α (0<α), and an adjustment dial configured to allow the user to set a differential correction gain β (0≤β). The assist multiplying factor α and the differential correction gain β are determined based on an assist torque output and a spring constant, and when a large assist torque is required, a large value (e.g. α>1) is set.

The motor rotation angle detection unit 45RE, the output link pivot angle detection unit 57RE, and a spiral spring 43R correspond to a torque detection unit that outputs torque-related signals about the combined torque obtained by combining the user torque and the assist torque. A detection signal from the motor rotation angle detection unit 45RE (a detection signal corresponding to a rotation angle of a motor shaft of the electric motor 45R), and a detection signal from the output link pivot angle detection unit 57RE (a detection signal corresponding to a pivot angle of the assist arm 57R) correspond to the torque-related signals.

Figure 12:
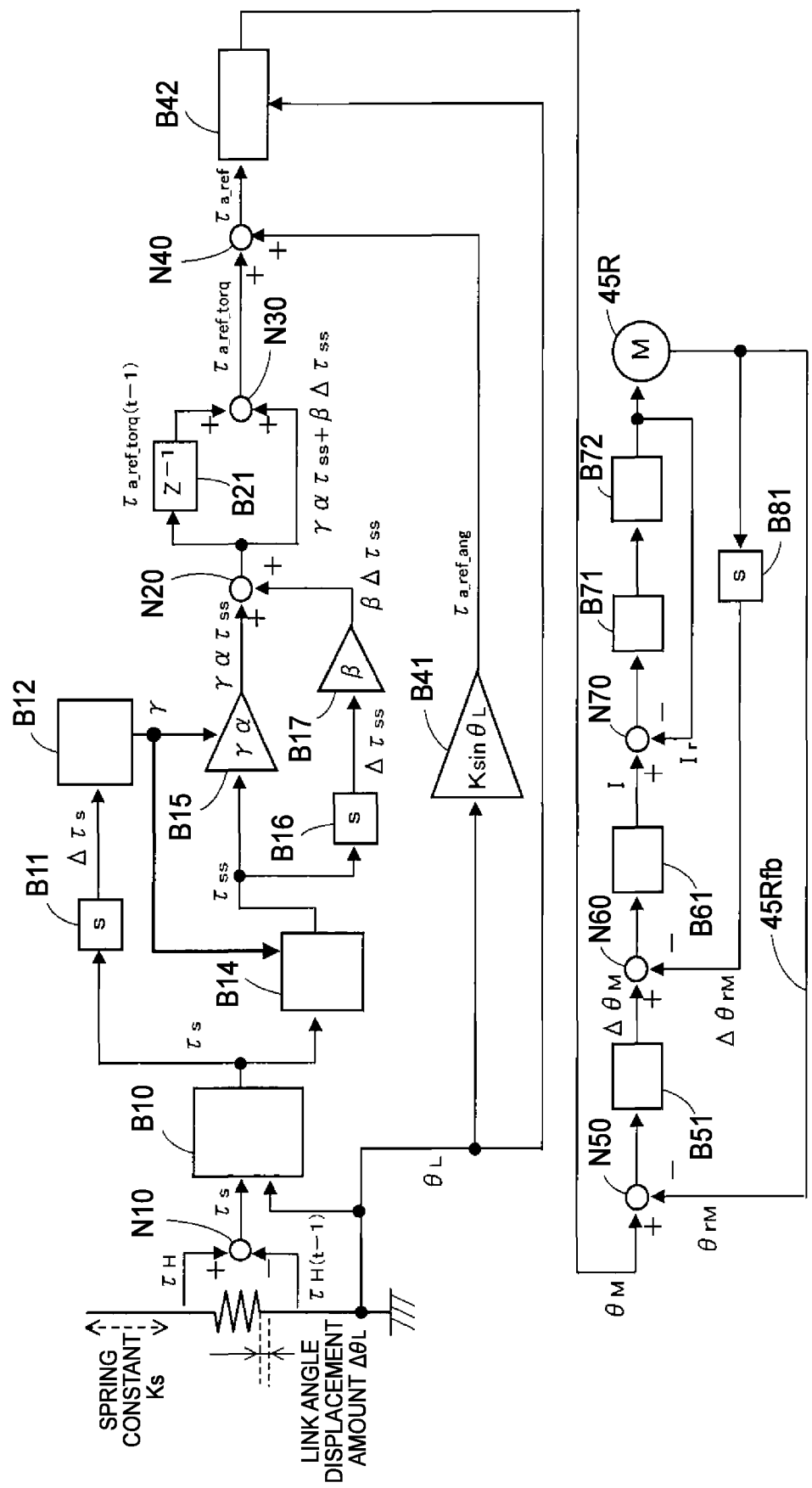
FIG. 12 is a control block diagram for the control device in a case where the kind of motion is "object lift-up/lift-down" or "moving object laterally"
Figure 13:
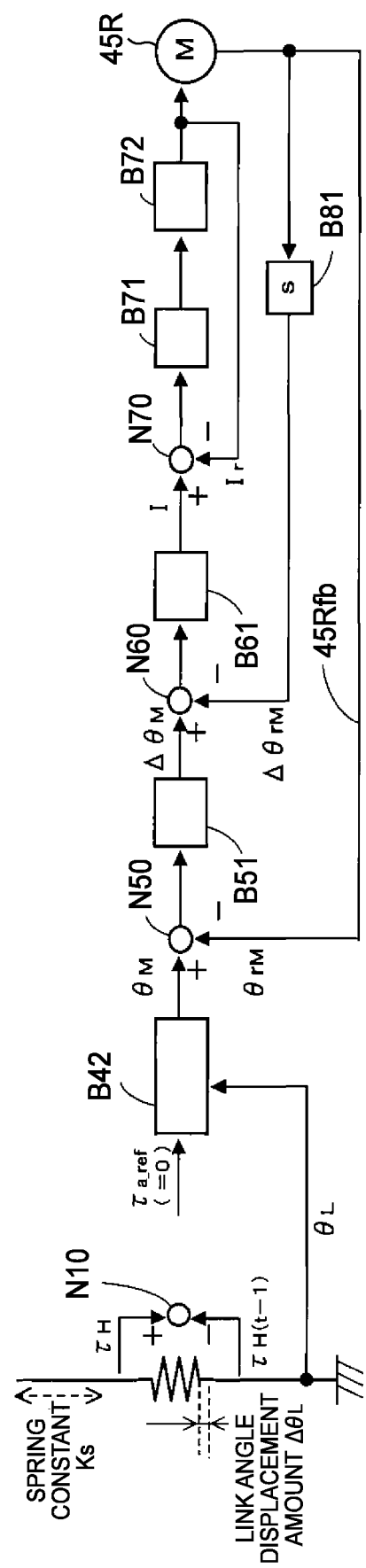
FIG. 13 is a control block diagram for the control device in a case where the kind of motion is "walking"
Figure 14:
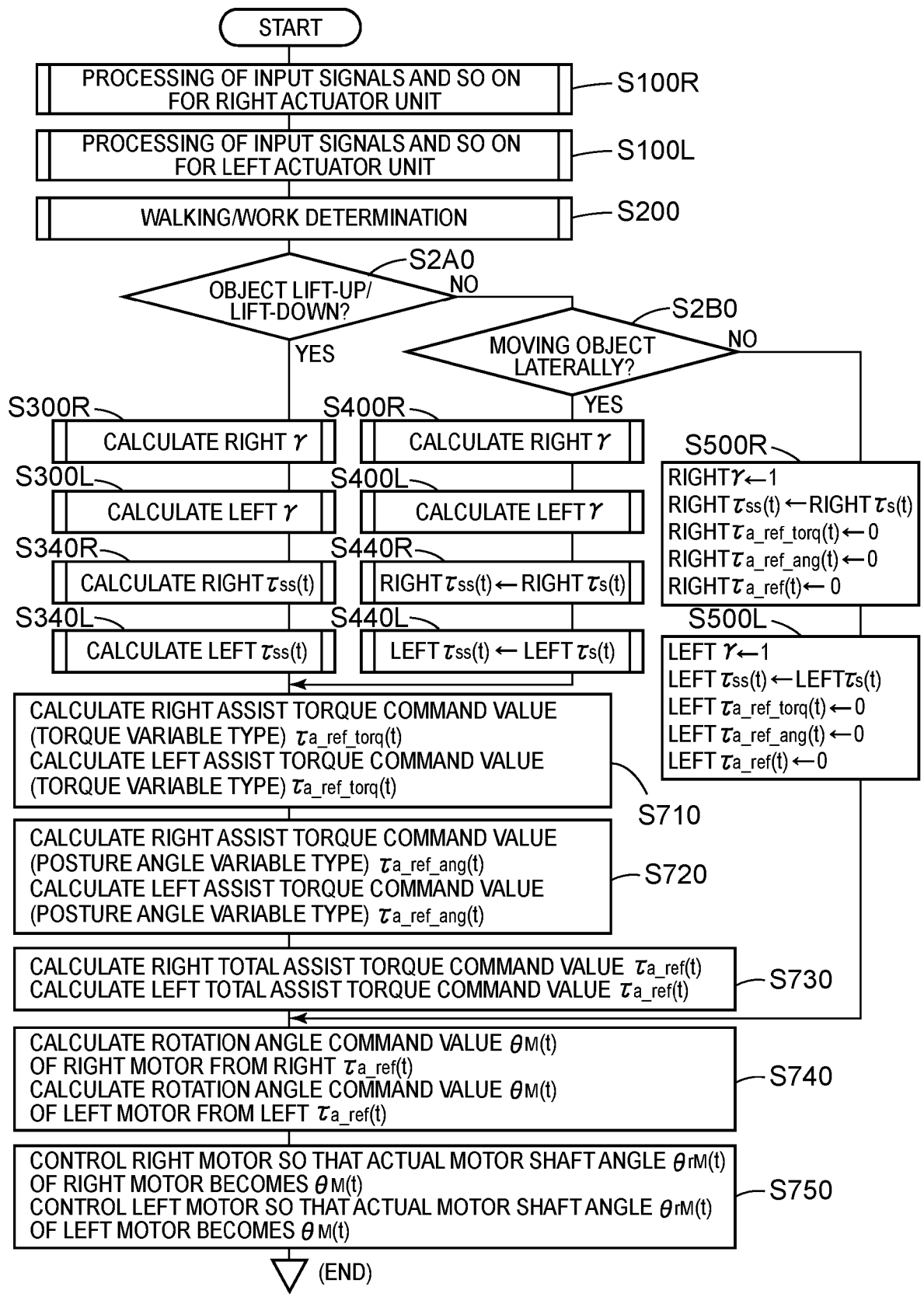
FIG. 14 is a flowchart for explaining the entirety of a processing sequence based on the control block diagrams shown in FIGS. 12 and 13.

Control blocks (FIGS. 12 and 13) and the processing sequence of the control device 61 (FIG. 14) will be described. The processing sequence of the control device 61 will be described using a flowchart shown in FIG. 14 and the control blocks shown in FIGS. 12 and 13. The control blocks shown in FIG. 12 are control blocks when the result of walking/work determination is "object lift-up/lift-down" or "moving object laterally" at step S200 in FIG. 14. The control blocks shown in FIG. 13 are control blocks when the result of walking/work determination is "walking" at step S200 in FIG. 14. The control blocks shown in FIGS. 12 and 13 are blocks for controlling a (right) actuator unit 4R (see FIG. 1). Since blocks for controlling a (left) actuator unit 4L (see FIG. 1) are the same control blocks as those shown in FIGS. 12 and 13, an illustration thereof is omitted. The flowchart shown in FIG. 14 shows the processing sequence of controlling the (right) actuator unit 4R and the (left) actuator unit 4L. Processing shown in FIG. 14 is started at a predetermined time interval (e.g. an interval of several ms), and when the processing is started, the control device 61 proceeds to step S100R.

At step S100R in FIG. 14, the control device 61 performs processing of input signals and so on for the (right) actuator unit 4R and proceeds to step S100L. At step S100L, the control device 61 performs processing of input signals and so on for the (left) actuator unit 4L and proceeds to step S200. The processing of steps S100R and S100L will be described in detail later. The processing of step S100R, S100L corresponds to processing of node N10 in FIG. 12. The control device 61 performing the processing of step S100R, S100L functions as a torque determination unit (the torque determination unit 61A shown in FIG. 11) that determines related torque information including the combined torque and the user torque based on the torque-related signals (the detection signal corresponding to the rotation angle of the motor shaft of the electric motor 45R and the detection signal corresponding to the pivot angle of the assist arm 57R) from the torque detection unit.

At step S200 in FIG. 14, the control device 61 determines the kind of motion of the user based on the determined related torque information and proceeds to step S2A0. While details of the processing of step S200 will be described later, the determined kind of motion is "walking", "object lift-up/lift-down", or "moving object laterally". "Walking" is a walking motion of the user, "object lift-up/lift-down" is a motion in which the user lifts up a heavy thing (heavy object) or a motion in which the user lowers a heavy thing held by the user, and "moving object laterally" is a motion in which the user holds and moves a heavy thing from the right to the left or from the left to the right. The processing of step S200 corresponds to processing of block B10 in FIG. 12. The control device 61 performing the processing of step S200 functions as a motion kind determination unit (the motion kind determination unit 161B shown in FIG. 11) that determines the kind of motion of the user based on the determined related torque information.

At step S2A0 in FIG. 14, the control device 61 determines whether the determined kind of motion is "object lift-up/lift-down", and when it is "object lift-up/lift-down" (Yes), the control device 61 proceeds to step S300R, while when it is not "object lift-up/lift-down" (No), the control device 61 proceeds to step S2B0. When the control device 61 proceeds to step S2B0, the control device 61 determines whether the determined kind of motion is "moving object laterally", and when it is "moving object laterally" (Yes), the control device 61 proceeds to step S400R, while when it is not "moving object laterally" (No), the control device 61 proceeds to step S500R.

Steps S300R, S300L, S340R, and S340L in FIG. 14 are processing when the kind of motion is "object lift-up/lift-down". When the control device 61 proceeds to step S300R, the control device 61 calculates (right) γ and proceeds to step S300L. The control device 61 calculates (left) γ at step S300L and proceeds to step S340R. Details of calculation of (right) γ and calculation of (left) γ will be described later. (Right) γ is a gain (coefficient) for correcting the magnitude of the assist torque of the (right) actuator unit. Likewise, (left) γ is a gain (coefficient) for correcting the magnitude of the assist torque of the (left) actuator unit. The calculation of (right) γ, (left) γ corresponds to processing of blocks B11 and B12 in FIG. 12.

At step S340R, the control device 61 calculates (right) $\tau_{ss}(t)$ and proceeds to step S340L. The control device 61 calculates (left) $\tau_{ss}(t)$ at step S340L and proceeds to step S710. Details of calculation of (right) $\tau_{ss}(t)$ and calculation of (left) $\tau_{ss}(t)$ will be described later. (Right) $\tau_{ss}(t)$ is for making correction so as to shorten the time until the assist torque of the (right) actuator unit reaches its peak (to advance the phase), while (left) $\tau_{ss}(t)$ is for making correction so as to shorten the time until the assist torque of the (left) actuator unit reaches its peak (to advance the phase). The calculation of (right) $\tau_{ss}(t)$, (left) $\tau_{ss}(t)$ corresponds to processing of block B14 in FIG. 12.

Steps S400R, S400L, S440R, and S440L in FIG. 14 are processing when the kind of motion is "moving object laterally". When the control device 61 proceeds to step S400R, the control device 61 calculates (right) γ and proceeds to step S400L. The control device 61 calculates (left) γ at step S400L and proceeds to step S440R. Calculation of (right) γ and calculation of (left) γ are the same as steps S300R and S300L, details of which will be described later. Then, at step S440R, the control device 61 substitutes (right) $\tau_s(t)$ for (right) $\tau_{ss}(t)$ and stores it, and then at step S440L, the control device 61 substitutes (left) $\tau_s(t)$ for (left) $\tau_{ss}(t)$ and stores it, and proceeds to step S710.

Steps S500R and S500L in FIG. 14 are processing when the kind of motion is "walking". In this embodiment, a description will be provided on an example in which an assist torque is generated by the control blocks shown in FIG. 12 in the case of "object lift-up/lift-down" or "moving object laterally", while, in the case of "walking", control is performed by the control blocks shown in FIG. 13 such that an assist torque is not generated ($\tau_{a\_ref}=0$). In the case of "walking", the control device 61 controls the rotation angle of the electric motor 45R in accordance with a pivot angle of the assist arm 57R such that the spiral spring 43R is not expanded or contracted.

When the control device 61 proceeds to step S500R, the control device 61 substitutes 1 for (right) γ and stores it, and substitutes (right) $\tau_s(t)$ for (right) $\tau_{ss}(t)$ and stores it. Further, the control device 61 substitutes zero for (right) $\tau_{a\_ref\_torq}(t)$, (right) $\tau_{a\_ref\_ang}(t)$, and (right) $\tau_{a\_ref}(t)$ and stores them, and proceeds to step S500L. At step S500L, the control device 61 substitutes 1 for (left) γ and stores it, and substitutes (left) $\tau_s(t)$ for (left) $\tau_{ss}(t)$ and stores it. Further, the control device 61 substitutes zero for (left) $\tau_{a\_ref\_torq}(t)$, (left) $\tau_{a\_ref\_ang}(t)$, and (left) $\tau_{a\_ref}(t)$ and stores them, and proceeds to step S740.

At step S710 in FIG. 14, the control device 61 calculates a (right) assist torque command value (torque variable type) $\tau_{a\_ref\_torq}(t)$ using Expression 1 (described below) in the second embodiment, and stores it, and calculates a (left) assist torque command value (torque variable type) $\tau_{a\_ref\_torq}(t)$ using Expression 2 described below and stores it. Then, the control device 61 proceeds to step S720. The processing of step S710 corresponds to processing of blocks B15, B16, and B17, node N20, block B21, and node N30 in FIG. 12. Expressions 1 to 21 that will be described hereinbelow mean Expressions 1 to 21 in the second embodiment.

$$(\text{right})\tau_{a\_ref\_torq}(t) = (\text{right})\tau_{a\_ref\_torq}(t-1) + (\text{right})\gamma^* \alpha^* (\text{right})\tau_{ss}(t) + \beta^*(\text{right})\Delta\tau_{ss}(t) \quad \text{Expression 1}$$

$$(\text{left})\tau_{a\_ref\_torq}(t) = (\text{left})\tau_{a\_ref\_torq}(t-1) + (\text{left})\gamma^* \alpha^* (\text{left})\tau_{ss}(t) + \beta^*(\text{left})\Delta\tau_{ss}(t) \quad \text{Expression 2}$$

(right) $\tau_{a\_ref\_torq}(t)$: (right) assist torque command value (torque variable type)
(left) $\tau_{a\_ref\_torq}(t)$: (left) assist torque command value (torque variable type)
(right) γ: (right) torque correction gain
(left) γ: (left) torque correction gain
α: (right/left) assist multiplying factor
β: (right/left) differential correction gain
(right) $\tau_{ss}(t)$: (right) torque change amount (after phase correction)
(left) $\tau_{ss}(t)$: (left) torque change amount (after phase correction)

At step S720 in FIG. 14, the control device 61 calculates a (right) assist torque command value (posture angle variable type) $\tau_{a\_ref\_ang}(t)$ using Expression 3 described below and stores it, and calculates a (left) assist torque command value (posture angle variable type) $\tau_{a\_ref\_ang}(t)$ using Expression 4 described below and stores it. Then, the control device 61 proceeds to step S730. The processing of step S720 corresponds to processing of block B41 in FIG. 12. A posture correction gain K is, for example, a value within a range of 0 to 10 (0≤K≤10) and is a gain (a constant) that is set in accordance with the required assist amount, the time interval of this processing (sampling time), the detection resolution of the output link pivot angle detection unit, the detection resolution of the motor rotation angle detection unit, the height and weight of the user, and so on.

$$(\text{right})\tau_{a\_ref\_ang}(t) = K^* \sin(\text{right})\theta_L(t) \quad \text{Expression 3}$$

$$(\text{left})\tau_{a\_ref\_ang}(t) = K^* \sin(\text{left})\theta_L(t) \quad \text{Expression 4}$$

(right) $\tau_{a\_ref\_ang}(t)$: (right) assist torque command value (posture angle variable type)
(left) $\tau_{a\_ref\_ang}(t)$: (left) assist torque command value (posture angle variable type)
K: (right/left) posture correction gain
(right) $\theta_L(t)$: (right) actual link angle
(left) $\theta_L(t)$: (left) actual link angle At step S730 in FIG. 14, the control device 61 calculates a (right) total assist torque command value $\tau_{a\_ref}(t)$ using Expression 5 described below and stores it, and calculates a (left) total assist torque command value $\tau_{a\_ref}(t)$ using Expression 6 described below and stores it. Then, the control device 61 proceeds to step S740. The processing of step S730 corresponds to processing of node N40 in FIG. 12.

$$(\text{right})\tau_{a\_ref}(t) = (\text{right})\tau_{a\_ref\_torq}(t) + (\text{right})\tau_{a\_ref\_ang}(t) \quad \text{Expression 5}$$

$$(\text{left})_{a\_ref}(t) = (\text{left})\tau_{a\_ref\_torq}(t) + (\text{left})\tau_{a\_ref\_ang}(t) \quad \text{Expression 6}$$

(right) $\tau_{a\_ref}(t)$: (right) total assist torque command value
(left) $\tau_{a\_ref}(t)$ (left) total assist torque command value The control device 61 performing the processing from steps S2A0 and S2B0 to step S730 described above functions as an assist torque calculation unit (the assist torque calculation unit 161C shown in FIG. 11) that calculates an assist torque based on the determined related torque information, and as a correction unit (the correction unit 61D shown in FIG. 11) that corrects the calculated assist torque based on the determined kind of motion.

At step S740 in FIG. 14, the control device 61 calculates a (right) motor rotation angle command value $\theta_M(t)$ from (right) $\tau_{ara}(t)$ using Expression 8 obtained by rearranging Expression 7 described below, and stores it, and calculates a (left) motor rotation angle command value $\theta_M(t)$ from (left) $\tau_{a\_ref}(t)$ using Expression 10 obtained by rearranging Expression 9 described below, and stores it. Then, the control device 61 proceeds to step S750. The processing of step S740 corresponds to processing of block B42 in FIG. 12.

$$(\text{right})\tau_{a\_ref}(t)=na*Ks*[na*(\text{right})\theta_L(t)-((\text{right})\theta_M(t)/nb)] \quad \text{Expression 7}$$

$$(\text{right})\theta_M(t)=[(na^2*Ks*(\text{right})\theta_L(t)-(\text{right})\tau_{a\_ref}(t)*nb]/(na*Ks) \quad \text{Expression 8}$$

$$(\text{left})\tau_{a\_ref}(t)=na*Ks*[na*(\text{left})\theta_L(t)-((\text{left})\theta_M(t)/nb)] \quad \text{Expression 9}$$

$$(\text{left})\theta_M(t)=[(na^2*Ks*(\text{left})\theta_L(t)-(\text{left})\tau_{a\_ref}(t))*nb]/(na*Ks) \quad \text{Expression 10}$$

Ks: spring constant of the spiral spring 43R
(right) $\theta_M(t)$: (right) motor rotation angle command value
(left) $\theta_M(t)$: (left) motor rotation angle command value
na and nb: when a first input/output portion 42RA of a speed reducer 42R is rotated by na, a second input/output portion 42RB of the speed reducer 42R is rotated by nb.

At step S750 in FIG. 14, the control device 61 controls the (right) electric motor 45R so that (right) $\theta_{rM}(t)$ as an actual motor shaft angle of the (right) electric motor 45R becomes (right) $\theta_M(t)$, and controls a (left) electric motor so that (left) $\theta_{rM}(t)$ as an actual motor shaft angle of the (left) electric motor becomes (left) $\theta_M(t)$. Then, the control device 61 ends the processing. The control device 61 performing the processing of steps S740 and S750 described above functions as a pivot angle control unit (the pivot angle control unit 61E shown in FIG. 11) that controls the pivot angle (rotation angle) of the output shaft of each electric motor based on the assist torque corrected by the correction unit. The processing of step S750 corresponds to processing of node N50, block B51, node N60, blocks B61 and B81, node N70, and blocks B71 and B72 in FIG. 12. The processing of step S750 is feedback control performed such that when a rotation angle command value is converted into a command current and the command current is output by converting it into a PWM-output duty cycle, proportional integral derivative (PID) control is performed based on a deviation between the command value and an actual value. Since this control is the same as the existing control, a description thereof will be omitted.

Figure 15:
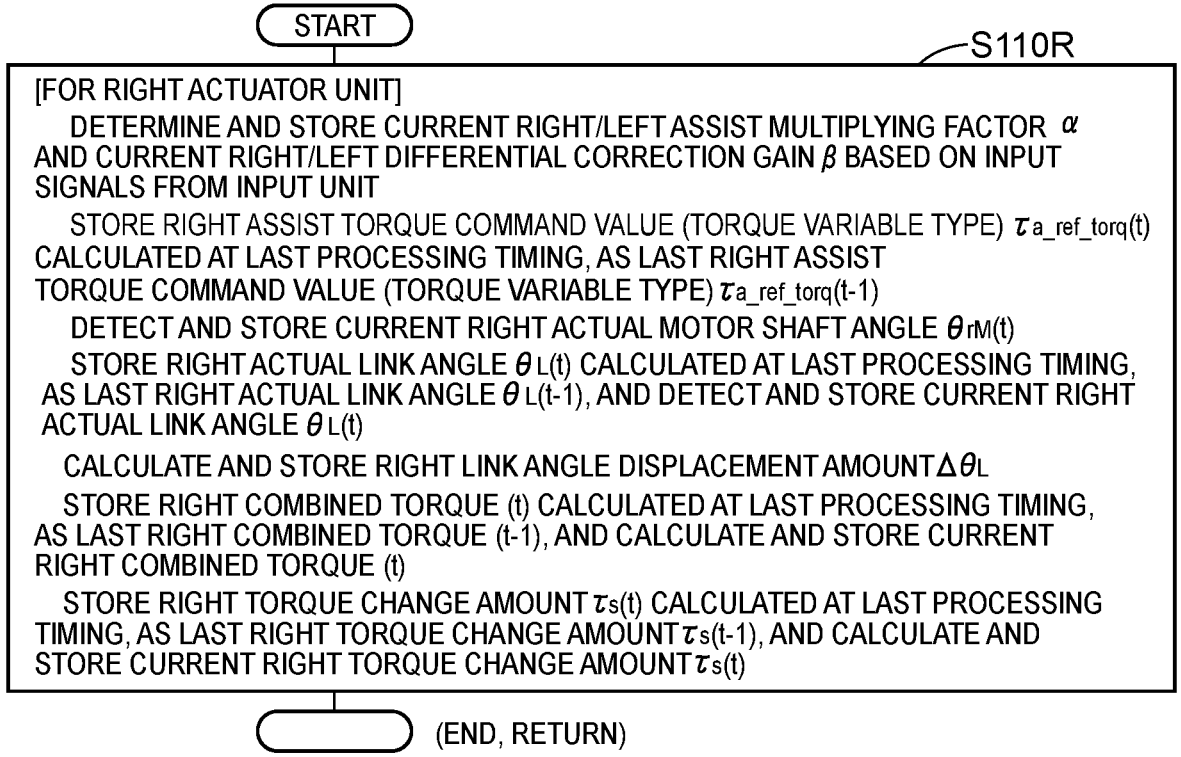
FIG. 15 is a flowchart for explaining details of "PROCESSING OF INPUT SIGNALS AND SO ON FOR RIGHT ACTUATOR UNIT" in the flowchart shown in FIG. 14.

FIG. 15 shows processing of step S110R, which is details of the processing of step S100R (processing of input signals and so on for the (right) actuator unit 4R) (see FIG. 14). As shown in FIG. 15, at step S110R, based on input signals from the input portions 32RS (see FIG. 5), the control device 61 determines and stores a current (right/left) assist multiplying factor α and a current (right/left) differential correction gain β. The assist multiplying factor α and differential correction gain β are used commonly for the right and left actuator units.

Further, the control device 61 stores a (right) assist torque command value (torque variable type) $\tau_{a\_ref\_torq}(t)$ calculated at the last processing timing, as a last (right) assist torque command value (torque variable type) $\tau_{a\_ref\_torq}(t-1)$. Further, the control device 61 stores a (right) motor shaft angle detected at the current processing timing, as a (right) actual motor shaft angle $\theta_{rM}(t)$.

Further, the control device 61 stores a (right) actual link angle $\theta_L(t)$, calculated at the last processing timing, as a last (right) actual link angle $\theta_L(t-1)$ and stores a pivot angle of the output link (the assist arm 57R) detected at the current processing timing, as a (right) actual link angle $\theta_L(t)$. Then, the control device 61 calculates a (right) link angle displacement amount $\Delta\theta_L(t)$ using Expression 11 described below and stores it.

$$(\text{right})\Delta\theta_L(t)=(\text{right})\theta_L(t)-(\text{right})\theta_L(t-1) \quad \text{Expression 11}$$

(right)$\theta_L(t)$: (right) actual link angle
(right)$\Delta\theta_L(t)$: (right) link angle displacement amount Further, the control device 61 stores a (right) combined torque (t) calculated at the last processing timing, as a last (right) combined torque (t−1), calculates a current (right) combined torque (t) using Expression 12 provided below with the use of the spring constant Ks of the spiral spring 43R (see FIG. 4), the current (right) actual link angle $\theta_L(t)$, and the current (right) actual motor shaft angle $\theta_{rM}(t)$, and stores it. The combined torque can be calculated based on the actual motor shaft angle $\theta_{rM}(t)$ of the electric motor 45R, the actual link angle $\theta_L(t)$ of the output link (the assist arm 57R), the spring constant Ks of the spiral spring 43R, the reduction ratio of the speed reducer 42R, and the pulley ratio between a drive pulley 45RA and a driven pulley 44R.

$$(\text{right})\text{combined torque}(t)=Ks*(\text{expanded/contracted amount of the spiral spring 43}R) \quad \text{Expression 12}$$

Further, the control device 61 stores a (right) torque change amount $\tau_s(t)$ calculated at the last processing timing, as a last (right) torque change amount $\tau_s(t-1)$, calculates a current (right) torque change amount $\tau_s(t)$ using Expression 13 described below, and stores it.

$$(\text{right})\tau_s(t)=Ks*(\text{right})\Delta\theta_L(t) \quad \text{Expression 13}$$

(right)$\tau_s(t)$: (right) torque change amount

Figure 16:
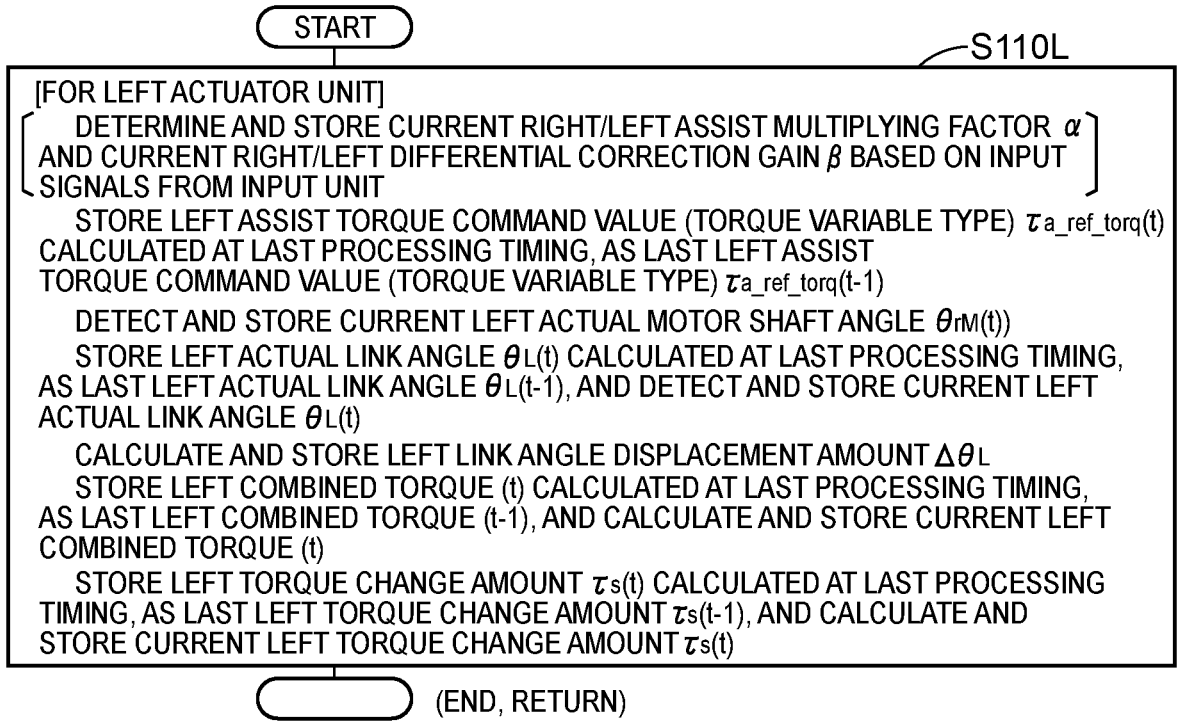
FIG. 16 is a flowchart for explaining details of "PROCESSING OF INPUT SIGNALS AND SO ON FOR LEFT ACTUATOR UNIT" in the flowchart shown in FIG. 14.

Step S100L (see FIG. 14) in FIG. 16 is processing that is performed subsequently to step S100R, and is processing of input signals and so on for the (left) actuator unit 4L. FIG. 16 shows processing of step S110L, which is details of the processing of step S100L (processing of input signals and so on for the (left) actuator unit 4L). Since the processing of step S110L is the same as step S100R that is the processing of input signals and so on for the (right) actuator unit 4R, a description thereof will be omitted.

Figure 17:
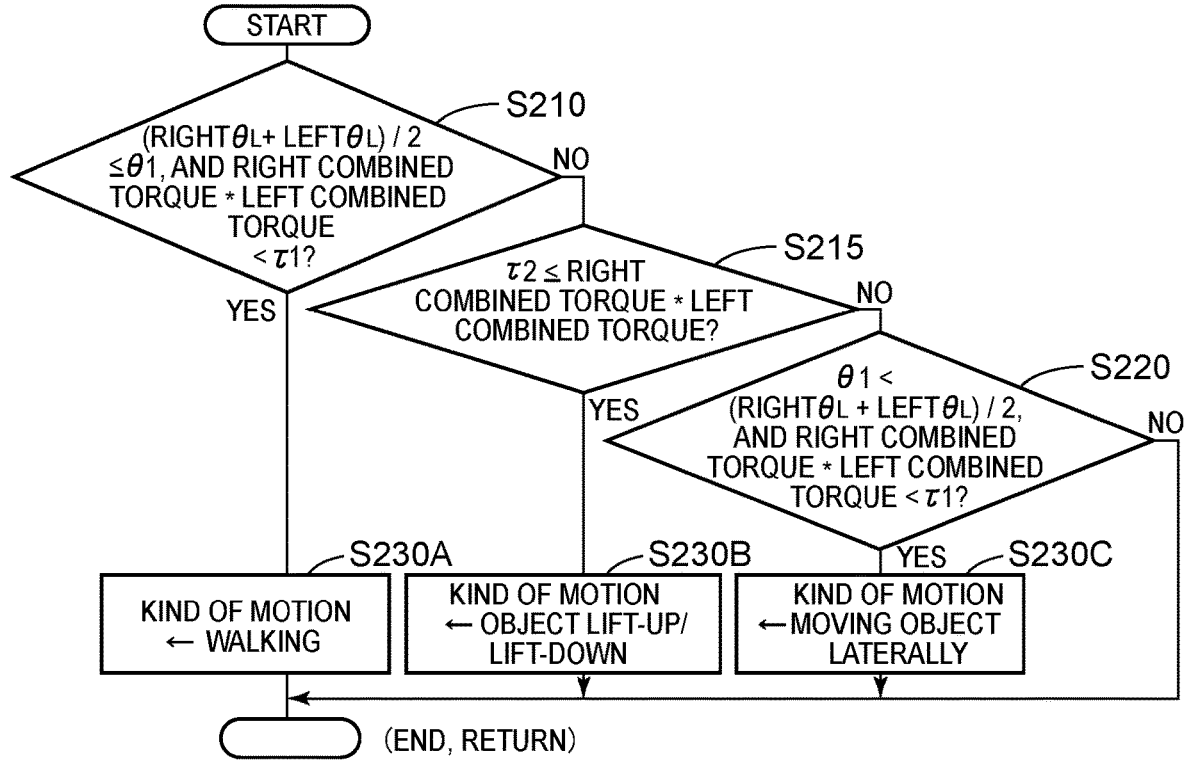
FIG. 17 is a flowchart for explaining details of "WALKING/WORK DETERMINATION" in the flowchart shown in FIG. 14.

Step S200 (see FIG. 14) in FIG. 17 is processing of determining the kind of motion of the user, i.e. processing of determining which of "walking", "object lift-up/lift-down", and "moving object laterally (moving an object from the right to the left (or from the left to the right))" the motion of the user is. FIG. 17 shows processing of steps S210 to S230C, which is details of the processing of step S200 (walking/work determination).

At step S210 (see FIG. 17), the control device 61 determines whether [(right) $\theta_L(t)$+(left) $\theta_L(t)$]/2 is less than or equal to a preset first angle threshold value $\theta1$, and further, (right) combined torque (t)*(left) combined torque (t) is less than a preset first torque threshold value $\tau1$. If affirmative (Yes), the control device 61 determines that the motion of the user is "walking", and proceeds to step S230A, while if negative (No), the control device 61 proceeds to step S215.

When the control device 61 proceeds to step S215, the control device 61 determines whether (right) combined torque (t)*(left) combined torque (t) is greater than or equal to a preset second torque threshold value $\tau2$. When it is greater than or equal to the second torque threshold value τ2 (Yes), the control device 61 determines that the motion of the user is "object lift-up/lift-down", and proceeds to step S230B, while when it is not greater than or equal to (i.e., it is less than) the second torque threshold value τ2 (No), the control device 61 proceeds to step S220.

When the control device 61 proceeds to step S220, the control device 61 determines whether [(right) θ_L(t)+(left) θ_L(t)]/2 is greater than the preset first angle threshold value θ1, and further, (right) combined torque (t)*(left) combined torque (t) is less than the preset first torque threshold value τ1. If affirmative (Yes), the control device 61 determines that the motion of the user is "moving object laterally", and proceeds to step S230C, while if negative (No), the control device 61 ends the processing.

When the control device 61 proceeds to step S230A, the control device 61 stores "walking" as the kind of motion and ends the processing. When the control device 61 proceeds to step S230B, the control device 61 stores "object lift-up/lift-down" as the kind of motion and ends the processing. When the control device 61 proceeds to step S230C, the control device 61 stores "moving object laterally" as the kind of motion and ends the processing.

Figure 18:
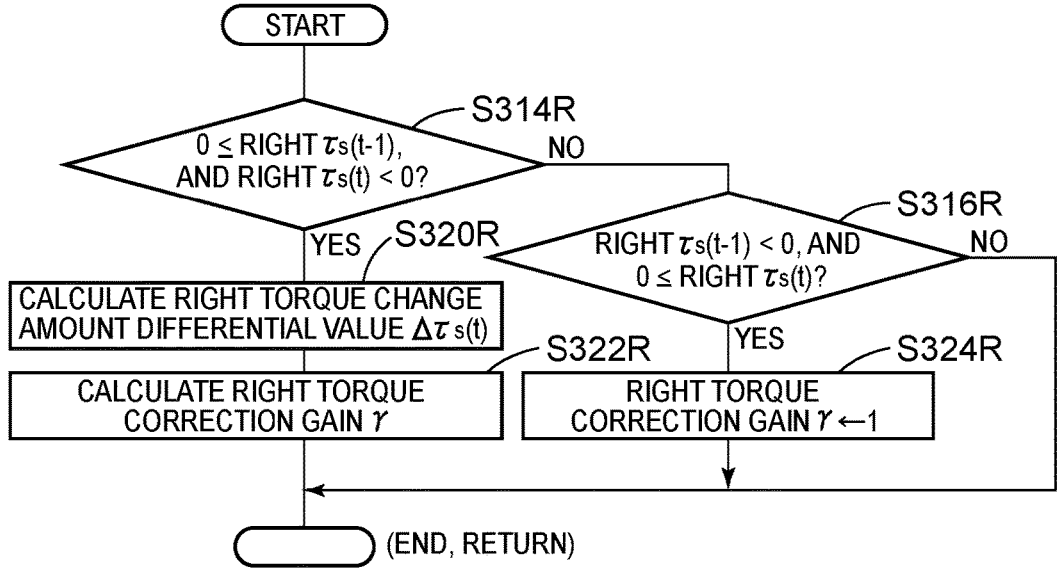
FIG. 18 is a flowchart for explaining details of "CALCULATE RIGHT γ" in the flowchart shown in FIG. 14.

Step S300R (see FIG. 14) in FIG. 18 corresponds to the processing of blocks B11 and B12 shown in FIG. 12 and is processing of calculating γ that will be used in block B15. FIG. 18 shows processing of steps S314R to S324R, which is details of the processing of step S300R (CALCULATE RIGHT γ). While step S300R is the processing for the (right) actuator unit, step S300L is the processing for the (left) actuator unit. Since step S300L is the same as step S300R, a description of the processing of step S300L will be omitted.

At step S314R (see FIG. 18), the control device 61 determines whether (right) $\tau_s(t-1)$ is greater than or equal to zero, and further, (right) $\tau_s(t)$ is less than zero. This determination determines whether a current point of time is Q1 at which the assist torque changes from positive to negative in FIG. 20 having the abscissa axis representing time and the ordinate axis representing the assist torque, and showing an example of an object lift-up motion. If affirmative (Yes), the control device 61 proceeds to step S320R, while if negative (No), the control device 61 proceeds to step S316R.

[LIFT-UP REFERENCE MOTION] shown in FIG. 20 shows an example of a reference motion set in advance for an object lift-up motion. FIG. 20 shows a state of change in assist torque (of the reference motion) with the passage of time in a case where the user, from an upright posture, bends the waist and lays hands on an object at the user's feet in a preset first reference time Ta1 and then lifts up the object and takes an upright posture in the first reference time Ta1. "+ side (positive side) assist torque" represents torque that assists a motion of bending the waist forward, while "− side (negative side) assist torque" represents torque that assists a motion of stretching the forward-bent waist. [CASE IN WHICH CYCLE IS LONG AND ASSIST TORQUE BEFORE CORRECTION IS SMALL AS COMPARED TO LIFT-UP REFERENCE MOTION] shown in FIG. 20 shows an example when the motion of the user is slower than preset [LIFT-UP REFERENCE MOTION], and further, the assist torque before correction is smaller than the assist torque in [LIFT-UP REFERENCE MOTION].

When the control device 61 proceeds to step S316R, the control device 61 determines whether (right) $\tau_s(t-1)$ is less than zero, and further, (right) $\tau_s(t)$ is greater than or equal to zero. This determination determines whether a current point of time is Q2 at which the assist torque changes from negative to positive in FIG. 20. If affirmative (Yes), the control device 61 proceeds to step S324R, while if negative (No), the control device 61 ends the processing.

When the control device 61 proceeds to step S320R (in the case of the position of Q1 in FIG. 20), the control device 61 calculates a (right) torque change amount differential value $\Delta\tau_s(t)$ using Expression 14 described below and stores it, and proceeds to step S322R.

(right)$\Delta\tau_s(t)$=(right)$\tau_s(t)$−(right)$\tau_s(t-1)$      Expression 14

At step S322R, the control device 61 calculates a (right) torque correction gain γ using Expression 15 described below and stores it, and ends the processing. A (right) torque correction gain γ may be calculated using Expression 16 described below, and stored. In Expression 15, (right) $\Delta\tau_{s,max}$ is an inclination, at the position of Q1, of a graph of $\tau_s(t)$ corresponding to [LIFT-UP REFERENCE MOTION] shown in FIG. 20. In Expression 15, (right) $\Delta\tau_s$ is an inclination, at the position of Q1, of a graph of $\tau_s(t)$ corresponding to an actual motion of the user. In Expression 16, (d/dt) (right) $\Delta\theta_{L,max}$ is a differential value of (right) $\Delta\theta_L$ at the position of Q1 corresponding to [LIFT-UP REFERENCE MOTION] shown in FIG. 20. In Expression 16, (d/dt) (right) $\Delta\theta_L$ is a differential value of (right) $\Delta\theta_L$ at the position of Q1 corresponding to an actual motion of the user.

(right)γ=√((right)$\Delta\tau_{s,max}$/(right)$\Delta\tau_s$)      Expression 15

(right)γ=√[((d/dt)(right)$\Delta\theta_{L,max}$)/((d/dt)(right)$\Delta\theta_L$)]      Expression 16

(Right) γ is a gain for making correction such that, in [CASE IN WHICH CYCLE IS LONG AND ASSIST TORQUE BEFORE CORRECTION IS SMALL AS COMPARED TO LIFT-UP REFERENCE MOTION] shown in FIG. 20, an assist torque maximum value (P) before correction from time tb1 to time tb2 becomes an assist torque maximum value ($P_{base}$) in [LIFT-UP REFERENCE MOTION].

When the control device 61 proceeds to step S324R (in the case of the position of Q2 in FIG. 20), the control device 61 substitutes 1 for (right) γ and stores it, and ends the processing. When the value of (right) γ is 1, correction of an assist torque maximum value is not performed.

Using (right) γ calculated by the sequence described above, assist torque amount correction for correcting the magnitude of the assist torque is performed from time tb1 to time tb2, i.e. during a lift-up period of time from the start of lift-up until the completion of lift-up, in [CASE IN WHICH CYCLE IS LONG AND ASSIST TORQUE BEFORE CORRECTION IS SMALL AS COMPARED TO LIFT-UP REFERENCE MOTION] shown in FIG. 20. When this assist torque amount correction is performed, the value of (right) γ changes depending on the inclination of (right) $\tau_s(t)$ at the position of Q1 as shown by Expression 15 or Expression 16. The inclination of (right) $\tau_s(t)$ at the position of Q1 changes in accordance with the length of the lift-up period of time such that when the length of the lift-up period of time is short, the inclination of (right) $\tau_s(t)$ at the position of Q1 becomes large, while when the length of the lift-up period of time is long, the inclination of (right) $\tau_s(t)$ at the position of Q1 becomes small. Accordingly, the rate of increase caused by the assist torque amount correction is adjusted by changing of the value of (right) γ in accordance with the length of the lift-up period of time. Specifically, when the actual lift-up period of time is longer than the lift-up period of time (Ta1) in the reference motion shown in FIG. 20, (right) γ>1 so that the assist torque is increased. On the other hand, when the actual lift-up period of time is shorter than the lift-up period of time (Ta1) in the reference motion shown in FIG. 20, (right) γ<1 so that the assist torque is reduced. Consequently, regardless of the length of the actual lift-up period of time, the assist torque maximum value in the lift-up period of time becomes the assist torque maximum value ($P_{base}$) in the lift-up period of time in the reference motion of FIG. 20.

Figure 19:
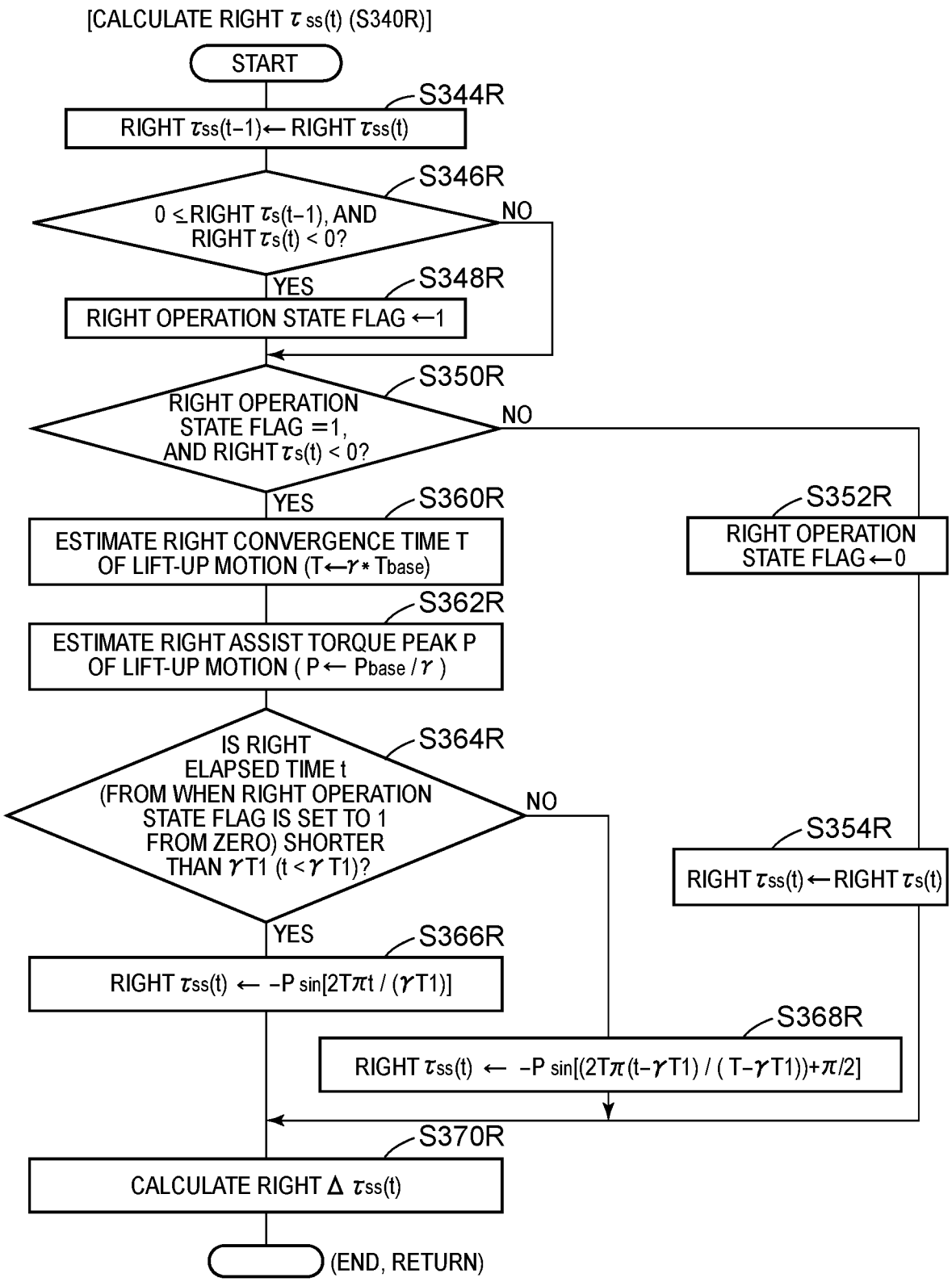
FIG. 19 is a flowchart for explaining details of "CALCULATE RIGHT $\tau_{ss}(t)$" in the flowchart shown in FIG. 14.

Step S340R (see FIG. 14) in FIG. 19 corresponds to the processing of block B14 shown in FIG. 12 and is processing of calculating a (right) torque change amount $\tau_{ss}(t)$ that will be used thereafter. FIG. 19 shows processing of steps S344R to S370R, which is details of the processing of step S340R (CALCULATE RIGHT $\tau_{ss}(t)$). While step S340R is the processing for the (right) actuator unit, step S340L is the processing for the (left) actuator unit. Since step S340L is the same as step S340R, a description of the processing of step S340L will be omitted.

At step S344R (see FIG. 19), the control device 61 substitutes (right) $\tau_{ss}(t)$ for (right) $\tau_{ss}(t-1)$ and stores (right) $\tau_{ss}(t-1)$.

At step S346R, the control device 61 determines whether (right) $\tau_s(t-1)$ is greater than or equal to zero, and further, (right) $\tau_s(t)$ is less than zero (negative). This determination determines whether a current point of time is Q1 at which the assist torque changes from positive to negative in FIG. 21 showing an example of an object lift-up motion. If affirmative (Yes), the control device 61 proceeds to step S348R, while if negative (No), the control device 61 proceeds to step S350R.

When the control device 61 proceeds to step S348R, the control device 61 substitutes 1 for a (right) operation state flag and stores it, and proceeds to step S350R.

When the control device 61 proceeds to step S350R, the control device 61 determines whether the (right) operation state flag is 1, and further, (right) $\tau_{ss}(t)$ is less than zero (negative). This determination determines whether a current point of time is in a "lift-up period of time" in which the assist torque is in a negative state in FIG. 21 having the abscissa axis representing time and the ordinate axis representing the assist torque, and showing an example of an object lift-up motion. If affirmative (Yes), the control device 61 proceeds to step S360R, while if negative (No), the control device 61 proceeds to step S352R.

[LIFT-UP REFERENCE MOTION] shown in FIG. 21 shows, like [LIFT-UP REFERENCE MOTION] shown in FIG. 20, an example of a reference motion set in advance for an object lift-up motion. FIG. 21 shows a state of change in assist torque with the passage of time in a case where the user, from an upright posture, bends the waist and lays hands on an object at the user's feet in a preset first reference time Ta1 and then lifts up the object and takes an upright posture in the first reference time Ta1. "+ side (positive side) assist torque" represents torque that assists a motion of bending the waist forward, while "− side (negative side) assist torque" represents torque that assists a motion of stretching the forward-bent waist. [CASE IN WHICH CYCLE IS LONG AND ASSIST TORQUE BEFORE CORRECTION IS SMALL AS COMPARED TO LIFT-UP REFERENCE MOTION] shown in FIG. 21 shows an example when the motion of the user is slower than preset [LIFT-UP REFERENCE MOTION], and further, the assist torque before correction is smaller than the assist torque in [LIFT-UP REFERENCE MOTION].

When the control device 61 proceeds to step S352R (in the case of a period of time from the position of Q2 to the position of Q1 in FIG. 21), the control device 61 substitutes zero for the (right) operation state flag and stores it, and proceeds to step S354R. Then, at step S354R, the control device 61 substitutes (right) $\tau_s(t)$ for (right) $\tau_{ss}(t)$ and stores it, and proceeds to step S370R.

When the control device 61 proceeds to step S360R (in the case of a lift-up period of time from the position of Q1 to the position of Q2 in FIG. 21), the control device 61 calculates (estimates) a (right) convergence time T of a lift-up motion of the user using Expression 17 described below and stores it, and proceeds to step S362R. $T_{base}$ is the length of "LIFT-UP PERIOD OF TIME" shown in [LIFT-UP REFERENCE MOTION] of FIG. 21 that is the preset reference motion for the lift-up motion. The (right) convergence time T represents a time from when the user holds an object and starts lift-up of the object until the completion of lift-up of the object, while $T_{base}$ represents a time from the start of lift-up of an object until the completion of lift-up of the object in the reference motion.

$$(\text{right})T=(\text{right})\gamma * T_{base} \qquad \text{Expression 17}$$

(right) T: estimated time ((right) convergence time) from when the user actually starts lift-up of an object until the completion of lift-up of the object $T_{base}$: time from the start of lift-up of an object until the completion of lift-up of the object in the reference motion (=lift-up period of time in the reference motion)

At step S362R, the control device 61 calculates (estimates) a (right) assist torque peak value P in the lift-up period of time of the user using Expression 18 described below and stores it, and proceeds to step S364R. $P_{base}$ is a maximum value of the magnitude of the assist torque in "LIFT-UP PERIOD OF TIME" shown in [LIFT-UP REFERENCE MOTION] of FIG. 21.

$$(\text{right})P=P_{base}/(\text{right})\gamma \qquad \text{Expression 18}$$

(right) P: maximum value (estimated maximum value) of the assist torque in an actual lift-up period of time of the user
$P_{base}$: maximum value of the assist torque in a lift-up period of time in the reference motion At step S364R, the control device 61 determines whether a (right) elapsed time t from when the (right) operation state flag is set to 1 from 0 is shorter than a value ($\gamma T1$) obtained by multiplying a preset peak reaching reference time T1 by (right) γ. If affirmative (Yes), the control device 61 proceeds to step S366R, while if negative (No), the control device 61 proceeds to step S368R. The peak reaching reference time T1 is a time that is determined by various experiments and so on. As a result of various experiments, the inventors have found that when the user starts lift-up of an object, it is effective to adjust the position of a peak value of the assist torque in accordance with the length of a lift-up motion time (the slowness of a lift-up motion). The peak reaching reference time T1 is set as an optimal time from the start of a lift-up motion until the assist torque reaches its peak in the reference motion.

When the control device 61 proceeds to step S366R, the control device 61 calculates (right) $\tau_{ss}(t)$ using Expression 19 described below and stores it, and proceeds to step S370R.

$$(\text{right})\tau_{ss}(t)=-(\text{right})P*\sin[2*(\text{right})T*\pi*(\text{right})t/(\gamma*T1)] \qquad \text{Expression 19}$$

(right) t: elapsed time from when the (right) operation state flag is set to 1 from 0
T1: peak reaching reference time When the control device 61 proceeds to step S368R, the control device 61 calculates (right) $\tau_{ss}(t)$ using Expression 20 described below and stores it, and proceeds to step S370R.

$$(\text{right})\tau_{ss}(t) = -(\text{right})P^*\sin\{[2^*(\text{right})T^*\pi^*((\text{right})t - \gamma^*T1)]/[(\text{right})T - \gamma^*T1] + \pi/2\} \quad \text{Expression 20}$$

When the control device 61 proceeds to step S370R, the control device 61 calculates (right) $\Delta\tau_{ss}(t)$ using Expression 21 described below and stores it, and ends the processing.

$$(\text{right})\Delta\tau_{ss}(t) = (\text{right})\tau_{ss}(t) - (\text{right})\tau_{ss}(t-1) \quad \text{Expression 21}$$

Using (right) $\tau_{ss}(t)$ calculated by the sequence described above, assist torque phase correction for correcting the position of the peak of the assist torque in a lift-up period of time so as to move the position of the peak to a position after the lapse of $\gamma T1$ from the start of lift-up is performed in [CASE IN WHICH CYCLE IS LONG AND ASSIST TORQUE BEFORE CORRECTION IS SMALL AS COMPARED TO LIFT-UP REFERENCE MOTION] shown in FIG. 21. When this assist torque phase correction is performed, since the value of (right) $\gamma$ changes in accordance with the estimated lift-up period length (T), the time ($\gamma T1$) from the start of lift-up to the assist torque peak is adjusted in accordance with the estimated lift-up period length (T).

As described above, the assist device 1 according to this embodiment can generate an assist torque that is appropriately corrected in accordance with the motion of the user ("walking", "object lift-up/lift-down", or "moving object laterally"). For example, when the motion of the user is slow in "object lift-up", the assist torque can be appropriately increased with the use of a torque correction gain $\gamma$. Further, for example, when the motion of the user is slow in "object lift-up", the position of the peak of the assist torque can be set to an appropriate timing by shortening the time to the peak of the assist torque using $\tau_{ss}(t)$.

Since the body wearing unit 2 (see FIG. 2) has the appropriate structure, the user can easily wear it. Further, the actuator unit 4R has the simple structure as shown in FIG. 4, and it is not necessary to attach biological signal detection sensors to the user. Further, the control of the actuator unit 4R by the control device 61 is also the relatively simple control as described above with reference to FIGS. 12 to 21.

In the description of this embodiment, the kinds of motions to be determined are three kinds, i.e. "walking", "object lift-up/lift-down", and "moving object laterally". However, determination on work that includes "object lift-up/lift-down" and does not include "walking" may be performed. Alternatively, determination on work that includes "object lift-up/lift-down" and "moving object laterally", and does not include "walking" may be performed.

Referring to FIGS. 22 to 35, an assist device 1A (a modified example) provided with an operation unit, compensation for friction torque, adjustment of assist force in accordance with the presence or absence of an object, and so on will be described. With respect to the assist device 1 described above with reference to FIGS. 1 to 21, a description will be provided on an example of adding an operation unit that allows a user to perform adjustment and so on of the assist state, an example of using friction compensation torque that cancels friction caused by a speed reducer and so on, and an example of appropriately changing assist force in accordance with the presence or absence of an object. In the following description of the assist device 1A, the same symbols as those in the above-described assist device 1 denote the same or corresponding portions as those in the above-described assist device 1.

Figure 22:
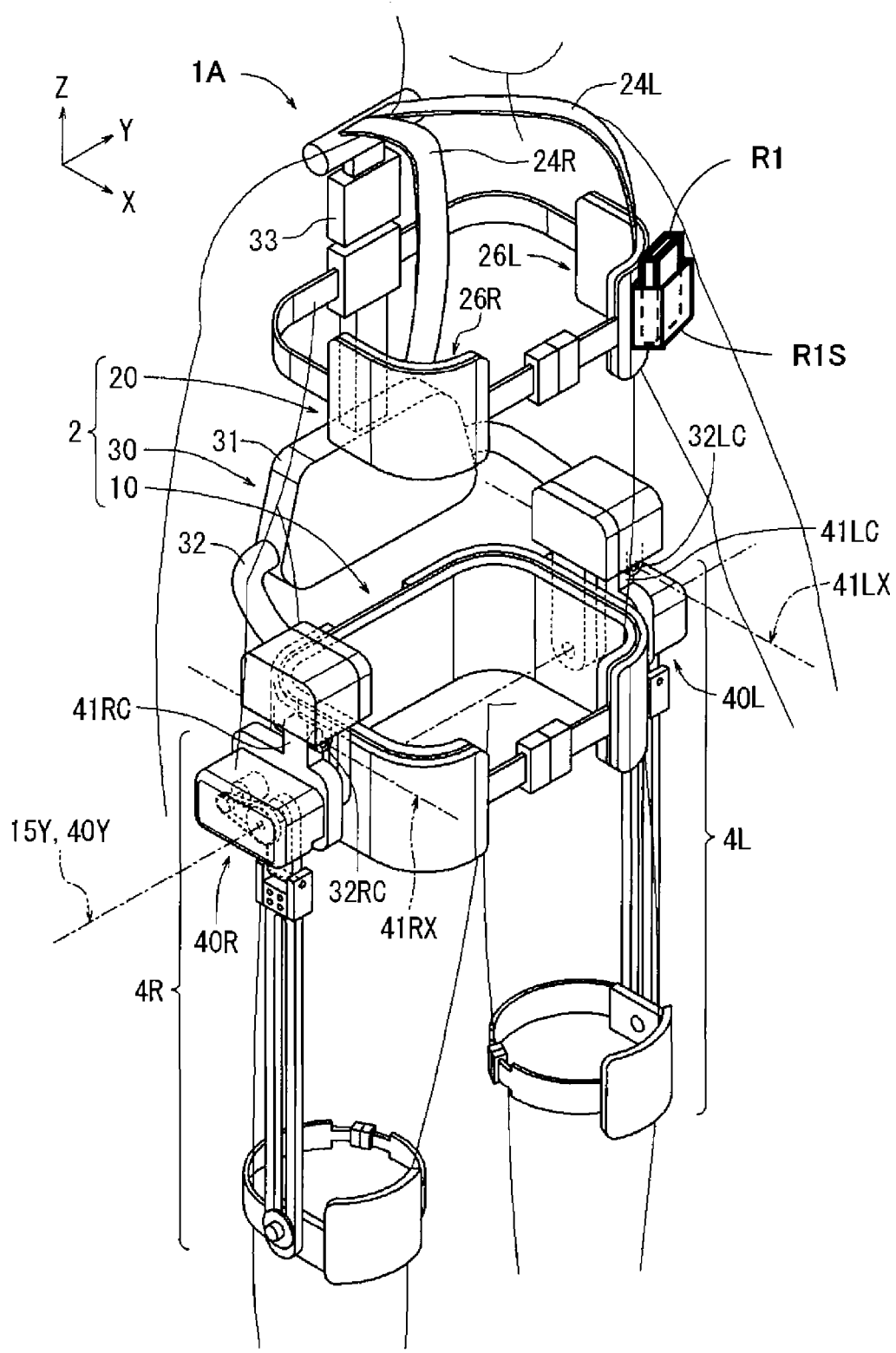
FIG. 22 is a diagram for explaining an example of the overall configuration of an assist device including an operation unit, with respect to the assist device shown in FIG. 1.
Figure 23:
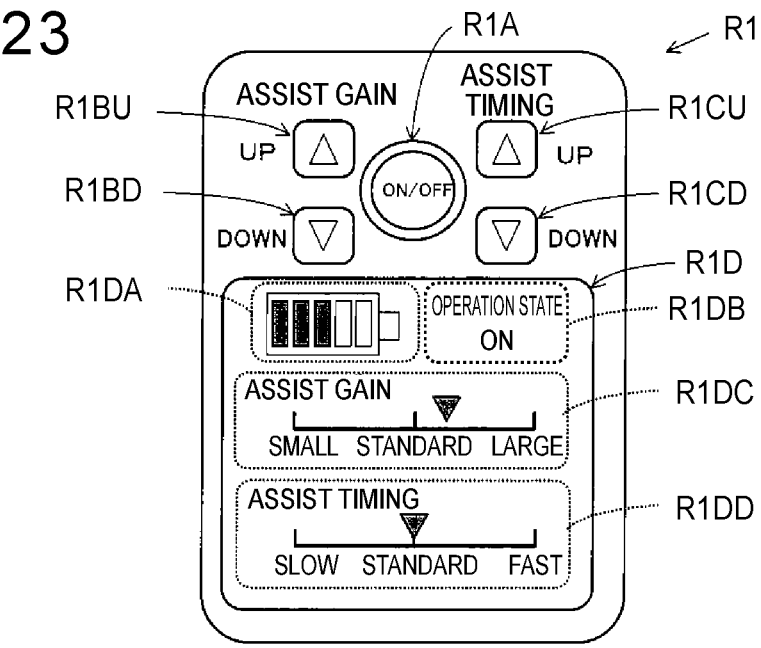
FIG. 23 is a diagram for explaining an example of the external appearance of the operation unit.
Figure 24:
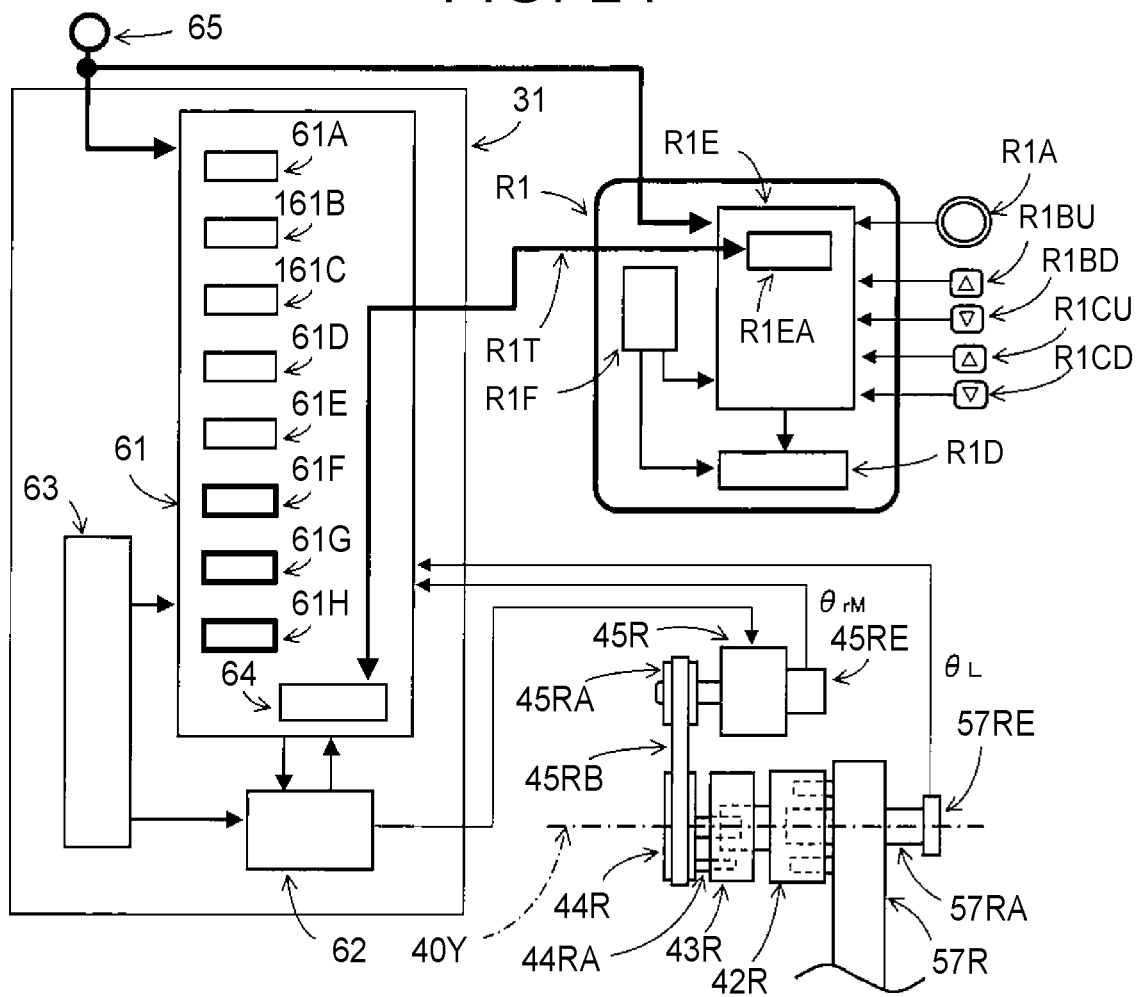
FIG. 24 is a diagram for explaining the input and output of a control device and the operation unit.
Figure 26:
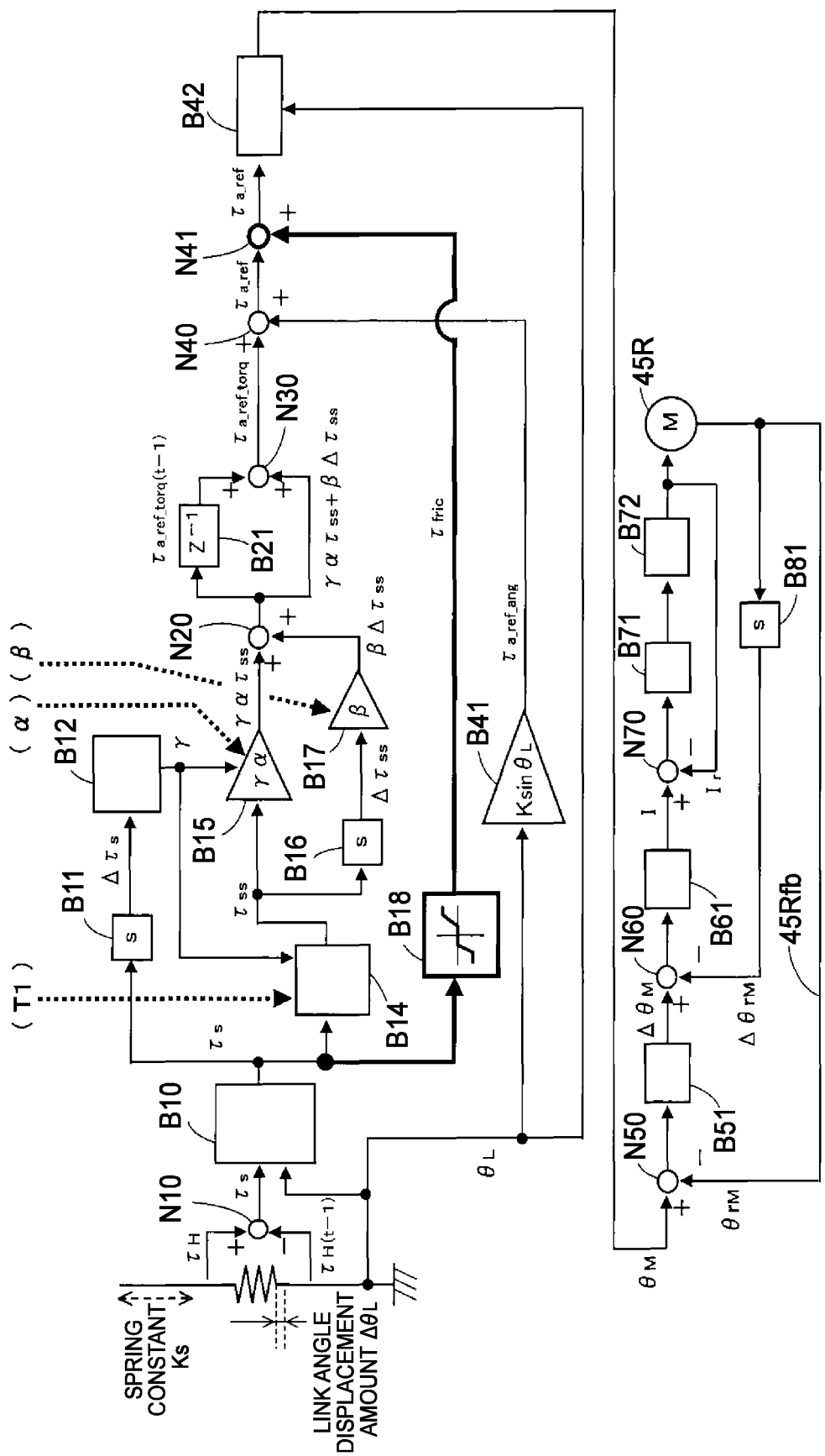
FIG. 26 is a diagram for explaining a control block diagram in which friction compensation torque $\tau_{fric}$ is added to the control block diagram shown in FIG. 12.
Figure 27:
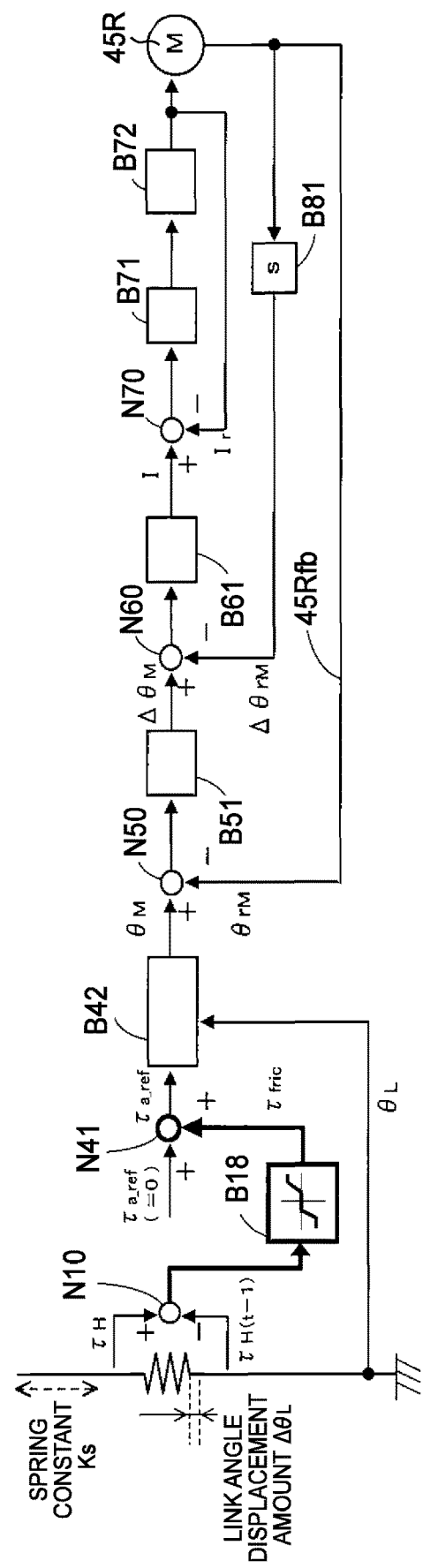
FIG. 27 is a diagram for explaining a control block diagram in which friction compensation torque $\tau_{fric}$ is added to the control block diagram shown in FIG. 13.

Referring to FIGS. 22 to 25, 30, and 31, a description will be provided on an example in which an operation unit R1 is added to allow the user to easily perform adjustment and so on of the assist state of the assist device 1A. As shown in FIG. 24, the operation unit R1 is connected to a control device 61 in a box 31 via a wired or wireless communication line R1T. A control device R1E of the operation unit R1 can transmit and receive information to and from the control device 61 in the box 31 via a communication unit R1EA, while the control device 61 in the box 31 can transmit and receive information to and from the control device R1E in the operation unit R1 via a communication unit 64. As shown in FIG. 22, when the user does not operate the operation unit R1, the user can keep the operation unit R1, for example, in a keeping portion R1S such as a pocket provided at a left chest wearing portion 26L.

As shown in FIG. 23, the operation unit R1 includes a main operating portion R1A, a gain UP operating portion R1BU, a gain DOWN operating portion R1BD, a timing UP operating portion R1CU, a timing DOWN operating portion R1CD, a display portion R1D, and so on. As shown in FIG. 24, the operation unit R1 includes, in the inside thereof, the control device R1E, an operation unit power supply R1F, and so on. The timing UP operating portion R1CU and the timing DOWN operating portion R1CD correspond to a "timing operating portion", while the gain UP operating portion R1BU and the gain DOWN operating portion R1BD correspond to a "gain operating portion". In order to prevent erroneous operation while the operation unit R1 is placed in the keeping portion R1S, the main operating portion R1A, the gain UP operating portion R1BU, the gain DOWN operating portion R1BD, the timing UP operating portion R1CU, and the timing DOWN operating portion R1CD may be configured not to protrude from a surface where they are disposed.

The main operating portion R1A is a switch configured to start and stop assist control that is performed by the assist device 1A. As shown in FIG. 24, a main power supply switch 65 configured to start and stop the (entire) assist device 1A itself is provided in, for example, the box 31. When the main power supply switch 65 is operated to the ON-side, the control device 61 and the control device R1E are started, while when the main power supply switch 65 is operated to the OFF-side, the operations of the control device 61 and the control device R1E are stopped. After operating the main power supply switch 65 to the ON-side, the user can start the operation of the assist device 1A by operating (pushing) the main operating portion R1A, and the user can stop the operation of the assist device 1A by operating (pushing) the main operating portion R1A. For example, the control device R1E stores a stop command when the main operating portion R1A is operated in an operating state of the assist device 1A, while the control device R1E stores a start command when the main operating portion R1A is operated in a stopped state of the assist device 1A. As shown in FIG. 23, the control device R1E, for example, displays whether the current operation state of the assist device 1A is ON (operating) or OFF (stopped) in a display area R1DB in the display portion RID of the operation unit R1.

Each of the gain UP operating portion R1BU and the gain DOWN operating portion R1BD is a switch configured to adjust the above-described assist multiplying factor $\alpha$ and differential correction gain $\beta$ stepwise such that assist force is increased or assist force is reduced, in accordance with an operation performed by the user.

Therefore, when the operation unit R1 is added, the input portions 32RS shown in FIG. 11 are omitted. For example, as shown in "OPERATION UNIT ASSIST GAIN" of FIG. 25, every time the gain UP operating portion R1BU is operated, the control device R1E increases a stored gain number by one, while every time the gain DOWN operating portion R1BD is operated, the control device R1E reduces the gain number by one. As shown in FIG. 23, the control device R1E, for example, displays a state corresponding to the current gain number in a display area R1DC in the display portion R1D of the operation unit R1.

Each of the timing UP operating portion R1CU and the timing DOWN operating portion R1CD is a switch configured to adjust the above-described peak reaching reference time T1 (see FIGS. 19 and 21) stepwise such that the peak reaching reference time T1 is made shorter (i.e., the peak reaching reference time T1 is reduced) or the peak reaching reference time T1 is made longer (i.e., the peak reaching reference time T1 is increased) in accordance with an operation performed by the user. For example, as shown in "OPERATION UNIT ASSIST TIMING" of FIG. 25, every time the timing UP operating portion R1CU is operated, the control device R1E increases a stored timing number by one, while every time the timing DOWN operating portion R1CD is operated, the control device R1E reduces the timing number by one. As shown in FIG. 23, the control device R1E, for example, displays a state corresponding to the current timing number in a display area R1DD in the display portion RID of the operation unit R1.

The control device R1E of the operation unit R1 transmits operation information via the communication unit R1EA (see FIG. 24) at a predetermined time interval (e.g. an interval of several tens of ms to several hundreds of ms) or every time any of the main operating portion R1A, the gain UP operating portion R1BU, the gain DOWN operating portion R1BD, the timing UP operating portion R1CU, and the timing DOWN operating portion R1CD is operated. The operation information includes the above-described stop command or start command, gain number, timing number, and so on.

In response to receipt of the operation information, the control device 61 in the box 31 stores the received operation information and transmits via the communication unit 64 (see FIG. 24) response information including battery information indicative of a state of a battery of a power supply unit 63 used for driving the assist device 1A, assist information indicative of an assist state, and so on. The battery information included in the response information includes a remaining amount or the like of the power supply unit 63, while the assist information included in the response information includes, for example, error information that is information about an abnormality when the abnormality is found in the assist device 1A. As shown in FIG. 23, the control device R1E, for example, displays the battery remaining amount or the like in a display area R1DA in the display portion RID of the operation unit R1, and when the error information is included, the control device R1E displays the error information at a given position in the display portion R1D.

The control device 61 (see FIG. 24) having received the operation information from the control device R1E starts the assist device 1A when the start command is included in the received operation information, and stops the assist device 1A when the stop command is included in the received operation information. For example, as shown in "CONTROL DEVICE ASSIST GAIN" of FIG. 25, gain information G10 in which values of assist multiplying factors α and values of differential correction gains β are set to correspond to the gain numbers is stored in the control device 61. The control device 61 determines an assist multiplying factor α and a differential correction gain β based on the gain number included in the received operation information and the gain information G10. The gain information G10 is prepared based on various experiments and simulations.

Further, for example, as shown in "CONTROL DEVICE ASSIST TIMING" of FIG. 25, timing information G20 in which peak reaching reference times T1 (see FIGS. 19 and 21) are set to correspond to the timing numbers is stored in the control device 61. The control device 61 determines a peak reaching reference time T1 based on the timing number included in the received operation information and the timing information G20. The timing information G20 is prepared based on various experiments and simulations.

The above-described "the assist multiplying factor α and the differential correction gain β corresponding to the gain number included in the operation information" and "the peak reaching reference time T1 corresponding to the timing number included in the operation information" are determined and stored at step S100R in a flowchart of FIG. 28, which will be described later. Specifically, the assist multiplying factor α, differential correction gain β, and peak reaching reference time T1 are determined and stored in "DETERMINE AND STORE CURRENT RIGHT/LEFT ASSIST MULTIPLYING FACTOR α, CURRENT RIGHT/LEFT DIFFERENTIAL CORRECTION GAIN β, AND CURRENT PEAK REACHING REFERENCE TIME T1 BASED ON OPERATION INFORMATION FROM OPERATION UNIT" of step S111R (see FIG. 30) that describes details of step S100R in the flowchart of FIG. 28. This determination and storage of α, β, and T1 may be performed at either one or both of step S111R (see FIG. 30) that is details of step S100R shown in FIG. 28 and step S111L (see FIG. 31) that is details of step S100L shown in FIG. 28.

As described above, by operating the operation unit R1, the user can easily perform adjustment for a desired assist state. Further, since the battery remaining amount, error information, and so on are displayed in the display portion IUD of the operation unit R1, the user can easily grasp the state of the assist device 1A. Forms of various information displayed in the display portion IUD are not limited to those shown in FIG. 23.

Hereinbelow, a description will be provided on an example in which the user that will perform work such as object lift-up/lift-down or moving object laterally in a warehouse or the like wears the assist device 1A (see FIG. 22) and works, and then, after the work, the user detaches the assist device 1A.

Before wearing the assist device 1A, the user operates the main power supply switch 65 to the ON-side so as to start the control device 61 and the control device R1E (see FIG. 24). At the start, the control device R1E is set to "stop" the operation of the assist device 1A, and, for example, "OPERATION STATE OFF" is displayed in the display portion R1D. Then, the user wears the assist device 1A. The main power supply switch 65 may be operated to the ON-side after the user wears the assist device 1A. At this time point, the assist device 1A does not yet perform assist control.

The user wearing the assist device 1A operates the main operating portion R1A (see FIG. 23) of the operation unit R1 so as to start the operation of the assist device 1A. For example, "OPERATION STATE ON" is displayed in the display portion RID of the operation unit R1. From this time point, the assist device 1A starts assist control. Specifically, the assist device 1A assists the motion of the user for the work of object lift-up/lift-down or the work of moving object laterally.

When the user desires an increase or decrease in assist torque while performing the work of object lift-up/lift-down or the work of moving object laterally, the user can easily perform adjustment to obtain a desired assist torque by operating the gain UP operating portion R1BU or the gain DOWN operating portion R1BD of the operation unit R1. Further, when the user feels a desire to make a peak timing of the assist torque earlier or later while performing the work of object lift-up/lift-down, the user can easily adjust the peak timing of the assist torque to a desired timing by operating the timing UP operating portion R1CU or the timing DOWN operating portion R1CD of the operation unit R1. For example, when the control device 61 has detected an abnormality of an electric motor 45R, a motor driver, any of various sensors (detection units), or the like during the operation of the assist control, the control device 61 transmits response information including error information so as to display the error information in the display portion RID of the operation unit R1 such that the operation of the assist device 1A is automatically stopped.

During a break time from the work, the user can (temporarily) stop the operation of the assist device 1A by operating the main operating portion R1A (see FIG. 23) of the operation unit R1. In this event, for example, "OPERATION STATE OFF" is displayed in the display portion RID of the operation unit R1. Further, for example, the control device 61 (see FIG. 24) performs display calling for a break in the display portion IUD of the operation unit R1 when the integrated operation time of the assist control has reached a predetermined time or more or when the integrated assist torque has reached a predetermined amount or more.

When the work has been finished, the user operates the main operating portion R1A (see FIG. 23) of the operation unit R1 (e.g. the user pushes the main operating portion R1A for a long time), thereby stopping the operation of the assist device 1A. For example, when the main operating portion R1A is pushed for a long time, the operations of the control device R1E and the control device 61 are stopped, and the display of the display portion RID of the operation unit R1 disappears. After confirming that the display of the display portion RID has disappeared, the user detaches the assist device 1A from itself and then operates the main power supply switch 65 to the OFF-side so as to stop the operation of the entire assist device 1A.

Referring to FIGS. 26 to 29, a description will be provided on an example of using friction compensation torque that cancels friction. In the description using FIGS. 1 to 21, the example has been described in which the control that does not generate assist force is performed when the user walks. That is, in the control block diagram for walking block B42 are set to zero, and, in the flowchart shown in FIG. 14, a (right) total assist torque command value $\tau_{a\_ref}$ is set to zero at step S500R and a (left) total assist torque command value $\tau_{a\_ref}$ is set to zero at step S500L. However, even when the electric motors are controlled so that the (right and left) total assist torque command values $\tau_{s\_ref}$ become zero for the user wearing the assist device 1A, the user is required to use force for idling the assist device 1A. Specifically, due to friction torque mainly caused by the speed reducer 42R (see FIG. 4), the user is required to use extra force corresponding to the friction torque during walking. During the work such as object lift-up, assist feeling may be lowered due to cancellation of part of assist force by the friction torque.

Figure 28:
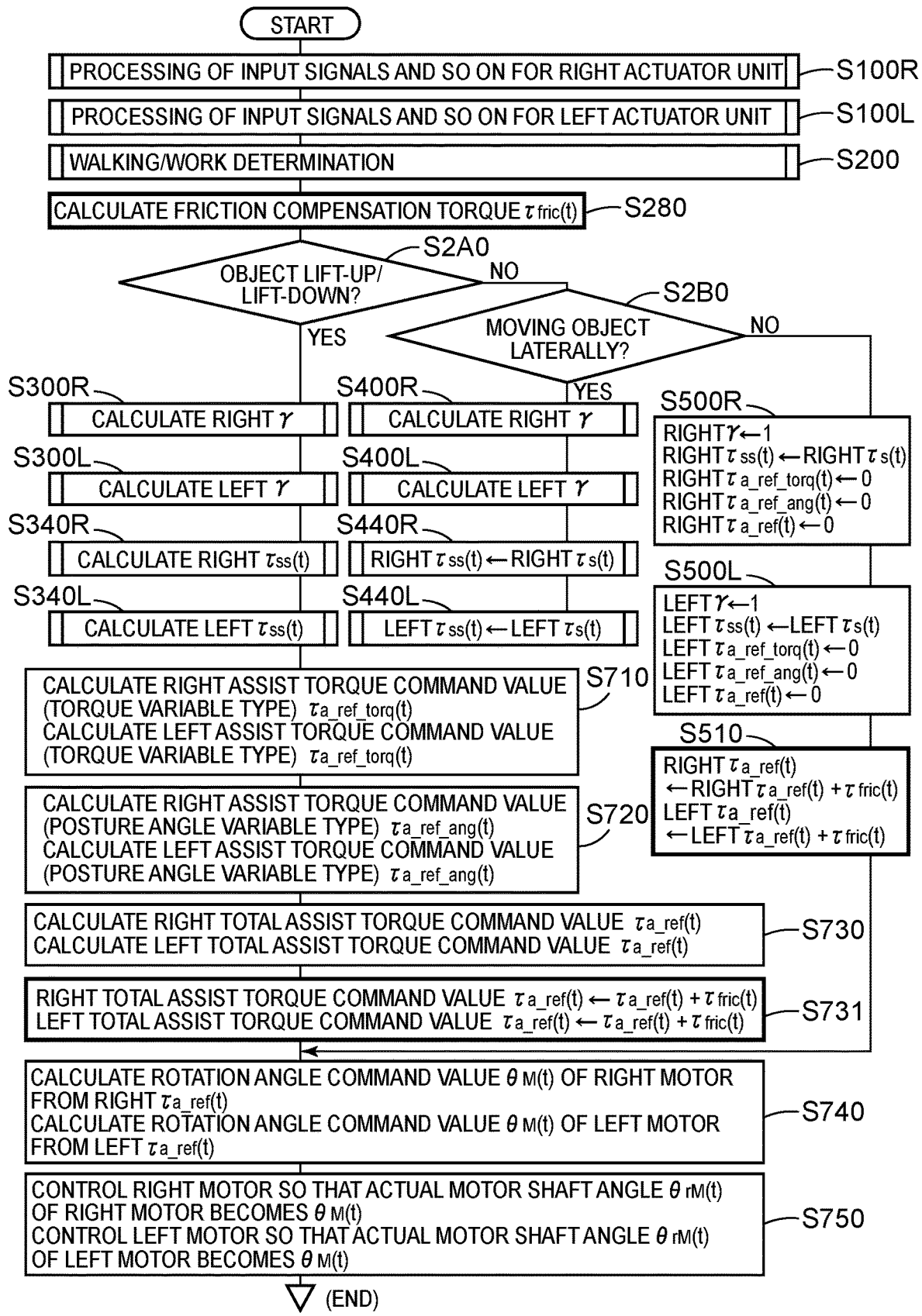
FIG. 28 is a flowchart for explaining the entirety of a processing sequence based on the control block diagrams shown in FIGS. 26 and 27.

In view of this, as shown in the flowchart of FIG. 28, steps S280, S510, and S731 are added to the flowchart shown in FIG. 14. Since the flowchart shown in FIG. 28 is the same as the flowchart shown in FIG. 14 except for steps S280, S510, and S731, steps S280, S510, and S731 will be mainly described hereinbelow.

After performing the processing of step S200, the control device 61 proceeds to step S280. At step S280, the control device 61 calculates a friction compensation torque $\tau_{fric}(t)$, and proceeds to step S2A0. The control device 61 calculates the friction compensation torque $\tau_{fric}(t)$ at step S280 as follows.

Figure 29:
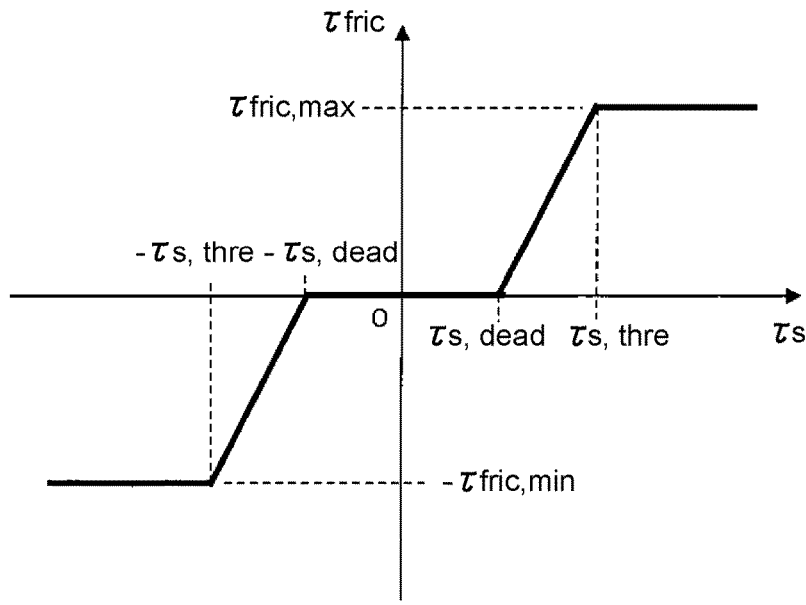
FIG. 29 is a diagram for explaining an example of friction compensation torque $\tau_{fric}$.
Figure 30:
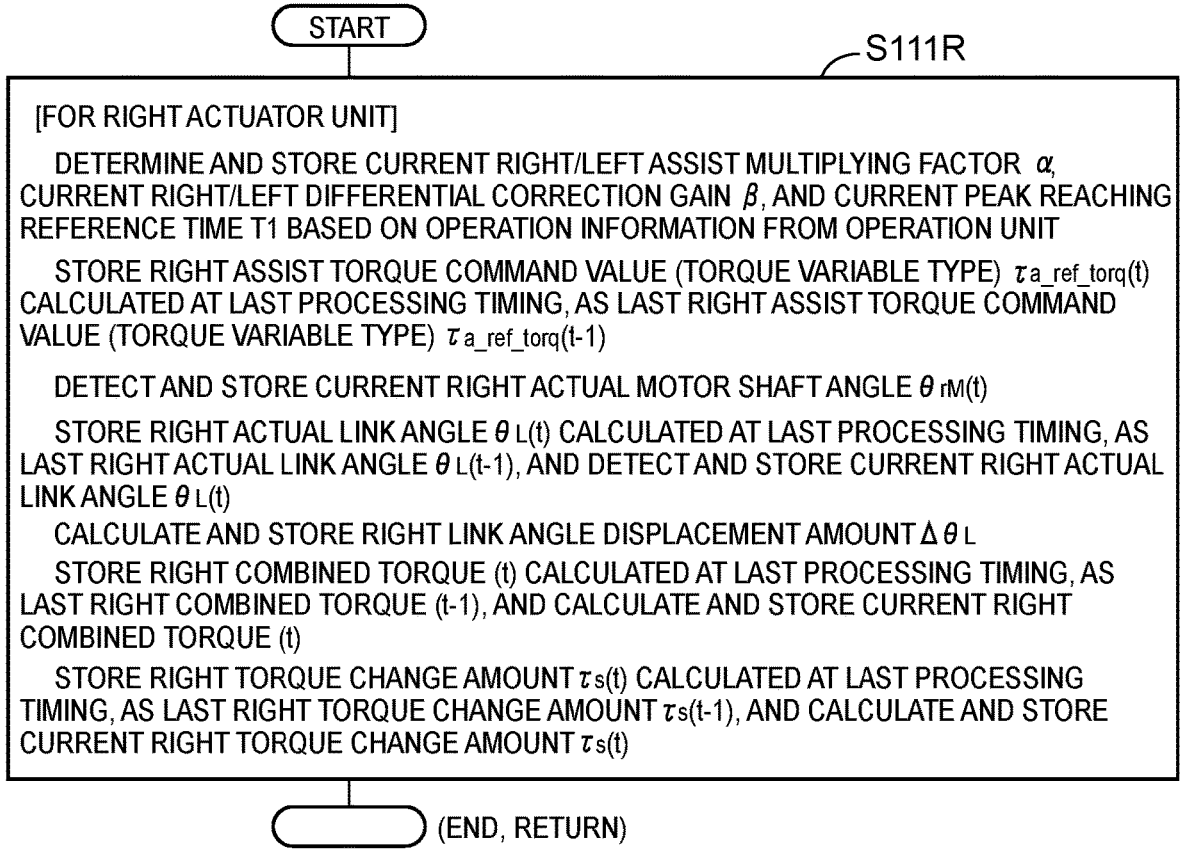
FIG. 30 is a flowchart for explaining details of "PROCESSING OF INPUT SIGNALS AND SO ON FOR RIGHT ACTUATOR UNIT" in the flowchart shown in FIG. 28.
Figure 31:
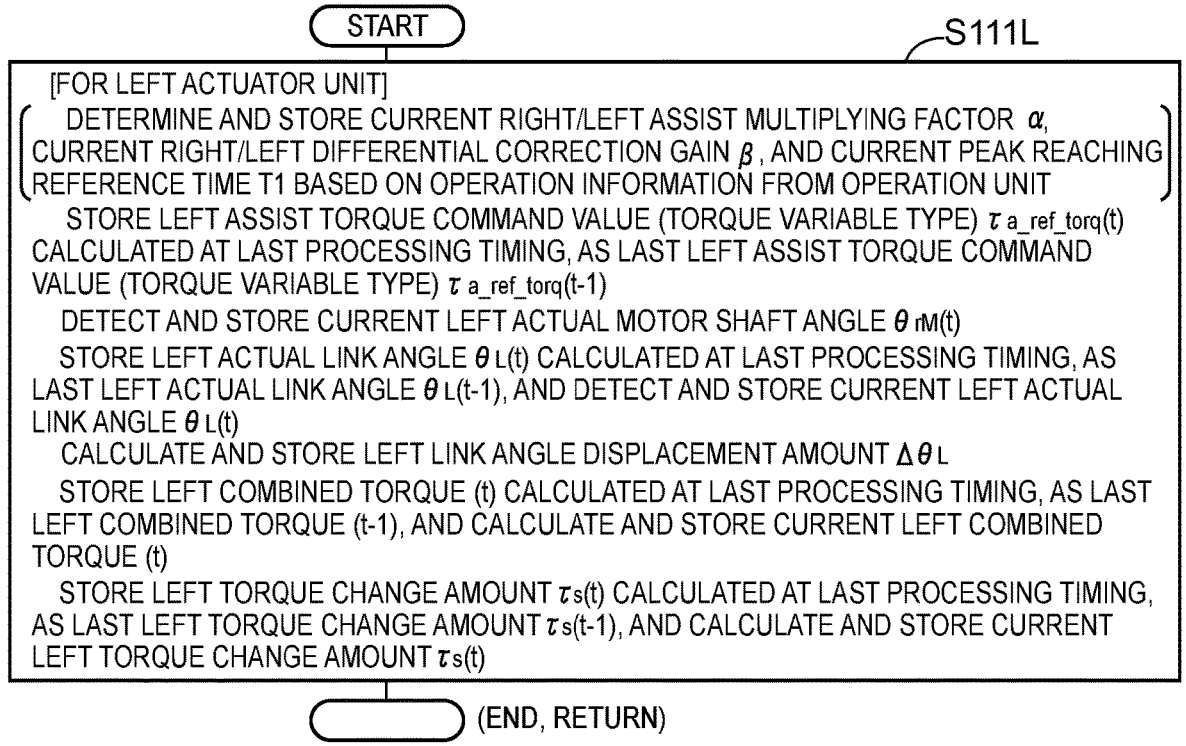
FIG. 31 is a flowchart for explaining details of "PROCESSING OF INPUT SIGNALS AND SO ON FOR LEFT ACTUATOR UNIT" in the flowchart shown in FIG. 28.

FIG. 29 shows an example of friction compensation torque $\tau_{fric}(t)$ with respect to $\tau_s(t)$. As shown in FIG. 29, a friction compensation torque $\tau_{fric}(t)$ is calculated in accordance with a value of $\tau_s(t)$ by dividing a region into the following five regions ([Region 1] to [Region 5]). Values of $-\tau_{s,thre}$, $\tau_{s,thre}$, $\tau_{s,dead}$, $\tau_{s,dead}$, $-\tau_{fric,min}$, and $\tau_{fric,max}$ are calculated in advance by various experiments, simulations, and so on.

[Region 1]: When $\tau_s(t) \leq -\tau_{s,thre}$ (when the absolute value of $\tau_s(t)$ is greater than or equal to a torque threshold value), $\tau_{fric}(t) = -\tau_{fric,min}$ ($-\tau_{fric,min}$: lower limit friction compensation torque). [Region 2]: When $-\tau_{s,thre} \leq -\tau_{s,dead}$, $\tau_{fric}(t) = -\tau_{fric,min} * [(-\tau_{s,dead}) - \tau_s(t)]/[(-\tau_{s,dead}) - (-\tau_{s,thre})]$. [Region 3]: When $-\tau_{s,dead} < \tau_s(t) < \tau_{s,dead}$ (when the absolute value of $\tau_s(t)$ is less than a dead zone torque value), $\tau_{fric}(t) = 0$. [Region 4]: When $\tau_{s,dead} \leq \tau_s(t) < \tau_{s,thre}$, $\tau_{fric}(t) = \tau_{fric,max} * [\tau_s(t) - (\tau_{s,dead})]/[(\tau_{s,thre}) - (\tau_{s,dead})]$. [Region 5]: When $\tau_{s,thre} \leq \tau_s(t)$ (when the absolute value of $\tau_s(t)$ is greater than or equal to a torque threshold value), $\tau_{fric}(t) = \tau_{fric,max}$ ($\tau_{fric,max}$: upper limit friction compensation torque). In the case of [Region 2] or [Region 4], the magnitude of friction compensation torque $\tau_{fric}(t)$ is not necessarily set to increase linearly, and may be set to increase curvedly.

The control device 61 performing the processing of step S280 functions as a compensation torque calculation unit (a compensation torque calculation unit 61F shown in FIG. 24) that calculates a friction compensation torque $\tau_{fric}(t)$, which is generated for cancelling friction torque, based on the torque-related signals (the detection signal corresponding to the rotation angle of the motor shaft of the electric motor 45R and the detection signal corresponding to the pivot angle of the assist arm 57R) from the torque detection unit. The control device 61 performing the processing of step S280 functions as a dead zone torque determination unit (a dead zone torque determination unit 61G shown in FIG. 24) that determines whether the absolute value of a torque change amount $\tau_s(t)$ calculated based on the torque-related signals is less than a predetermined dead zone torque value (less than $\tau_{s,dead}$). The processing of step S280 corresponds to blocks B18 in FIGS. 26 and 27.

After performing the processing of step S500L, the control device 61 proceeds to step S510. At step S510, the control device 61 sets a value obtained by adding the friction compensation torque $\tau_{fric}(t)$ to the (right) total assist torque command value $\tau_{a\_ref}(t)(=0)$ set at step S500R, as a new (right) total assist torque command value (summed assist torque) $\tau_{a\_ref}(t)$. Further, the control device 61 sets a value obtained by adding the friction compensation torque $\tau_{fric}(t)$ to the (left) total assist torque command value $\tau_{a\_ref}(t)(=0)$ set at step S500L, as a new (left) total assist torque command value (summed assist torque) $\tau_{a\_ref}(t)$. The processing of step S510 corresponds to node N41 in FIG. 27.

After performing the processing of step S730, the control device 61 proceeds to step S731. At step S731, the control device 61 sets a value obtained by adding the friction compensation torque $\tau_{fric}(t)$ to the (right) total assist torque command value $\tau_{a\_ref}(t)$ calculated at step S730, as a new (right) total assist torque command value (summed assist torque) $\tau_{a\_ref}(t)$. Further, the control device 61 sets a value obtained by adding the friction compensation torque $\tau_{fric}(t)$ to the (left) total assist torque command value $\tau_{a\_ref}(t)$ calculated at step S730, as a new (left) total assist torque command value (summed assist torque) $\tau_{a\_ref}(t)$. The processing of step S731 corresponds to node N41 in FIG. 26.

As described above, by adding the friction compensation torque $\tau_{fric}(t)$ to each of the (right) total assist torque command value $\tau_{a\_ref}(t)$ and the (left) total assist torque command value $\tau_{a\_ref}(t)$ at step S510 or S731, the control device 61 can cancel friction torque in each of the actuator units 4R, 4L caused by the speed reducer 42R and so on. Consequently, it is possible to appropriately prevent occurrence of a situation where extra force corresponding to the friction torque is required during walking and assist feeling is lowered due to cancellation of part of assist force by the friction torque during the work such as object lift-up.

When the control device 61 has determined at step S200 that the kind of motion is a walking motion, the control device 61 performs setting at step S510 so that the new (right) total assist torque command value (summed assist torque) $\tau_{a\_ref}(t)$ and the new (left) total assist torque command value (summed assist torque) $\tau_{a\_ref}(t)$ each become only the friction compensation torque $\tau_{fric}(t)$. Consequently, also during walking such as rehabilitation of walking, for example, difficulty in walking and so on can be reduced by reducing resistance due to friction torque of each of the actuator units 4R, 4L, and thus, assist feeling can be improved.

When it has been determined that the absolute value of the torque change amount $\tau_s(t)$ is less than $\tau_{s,dead}$ (less than the predetermined dead zone torque value), i.e. the torque change amount $\tau_s(t)$ is in Region 3, the friction compensation torque $\tau_{fric}(t)$ is set to 0 (zero). Consequently, a predetermined dead zone range can be provided in the vicinity of a point where the torque change amount $\tau_s(t)$ becomes 0 (zero). Thus, vibration of each of the actuator units 4R, 4L can be suppressed, and accordingly, assist feeling is further improved.

When it has been determined that the absolute value of the torque change amount $\tau_s(t)$ is greater than or equal to $\tau_{s,thre}$ (greater than or equal to the torque threshold value), i.e. the torque change amount $\tau_s(t)$ is in Region 1 or Region 5, the friction compensation torque $\tau_{fric}(t)$ is set to $-\tau_{fric,min}$ (lower limit friction compensation torque) or $\tau_{fric,max}$ (upper limit friction compensation torque). Consequently, by setting the friction compensation torque $\tau_{fric}(t)$, which reduces friction torque in each of the actuator units 4R, 4L, in a fixed range, an appropriate friction compensation torque $\tau_{fric}(t)$ in accordance with a motion of the user can be generated, and thus, assist feeling can be further improved.

The control device 61 performing the processing of steps S280 to S731 in the flowchart of FIG. 28 functions as an assist torque calculation unit (an assist torque calculation unit 161C shown in FIG. 24) that calculates an assist torque based on the determined related torque information, and as a correction unit (a correction unit 61D shown in FIG. 24) that corrects the calculated assist torque based on the determined kind of motion.

Referring to FIGS. 32 to 35, a description will be provided on an example of appropriately changing assist force in accordance with the presence or absence of an object (i.e., in accordance with whether an object is present). In the description using FIGS. 1 to 21, the example has been described in which when an object lift-up/lift-down motion of the user is detected, assist force corresponding to the object lift-up/lift-down motion is generated. However, since assist force is generated even when an object is very light or even when the user does not actually have an object although the motion of the user is the object lift-up/lift-down motion, it may be considered that the user is surprised by assist force greater than expected. Therefore, when the motion of the user is the object lift-up/lift-down motion, presence or absence of an object is determined (it is determined whether an object is present), and assist force is generated in accordance with the presence or absence of an object (i.e., in accordance with whether an object is present). When an object is very light even though the object is present, it may be determined that an object is absent. As the processing sequence of the control device 61, details of step S200 in the flowchart of FIG. 32 and details of step S300R (and details of steps S300L, S400R, and S400L) in the flowchart of FIG. 34 differ from details of step S200 shown in FIG. 17 and details of step S300R shown in FIG. 18. Hereinbelow, different points will be mainly described.

Figure 32:
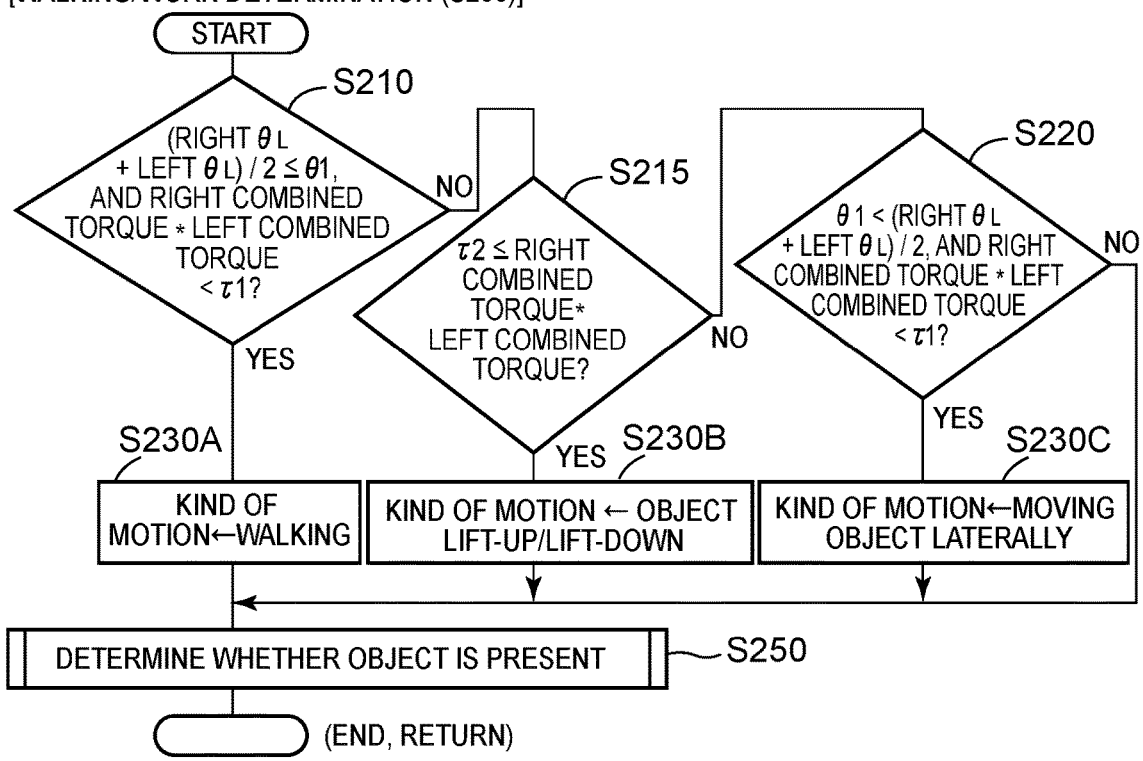
FIG. 32 is a flowchart for explaining details of "WALKING/WORK DETERMINATION" in the flowchart shown in FIG. 28.

As shown in FIG. 32, in the details of step S200, after the processing of step S230A, S230B, or S230C is finished or when answer is "No" at step S220, the control device 61 proceeds to step S250. Details of the processing of step S250 will be described with reference to FIG. 33.

Figure 33:
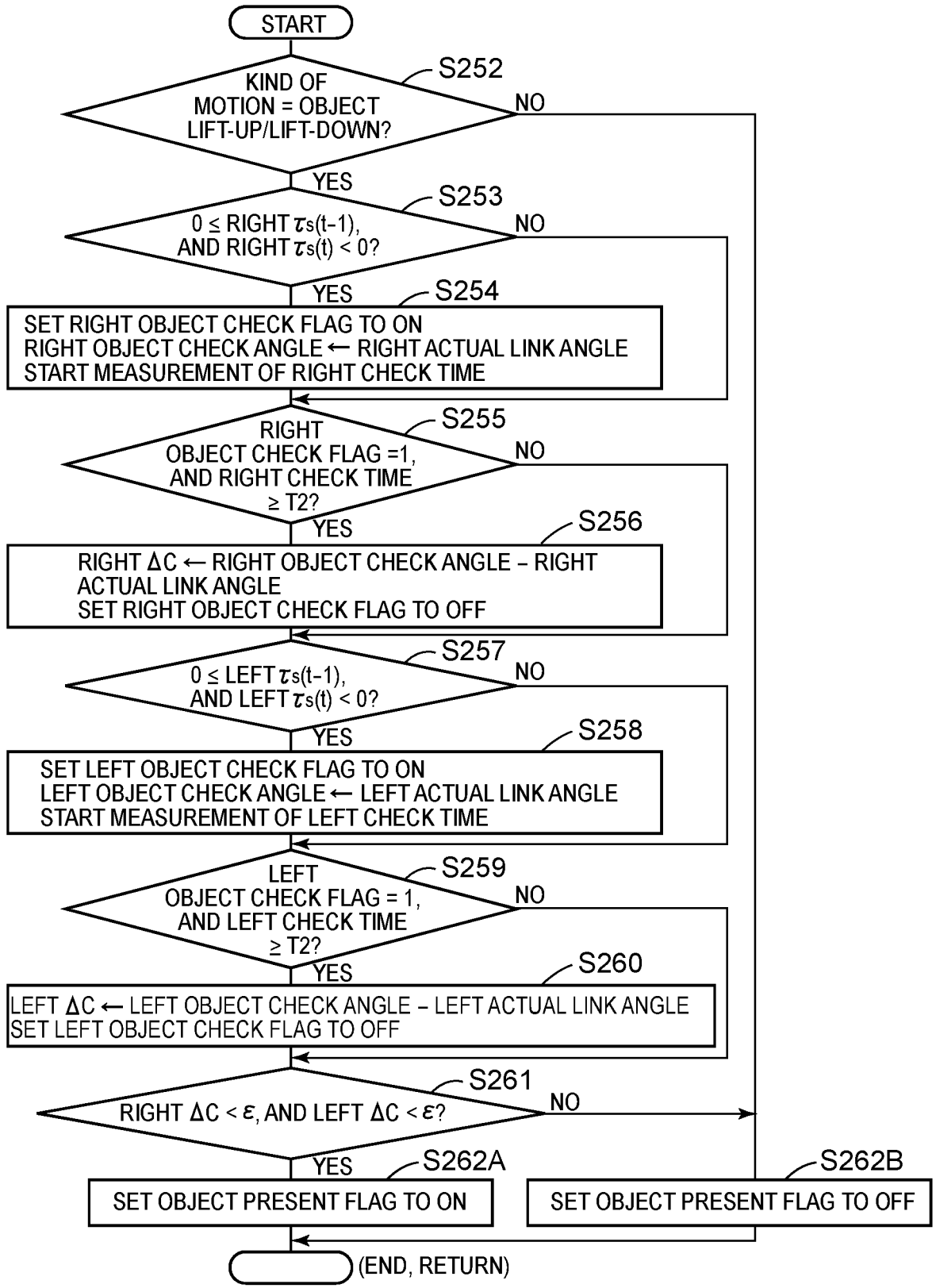
FIG. 33 is a flowchart for explaining details of "DETERMINE WHETHER OBJECT IS PRESENT" in the flowchart shown in FIG. 32.

At step S252 in FIG. 33, the control device 61 determines whether the kind of motion is "object lift-up/lift-down", and when the kind of motion is "object lift-up/lift-down" (Yes), the control device 61 proceeds to step S253, while when the kind of motion is not "object lift-up/lift-down" (No), the control device 61 proceeds to step S262B. When the kind of motion is not "object lift-up/lift-down", the control device 61 sets an object present flag to "OFF" (determining that an object is absent) at step S262B and ends the processing.

When the control device 61 proceeds to step S253, the control device 61 determines whether (right) $\tau_s(t-1)$ is greater than or equal to zero, and further, (right) $\tau_s(t)$ is less than zero. This determination determines whether a current point of time is Q1 at which the assist torque changes from positive to negative in FIG. 35. If affirmative (Yes), the control device 61 proceeds to step S254, while if negative (No), the control device 61 proceeds to step S255.

When the control device 61 proceeds to step S254, the control device 61 sets a (right) object check flag to "ON", stores a current (right) actual link angle $\theta_L$ as a (right) object check angle, and starts measurement of (right) check time. Then, the control device 61 proceeds to step S255.

At step S255, the control device 61 determines whether the (right) object check flag=1, and further, the (right) check time is greater than or equal to a time T2. If affirmative (Yes), the control device 61 proceeds to step S256, while if negative (No), the control device 61 proceeds to step S257. As shown in FIG. 35, the time T2 is a minute time from the time point of Q1 and is set to, for example, a time of approximately several tens of ms.

When the control device 61 proceeds to step S256, the control device 61 stores "(right) object check angle–(right) actual link angle $\theta_L$ (after the lapse of time T2)" as (right) ΔC and sets the (right) object check flag to "OFF". Then, the control device 61 proceeds to step S257. That is, the change amount of the (right) actual link angle during the minute time T2 from the time point of Q1 is stored as (right) ΔC.

At step S257, the control device 61 determines whether (left) $\tau_s(t-1)$ is greater than or equal to zero, and further, (left) $\tau_s(t)$ is less than zero. This determination determines whether a current point of time is Q1 at which the assist torque changes from positive to negative in FIG. 35. If affirmative (Yes), the control device 61 proceeds to step S258, while if negative (No), the control device 61 proceeds to step S259.

When the control device 61 proceeds to step S258, the control device 61 sets a (left) object check flag to "ON", stores a current (left) actual link angle $\theta_L$ as a (left) object check angle, and starts measurement of (left) check time. Then, the control device 61 proceeds to step S259.

At step S259, the control device 61 determines whether the (left) object check flag=1, and further, the (left) check time is greater than or equal to a time T2. If affirmative (Yes), the control device 61 proceeds to step S260, while if negative (No), the control device 61 proceeds to step S261. As shown in FIG. 35, the time T2 is a minute time from the time point of Q1 and is set to, for example, a time of approximately several tens of ms.

When the control device 61 proceeds to step S260, the control device 61 stores "(left) object check angle−(left) actual link angle $\theta_L$ (after the lapse of time T2)" as (left) $\Delta C$ and sets the (left) object check flag to "OFF". Then, the control device 61 proceeds to step S261. That is, the change amount of the (left) actual link angle during the minute time T2 from the time point of Q1 is stored as (left) $\Delta C$.

At step S261, the control device 61 determines whether (right) $\Delta C$ is less than a threshold value $\varepsilon$, and further, (left) $\Delta C$ is less than the threshold value $\varepsilon$. If affirmative (Yes), the control device 61 proceeds to step S262A, while if negative (No), the control device 61 proceeds to step S262B. The threshold value $\varepsilon$ is set in advance by various experiments, simulations, and so on. In a case where the user has a heavy object, since the motion of the user after Q1 becomes relatively slow so that the values of (right) $\Delta C$ and (left) $\Delta C$ become relatively small. In a case where the user does not have an object (including a case where the user has a very light object), since the motion of the user after Q1 becomes relatively fast so that the values of (right) $\Delta C$ and (left) $\Delta C$ become relatively large.

When the control device 61 proceeds to step S262A, the control device 61 sets the object present flag to "ON" (determining that an object is present) and ends the processing. When the control device 61 proceeds to step S262B, the control device 61 sets the object present flag to "OFF" (determining that an object is absent) and ends the processing. The control device 61 performing the processing of steps S252 to S262B described above functions as an object presence/absence determination unit (an object presence/absence determination unit 61H shown in FIG. 24) that determines presence or absence of an object (i.e., whether an object is present) in the motion of work in which the user has an object.

Figure 34:
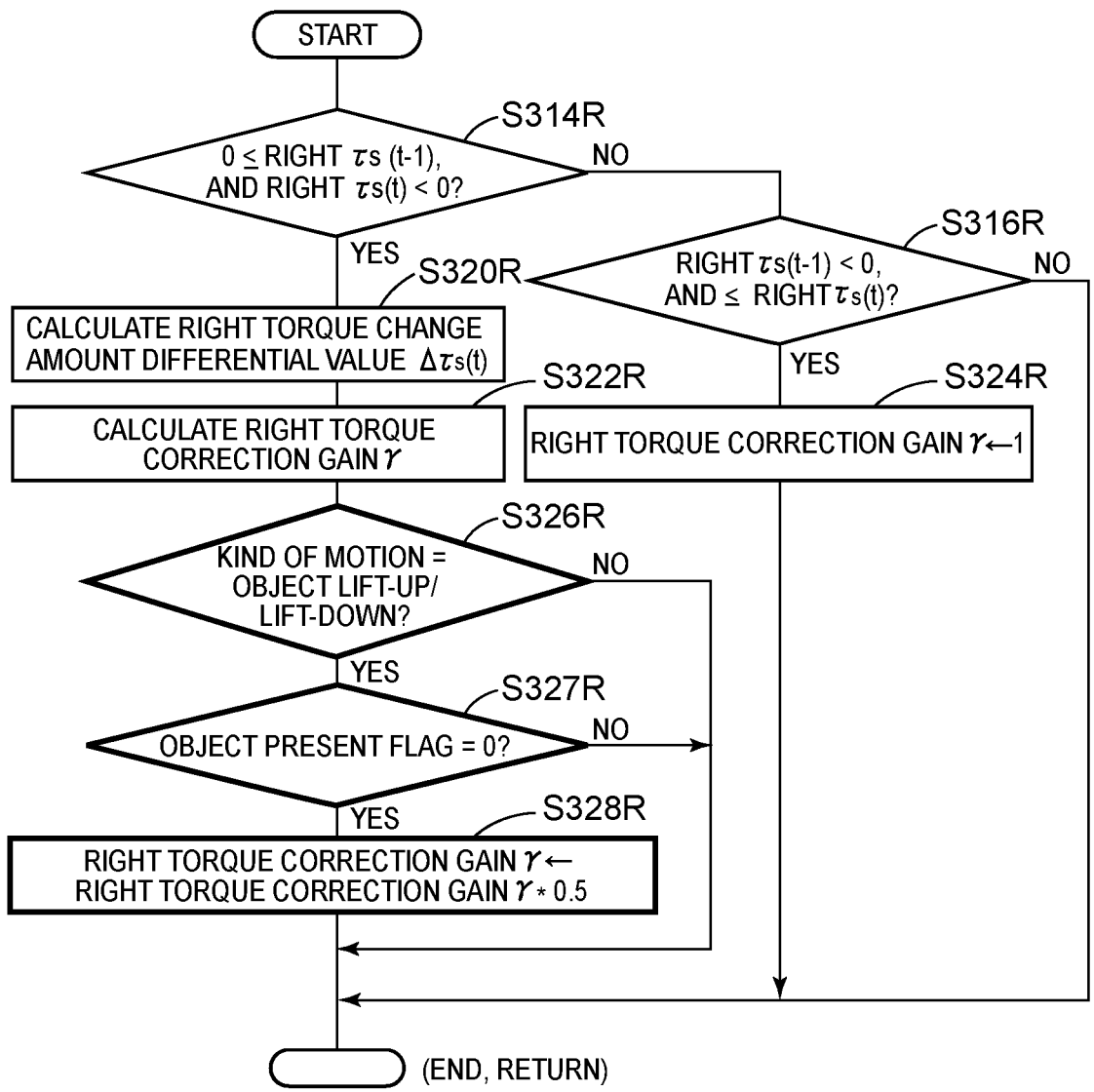
FIG. 34 is a flowchart for explaining details of "CALCULATE RIGHT γ" in the flowchart shown in FIG. 28.

As shown in FIG. 34, the details of step S300R differ from the details of step S300R shown in FIG. 18 in that steps S326R to S328R are added. Since the details of steps S300L, S400R, and S400L shown in FIG. 28 are the same as the details of step S300R shown in FIG. 34, a description thereof will be omitted.

After performing the processing of step S322R, the control device 61 proceeds to step S326R. At step S326R, the control device 61 determines whether the kind of motion is "object lift-up/lift-down", and when the kind of motion is "object lift-up/lift-down" (Yes), the control device 61 proceeds to step S327R, while when the kind of motion is not "object lift-up/lift-down" (No), the control device 61 ends the processing.

When the control device 61 proceeds to step S327R, the control device 61 determines whether the object present flag is zero (determining whether an object is absent), and when the object present flag is zero (an object is absent) (Yes), the control device 61 proceeds to step S328R, while when the object present flag is 1 (an object is present) (No), the control device 61 ends the processing.

When the control device 61 proceeds to step S328R, the control device 61 multiplies the (right) torque correction gain $\gamma$ calculated at step S322R by, for example, 0.5, thereby calculating a new (right) torque correction gain $\gamma$, and ends the processing. The multiplication coefficient is not limited to 0.5, and is a value determined by various experiments and simulations and is a value greater than or equal to zero and less than 1. That is, the control device 61 causes the torque correction gain $\gamma$ (corresponding to the correction amount of assist torque amount correction) when an object is determined to be absent, to be smaller than the torque correction gain $\gamma$ when an object is determined to be present.

Referring to FIG. 35, an effect of changing assist force in accordance with whether an object is present will be described. In FIG. 35, the assist torque indicated by a solid line after Q1 in [CASE IN WHICH CYCLE IS LONG AND ASSIST TORQUE BEFORE CORRECTION IS SMALL AS COMPARED TO LIFT-UP REFERENCE MOTION] shows an example in which assist torque amount correction with the use of a torque correction gain $\gamma$ is not performed, and further, assist torque phase correction for an earlier torque peak time point is not performed. The assist torque indicated by a dotted line shows an example in which assist torque amount correction is performed with the use of a torque correction gain $\gamma=1$, and further, assist torque phase correction is performed. The assist torque indicated by an alternate long and short dash line shows an example in which assist torque amount correction is performed with the use of a torque correction gain $\gamma>1$, and further, assist torque phase correction is performed. The assist torque indicated by an alternate long and two short dashes line shows an example in which assist torque amount correction is performed with the use of a torque correction gain $\gamma<1$, and further, assist torque phase correction is performed. When an object is determined to be absent, the assist torque that is not unnecessarily large is generated as shown by the assist torque indicated by the alternate long and two short dashes line. Thus, it is possible to prevent the user from being surprised by assist force greater than expected and thus to allow the user to use the assist device more safely.

The example has been described in which presence or absence of an object is determined (i.e., it is determined whether an object is present) and the assist torque is changed in accordance with the presence or absence of an object (i.e., in accordance with whether an object is present) when the kind of motion is "object lift-up/lift-down". However, presence or absence of an object may be determined and the assist torque may be changed in accordance with the presence or absence of an object even when the kind of motion is "moving object laterally". That is, in the motion of work in which the user has an object (including "object lift-up/lift-down" and "moving object laterally"), presence or absence of an object may be determined and the assist torque may be corrected in accordance with the determined presence or absence of an object.

What is claimed is:
1. An assist device comprising:
 a body wearing unit configured to be worn on a body of a user including a region around the thigh of the user; and
 an actuator unit configured to be attached to the body wearing unit and to the assist target body part so as to assist a motion of the thigh, wherein the actuator unit includes:
an output link configured to pivot about a joint of the thigh and to be attached to the thigh;
an actuator including an output shaft configured to generate an assist torque for assisting pivoting of the thigh via the output link;
a torque determination unit configured to determine a combined torque obtained by combining a user torque and the assist torque from the output shaft, the user torque being input from the output link when the user causes the thigh to pivot with force of the user;
a correction unit configured to calculate a correction amount for the determined combined torque, wherein the correction unit is configured to calculate, based on the combined torque, a posture angle that is an inclination angle of an upper half of the body of the user with respect to a vertical direction, the correction unit configured to calculate the correction amount based on the calculated posture angle; and
a pivot angle control unit configured to control a pivot angle of the output shaft based on the combined torque determined by the torque determination unit and the correction amount calculated by the correction unit.

2. The assist device according to claim 1, wherein when the posture angle is $\theta_L$, the correction unit is configured to calculate, as the correction amount, $K \sin \theta_L$ using K that is a constant set in advance.

3. The assist device according to claim 1, wherein the correction unit is configured to calculate the correction amount based on a differential value of the combined torque.

4. The assist device according to claim 1, wherein:
the actuator unit includes a communication unit;
the communication unit is configured to transmit, to an analysis system provided separately from the assist device, user information that is information about the user including the user torque, and assist information that is information about input and output of the actuator unit including the assist torque, the communication unit being configured to receive, from the analysis system, analysis information including a result of analysis performed by the analysis system; and
the actuator unit is configured to adjust an operation of the actuator unit based on the analysis information received from the analysis system.

5. The assist device according to claim 1, wherein:
the actuator unit further includes a torque detection unit configured to output a torque-related signal about the combined torque;
the torque determination unit is configured to determine related torque information including the combined torque and the user torque based on the torque-related signal from the torque detection unit;
the actuator unit further includes a motion kind determination unit configured to determine a kind of motion of the user based on the determined related torque information, and an assist torque calculation unit configured to calculate the assist torque based on the determined related torque information;
the correction unit is configured to correct the calculated assist torque, based on the determined kind of motion; and
the pivot angle control unit is configured to control the pivot angle of the output shaft based on the assist torque corrected by the correction unit.

6. The assist device according to claim 5, wherein:
the kind of motion includes a lift-up motion that is a motion in which the user lifts up an object; and when the determined kind of motion is the lift-up motion, the correction unit is configured to perform at least one of
i) assist torque amount correction for correcting magnitude of the assist torque during a lift-up period of time that is a period of time from a time point at which the user starts lift-up of the object to a time point at which the user completes the lift-up of the object, and
ii) assist torque phase correction for estimating a user torque peak time point that is a time point at which a maximum user torque is generated, and for performing correction such that an assist torque peak time point that is a time point at which a maximum assist torque is generated becomes earlier than the user torque peak time point, the maximum user torque being a maximum value of the user torque during the lift-up period of time, and the maximum assist torque being a maximum value of the assist torque.

7. The assist device according to claim 5, wherein:
the kind of motion includes a motion of work in which the user has an object;
the actuator unit further includes an object presence/absence determination unit configured to determine presence or absence of the object in the motion of the work in which the user has the object; and
the correction unit is configured to correct the assist torque in accordance with the presence or absence of the object determined by the object presence/absence determination unit.

8. The assist device according to claim 5, wherein the kind of motion that is determined by the motion kind determination unit includes an object lift-up/lift-down motion in which the user lifts up an object or the user lowers the object held by the user.

9. The assist device according to claim 8, wherein the kind of motion that is determined by the motion kind determination unit further includes a moving object laterally motion in which the user moves the object from right to left or from left to right.

10. The assist device according to claim 8, wherein:
the kind of motion that is determined by the motion kind determination unit further includes a walking motion in which the user walks;
the actuator unit further includes a compensation torque calculation unit configured to calculate, based on the torque-related signal from the torque detection unit, a friction compensation torque that is generated for cancelling a friction torque in the actuator unit; and
the pivot angle control unit is configured to control the pivot angle of the output shaft based on a summed assist torque obtained by adding the friction compensation torque calculated by the compensation torque calculation unit to the assist torque corrected by the correction unit.

11. The assist device according to claim 10, wherein:
the compensation torque calculation unit includes a torque change amount calculation unit configured to calculate a torque change amount of the user torque based on the torque-related signal, and a dead zone torque determination unit configured to determine whether an absolute value of the torque change amount of the user torque calculated by the torque change amount calculation unit is less than a predetermined dead zone torque value;
the compensation torque calculation unit is configured to calculate the friction compensation torque based on the torque change amount of the user torque calculated by the torque change amount calculation unit; and the compensation torque calculation unit is configured to set the friction compensation torque to zero when the dead zone torque determination unit determines that the absolute value of the torque change amount of the user torque is less than the predetermined dead zone torque value.

12. The assist device according to claim 5, further comprising an operation unit provided separately from the body wearing unit and the actuator unit and configured to adjust and display an assist control state of the actuator unit.

13. The assist device according to claim 12, wherein the operation unit includes a gain operating portion configured to adjust magnitude of the assist torque.

14. The assist device according to claim 1 wherein the actuator unit further includes a mechanism that stores assist torque as a function of the pivot angle of the output shaft.

15. The assist device according to claim 14 wherein the correction unit is further configured to calculate a differential correction amount based on the stored assist torque.

* * * * *